United States Patent [19]

Shimada et al.

[11] Patent Number: 5,063,402
[45] Date of Patent: Nov. 5, 1991

[54] APPARATUS FOR RETRACTING A PHOTO-TAKING LENS

[75] Inventors: Takahisa Shimada; Toshio Yamaki, both of Osaka; Kenji Tsuji, Kashiwara; Masaaki Nakai, Kawachinagano; Akihiko Fujino; Hiroshi Ootsuka, both of Sakai, all of Japan

[73] Assignee: Minolta Camera Kabushiki Kaisha, Osaka, Japan

[21] Appl. No.: 602,911

[22] Filed: Oct. 23, 1990

Related U.S. Application Data

[63] Continuation of Ser. No. 563,950, Aug. 7, 1990, abandoned, which is a continuation of Ser. No. 421,300, Oct. 10, 1989, abandoned, which is a continuation of Ser. No. 196,817, May 17, 1988, abandoned, which is a continuation of Ser. No. 66,764, Jun. 25, 1987, abandoned.

[30] Foreign Application Priority Data

Jun. 25, 1986 [JP] Japan ............................... 61-150478

[51] Int. Cl.⁵ .................................................. G03B 13/36
[52] U.S. Cl. ................................................... 354/400
[58] Field of Search .................. 354/400, 402, 195.1, 354/195.11, 195.12, 195.13, 187, 401

[56] References Cited

U.S. PATENT DOCUMENTS 4,348,089  9/1982  Shenk ................................. 354/400
4,374,613  2/1983  Stempeck ....................... 354/195.13
4,743,931  5/1988  Matsuzaki et al. ................. 354/400

FOREIGN PATENT DOCUMENTS 59-123822  7/1984  Japan .
60-78432   5/1985  Japan .

Primary Examiner—W. B. Perkey
Attorney, Agent, or Firm—Burns, Doane, Swecker & Mathis

[57] ABSTRACT

A lens retracting apparatus for a photo-taking device which comprises an interchangeable photo-taking lens, a main switch selectively switchable between an ON position for enabling an operation of the photo-taking device and an OFF position for inhibiting the operation of the camera, a focus detecting unit, a drive unit for selectively retracting and extending a focusing lens of the photo-taking lens toward an in-focus position on the basis of a result of focus detection carried out by the focus detecting unit, a discriminating unit for determining whether or not the photo-taking lens is retracted to a predetermined position, and a control means for driving the drive unit to retract the photo-taking lens only by switching off the main switch and also for stopping the drive unit when a condition in which the photo-taking lens is retracted to the predetermined position is determined by the discriminating unit.

23 Claims, 24 Drawing Sheets (a) ①-1

(b) ①-2

(c) ②-1

(d) ②-2

(e) ③-1

(f) ③-2

(g) ④-1

(h) ④-2

APPARATUS FOR RETRACTING A PHOTO-TAKING LENS

This application is a continuation of application Ser. No. 07/563,950, filed Aug. 7, 1990 (now abandoned), which is a continuation of application Ser. No. 07/421,300, filed Oct. 10, 1989 (now abandoned), which is a continuation of application Ser. No. 07/196,817, filed May 17, 1988 (now abandoned), which is a continuation of application Ser. No. 07/066,764, filed June 25, 1987 (now abandoned).

BACKGROUND OF THE INVENTION

1. Field of the Invention

The present invention relates to an apparatus for retracting or shifting backward an interchangeable photo-taking lens used in a photo-taking device such as, for example a photographic camera.

2. Description of the Prior Art

In a lens shutter camera having an automatic focusing capability, a photo-taking lens is set to a predetermined initial position, for example, either the infinity position or the closest distance position, by a predetermined mechanism when the photo-taking has been completed and can, when a photographer depresses the release button through a first stroke of depression, be either extended or retracted from this predetermined initial position by a drive means on the basis of a result of focus detection to form an image of a target object to be photographed on a film plane automatically. In a certain type of prior art lens shutter cameras, the photo-taking lens extended for the purpose of focusing is arranged so as to be retracted towards the predetermined initial position by a shutter charge mechanism, operatively associated with a film winding operation, when and after the photo-taking has been completed.

In another type of prior art lens shutter cameras, the photo-taking lens then extended by the use of a focusing drive means for focusing use is arranged so as to be retracted towards the predetermined initial position by the use of the same drive means when and after the actual photo-taking has been completed. Also, in a lens shutter camera having a built-in electronic flash device and a photo-taking lens selectively switchable two focal lengths (for example, standard and telephoto), arrangement is made to shorten the length of the photo-taking lens by switching over to the standard focal length in operatively associated relationship with the accommodation of a light emitting portion of the built-in flash device which, when photo-taking, pops up, thereby rendering the camera to be compact such as disclosed in, for example, the Japanese Laid-open Patent Publication No. 60-78432.

However, in a prior art single-reflex camera having a lens interchangeable capability, the interchangeable photo-taking lens remains extended to a position to which it has been moved for the purpose of actual photo-taking and, particularly where the camera is mounted with an interchangeable lens of either macro type or telephoto type, the photo-taking lens is very long if the photo-taking lens remains extended and, accordingly, when it comes to the transportation of the camera from place to place, the extended lens poses a problem in that the portability of the camera as a whole is reduced.

In order to obviate the above discussed inconvenience, the lens then extended has to be manually retracted in readiness for the transportation of the camera.

In any one of the first and second mentioned conventional lens shutter cameras, the focusing lens is first retracted to a predetermined position and, from this position, the focusing lens is extended for focusing purpose. This is possible because the lens is non-interchangeably mounted in the camera. On the contrary thereto, in the single-reflex camera having a lens interchangeable capability, it often occurs that, while the lens is removed from the camera, the focusing lens may move to any indefinite position, and the lens is not arranged to move to any position after the photo-taking. Also, in the lens shutter camera of the type having the two selectively switchable focal lengths, the switching is effected only to the position at which the lens assumes the shorter focal length, and the lens is in no way retracted.

SUMMARY OF THE INVENTION

The present invention has been devised to substantially obviate the above discussed problems inherent in the prior art cameras and has for its essential object to provide an apparatus for retracting an interchangeable lens in a photo-taking device having a lens interchangeable capability, which device is provided with a main switch for driving the photo-taking device, which apparatus is effective to retract the lens, once extended for the photo-taking, by switching off the switch.

Another important object of the present invention is to provide an apparatus of the type referred to above, wherein the interchangeable lens can be retracted properly depending on an operating condition of the photo-taking device, and which device is particularly conveniently employed in a lens-interchangeable, auto-focus camera having a lens interchangeable capability for accomplishing an automatic focus adjustment.

In order to accomplish the above described object of the present invention, there is provided a lens retracting apparatus which comprises an interchangeable photo-taking lens, a main switch selectively switchable between an ON position for enabling an operation of a camera and an OFF position for inhibiting the operation of the camera, a focus detecting means, a drive means for selectively retracting and extending a focusing lens of the photo-taking lens toward an in-focus position on the basis of a result of focus detection carried out by the focus detecting means, a discriminating means for determining whether or not the photo-taking lens is retracted to a predetermined position, and a control means for driving the drive means to retract the photo-taking lens only by switching off the main switch and also for stopping the drive means when a condition in which the photo-taking lens is retracted to the predetermined position is determined by the discriminating means.

BRIEF DESCRIPTION OF THE DRAWINGS

In any event, this and other objects and features of the present invention will become clear from the following detailed description taken in conjunction with preferred embodiments thereof with reference to the accompanying drawings, in which:

FIGS. 18(D)-(a) to (h) are diagrams showing TV versus AV characteristics descriptive of a control condition when presented by the program line diagram of FIG. 18(B).

DETAILED DESCRIPTION OF THE EMBODIMENTS

Figure 1A:
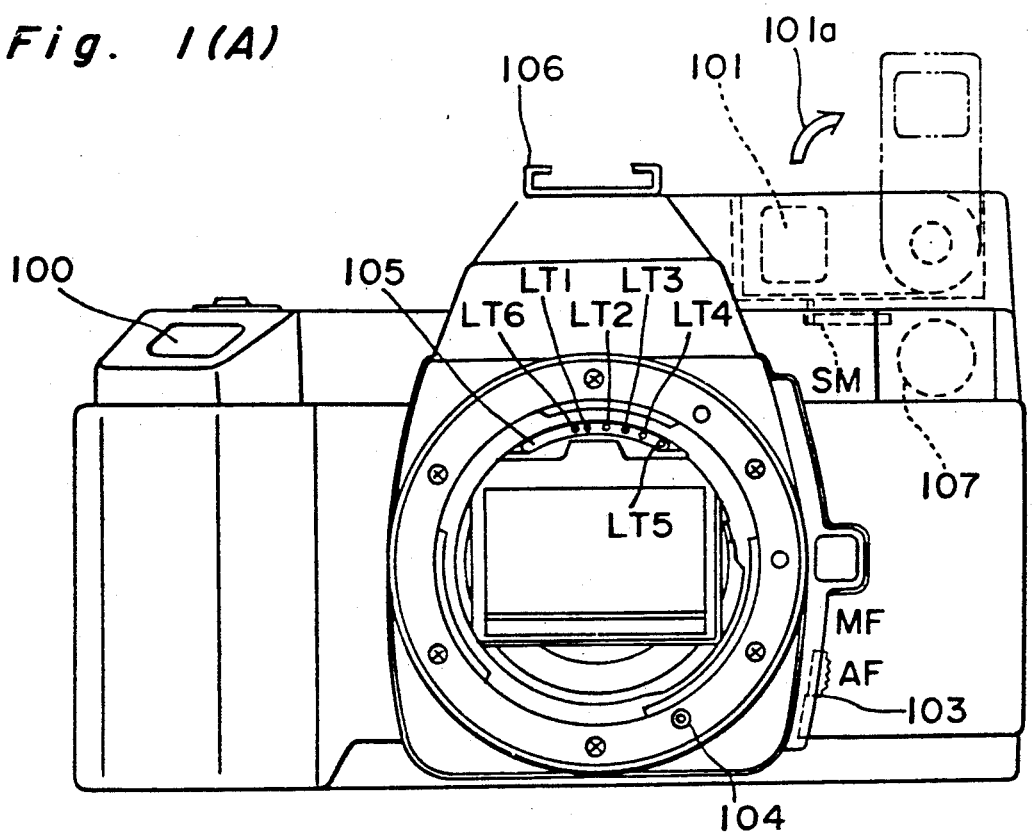
FIG. 1(A) is a front elevational view of a photographic camera according to one preferred embodiment of the present invention.

FIG. 1(A) illustrates an outer appearance of a photographic camera utilizable in the practice of the present invention. The camera shown therein has a shutter release button 100, and an electronic flash device 101 (hereinafter referred to as a built-in flash) built in the camera and supported for movement between folded and erected positions, the movement of the built-in flash 101 towards the erected position in a direction of the arrow 101a causing a main switch SM to be switched on. The camera also has an operating member 103 for switching a focus adjusting mode between an automatic focus adjustment (hereinafter referred to as AF) and a manual focus adjustment (hereinafter referred to as MF), AF being selected in the illustrated instance with an AF switch SAF being consequently switched on. When this operating member 103 is manipulated so as to move upwards, MF is selected accompanied by switching off of the AF switch SAF. In association with the movement of the operating member 103 to MF, connection between a coupler 104, as will be described later, and a lens assembly is interrupted. This coupler 104 is driven by a motor in the camera to rotate and is coupled with a drive mechanism in an interchangeable lens assembly for driving a focusing lens. Since this coupler 104 is disclosed in the Japanese Laid-open Patent Publication No. 59-123822, the details thereof will not be herein reiterated. The camera furthermore has a terminal carrier plate 105 carrying a plurality of terminals LT1 to LT5 used to transmit signals between a circuit inside the camera and a circuit inside the lens assembly and a detector terminal LT6 used to detect the mounting of the lens assembly on the camera, a hot shoe 106 for the support thereon of an external flash device and an auxiliary light emitter 107 for projecting a random pattern of light towards a target object to be photographed in the event that no focus detection is possible because of darkness.

Figure 1B:
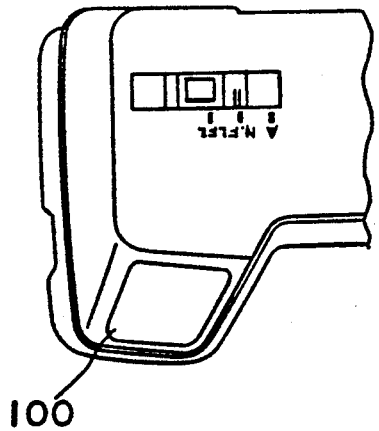
FIG. 1(B) is a plan view of a portion of the camera of FIG. 1(A) showing a photo-taking mode selector switch.

In FIG. 1(B), there is shown a photo-taking mode changeover switch, and the camera according to the illustrated embodiment of the present invention has three photo-taking modes, namely, an automatic photo-taking mode (A), a photo-taking under natural lighting mode (N.FL) and a photo-taking under flash lighting mode (FL).

Figure 2:
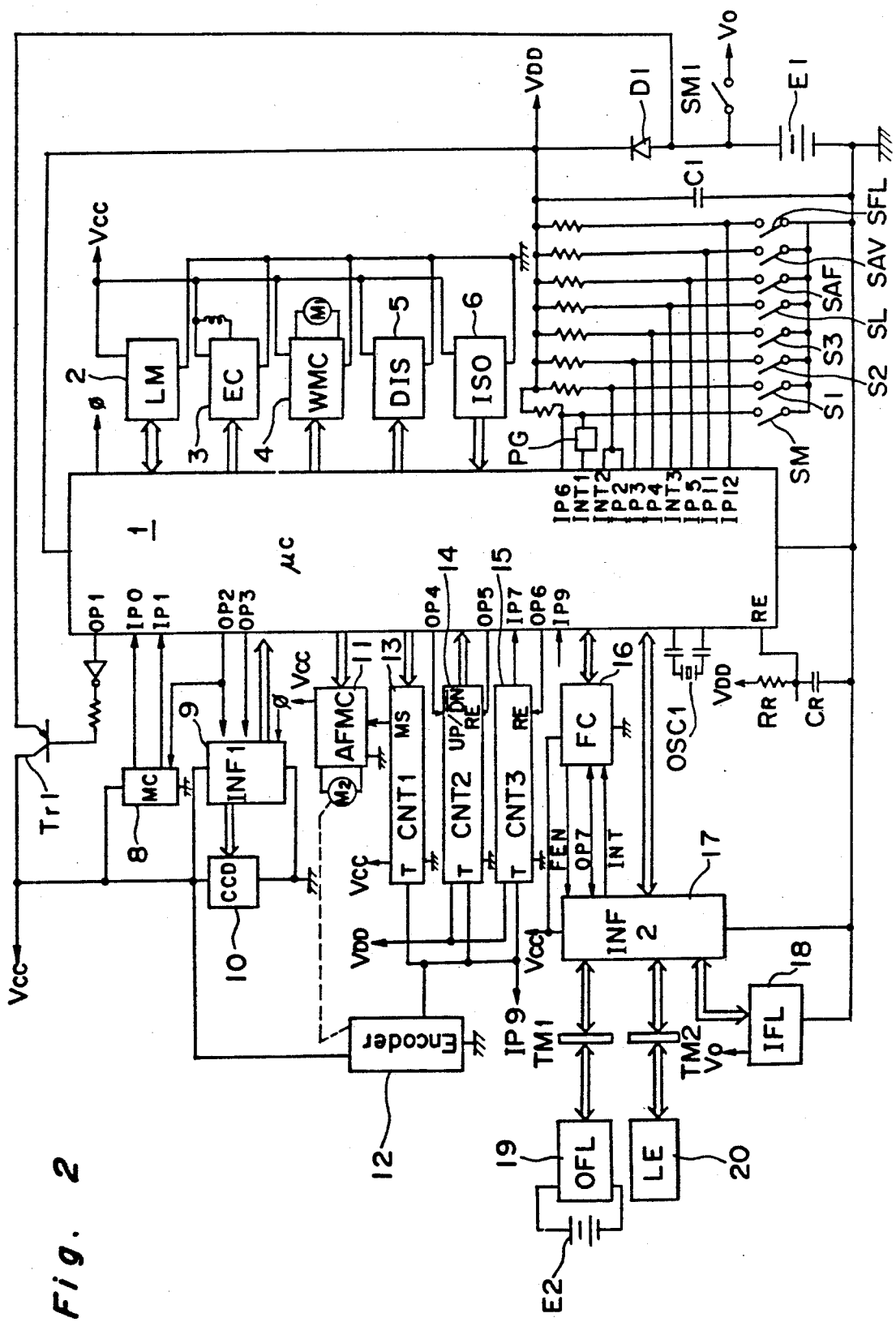
FIG. 2 is a circuit block diagram showing the entire circuit used in the camera of FIG. 1(A)

FIG. 2 illustrates a block diagram of the entire circuit of the camera used in the practice of the illustrated embodiment.

Figure 3:
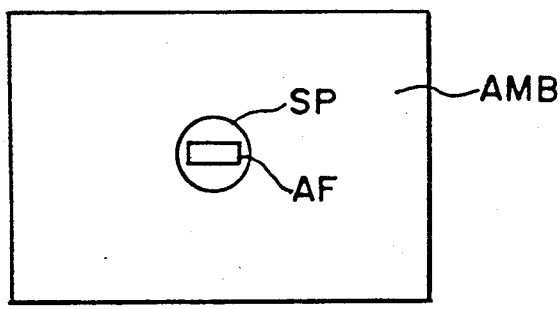
FIG. 3 is a diagram showing a light measuring area of a light measuring system of the camera.

Referring to FIG. 2, reference numeral 1 represents a microcomputer capable of carrying out a sequential control of the camera in its entirety and various calculations. Reference numeral 2 represents a light measuring circuit for measuring the brightness of the target from which the measured brightness is outputted in terms of a digital signal (BV value) according to the APEX system to the microcomputer 1. This light measuring circuit 2 has a spot light measurement for effecting a light measurement at a central portion of a photographing screen (hereinafter referred to as a SP measurement, the brightness thereof being designated by BVSP), and a screen light measurement for effecting a light measurement at the entire screen except for the above mentioned central portion (hereinafter referred to as an AMB measurement, the brightness thereof being designated by BVAM). The light measuring range according to these light measuring systems will now be described with reference to FIG. 3 which illustrates the rectangular photographing screen. The circle SP (of a diameter of, for example, about 5 mm in the case of a 35 mm film) at the center of the photographing screen represents a SP measuring range, and the range other than it represents an AMB measuring range. A rectangular portion inside the SP measuring range represents a detecting range for AF.

The circuit shown in FIG. 2 includes an exposure control circuit 3 for controlling an aperture and a shutter according to an aperture value and a shutter speed either preset or calculated by the microcomputer 1; a winder circuit 4 for winding-up a film frame to frame by driving a motor M1; a display circuit and a display device 5 for displaying photographic information. At the time of the display, the microcomputer 1 sets in two predetermined internal registers data corresponding to the contents to be displayed, which contents are outputted to the display circuit 5 from an output port therefor by the action before release, the display circuit 5 decoding such data and effecting the display according to Table 6.

Referring to Table 6, a bit bo is set to be "1" during the photo-taking under flash lighting and represents data for displaying a $\mathfrak{h}$ marking. A bit b1 is set during the macro-photographing and represents data for displaying a "MR" marking. A bit b2 is set during a photo-taking under a bounced lighting and represents data for displaying a "BS" marking. Bits b3 and b4 represent data for displaying one of "NF", "FL" and "A" markings according to combinations of the bits, that is, b3b4=10, 01, and 11, which markings represent the photo-taking under ambient lighting mode, the photo-taking under flash lighting and the photo-taking under auto-exposure mode, respectively.

The succeeding b5b6b7 are provided for indicating, before the film exposure takes place, the tone difference between the center portion and the portion around the center portion of the image to be exposed on a film, and the display is effected when the camera is held under the auto-exposure mode, the distance information can be calculated and the flash device has been completely charged. b5b6b7=111 represent a data descriptive of the situation wherein no substantial difference in brightness is found between the center portion and the portion around the center portion and, in such case, displayed is a marking consisting of the rectangular frame with a circle, that is, ⊡. b5b6b7=001 represent a data descriptive of the situation wherein the target object at the center is illuminated and is therefore brighter than the background such as occurring in a theatre stage and in the night and, in such case, the rectangular portion except for the circular area, that is , is displayed to indicate that the background is dark. b5b6b7=010 represent a data descriptive of the situation wherein the portion around the center portion is brighter than the center portion such as occurring during the back-lighting condition and, in such case, the inside of the circle with the rectangular frame, that is, marking ⊡, is displayed to indicate that the center portion is dark while the background is bright. b5b6b7=011 represent a data descriptive of the situation wherein the entire screen is dark such as occurring in a distant night scene and, in such case, both of the inside of the circle and the inside of the rectangular frame, that is, the whole, are displayed to indicate that both of the center portion and the background are darkened. b5b6b7=100 represent a data descriptive of the situation wherein, when the brightness of the center portion becomes extremely high, the brightness of the center portion is restricted and, in such case, the circular frame blinks. b8=1 represents a data displayed for the purpose of warning in the event that, during the flash photography, a red-eye phenomenon may occur.

Figure 13:
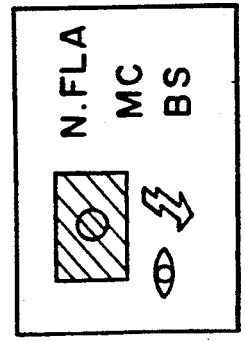
FIG. 13 is a front elevational view of a display device.

The condition in which all of the display items are lit illustrated in FIG. 13. As the display element a liquid crystal display panel is used. With respect to the photographing mode, the display of the photo-taking under natural lighting (N.F.) and the display of the photo-taking under flash lighting (FL) are partially concurrently used.

Reference numeral 6 represents a film sensitivity setting circuit for outputting, in the form of a digital signal (SV value) according to the APEX system, the film sensitivity obtained by reading a coded pattern imprinted on a film cartridge or the film sensitivity which has been manually set. Reference numeral 8 represents a monitor circuit for controlling the integrating time to a charge-coupled device 10 as a line image sensor, which monitor circuit outputs an integration stop signal and a low brightness signal to input terminals IP1 and IP0 of the microcomputer 1. Reference numeral 9 represents an interface circuit operable in response to an integration start signal and the integrating stop signal from respective output terminals OP2 and OP3 of the microcomputer 1 to control the integrating operation of the charge-coupled device 10 and also to convert an analog data from the charge-coupled device 10 into a digital data which is subsequently outputted to the microcomputer 1. Reference numeral 11 represents a motor control circuit for controlling a motor M2 used to drive the focusing lens through the coupler 104, and reference numeral 12 represents an encoder for monitoring the rotation of the motor M2 and for generating a train of pulses the number of said pulses being a function of the number of revolution of the motor M2. Reference numeral 13 represents a counter for the control of the lens drive motor M2 by a number of revolutions (amount) corresponding to the defocus amount calculated by the microcomputer 1. The counter 13 is set by the microcomputer 1 with the number of revolutions (amount) corresponding to the defocus amount, and is operable to subtract the set value each time a pulse is applied thereto from the encoder 12 and to output a drive stop signal from a terminal MS to the motor control circuit 11 for stopping the lens drive motor M2 when the subtracted value becomes zero. It is to be noted that the circuits 8 to 13 are those circuits which are used for the automatic focus adjustment. Reference numeral 14 represents an up-down counter for monitoring a lens extension amount from a condition in which the focusing lens is retracted to an extreme position, e.g., infinite distance position, which counter 14 is operable to up-count the number of pulses fed from the encoder 12 when the focusing lens is extended and to down-count them when the focusing lens is retracted. Reference numeral 15 represents a counter for counting how many pulses are outputted from the encoder 12 from the condition in which the lens is retracted to the extreme position, which counter 15 outputs a carry signal to an input terminal IP7 when the number of the pulses counted exceeds a predetermined value. This is for the purpose that, since the error between the count of the counter 14 for monitoring the extension amount and the actual extension amount (which error may result from a play or backlash between the lens drive mechanism and the coupler 104 or change in extension amount relative to one pulse) may possibly increase in proportion to the number of revolution of the motor M2, the count is monitored to refrain the error from increasing by outputting the carry signal to the microcomputer 1. Reference numeral 16 represents a flash light adjusting circuit for controlling the amount of flash light emitted by a flash device, reference numeral 17 represents an interface circuit disposed between the microcomputer 1 and a lens circuit 20 inside the interchangeable lens assembly, the external flash device 19 and the built-in flash device 18.

Hereinafter, numerous switches will be described. Reference character SM represents a main switch, and the microcomputer 1 is so designed that, unless this main switch SM is closed, the microcomputer 1 will not accept a signal generated from a photo-taking ready switch S1 as will be described later. In response to the switching of the main switch SM from an ON state to an OFF state and from the OFF state to the ON state, a pulse is generated from a pulse generator PG, which pulse is applied to an interruption terminal INT1 of the microcomputer 1 thereby to permit the latter to execute a program flow INT1 as will be described later.

Figure 4:
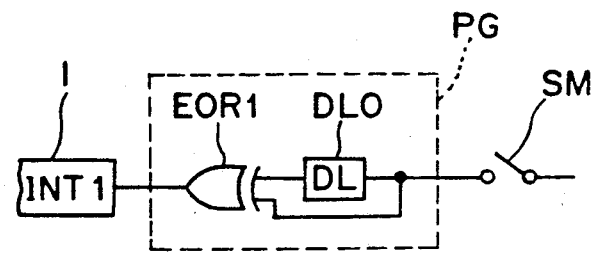
FIG. 4 is a circuit diagram showing a pulse generating circuit (PG) shown in FIG. 2.

The pulse generator PG is of a construction comprising, as shown in FIG. 4, a delay circuit DL0 and an exclusive OR circuit (hereinafter referred to as an EXOR circuit EOR1) and is so designed that an output from the main switch SM can be supplied to both of a first input terminal of the EXOR circuit EOR1 and an input terminal of the delay circuit DL0, an output from the delay circuit DL0 being applied to a second input terminal of the EXOR circuit EOR1 whereas an output terminal of the EXOR circuit EOR1 is connected with the interruption terminal INT1 of the microcomputer 1. In this construction, when the main switch SM is closed, that is, brought into the ON state, both of a low level signal indicative of the ON state of the main switch SM and a high level output signal from the delay circuit DL0 are inputted to the EXOR circuit EOR1 with the consequence that the EXOR circuit EOR1 generates a high level signal. When the low level signal indicative of the ON state of the switch is applied thereto after a delay time of the delay circuit DL0, the EXOR circuit EOR1 generates a low level signal. When the switch SM is subsequently opened, that is, brought into the OFF state, signals of a level state reverse to that described hereinabove are applied respectively and, accordingly, the EXOR circuit EOR1 generates a level signal whose state varies from, in order, low, high and low.

Reference character S1 represents a photo-taking ready switch which assumes on an ON state upon a first stroke of depression of the release button 100. When this switch S1 is switched from an OFF state to the ON state, the microcomputer 1 executes a program flow INT2 as will be described later with reference to FIG. 7. Reference character S2 represents a release switch which assumes an ON state upon a second stroke of depression of release button 100, and when this switch S2 is brought into the ON state under a predetermined condition, an exposure control is carried out. Reference character S3 represents a wind-up switch which assumes an ON state caused by completion of traveling of a trailing shutter curtain and assumes an OFF state when a release mechanism is charged or cocked in association with completion of winding-up operation of the wind-up motor M1.

Figure 5A:
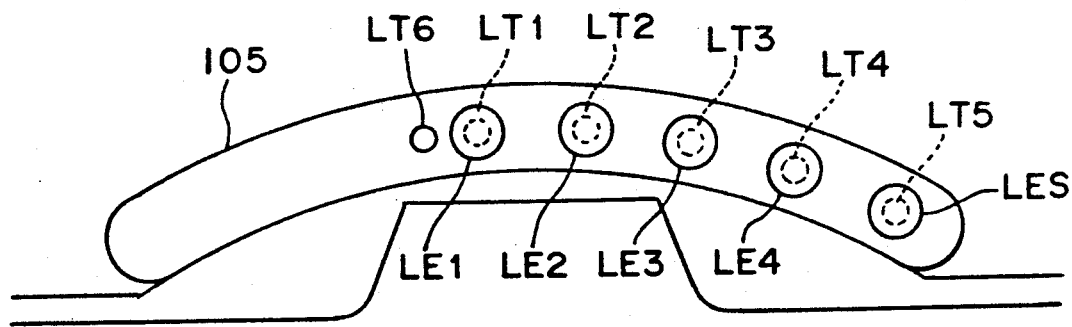
FIG. 5(A) is a diagram showing a terminal-to-terminal connection between the camera and the lens when the lens has been properly mounted on the camera of FIG. 1(A)
Figure 5B:
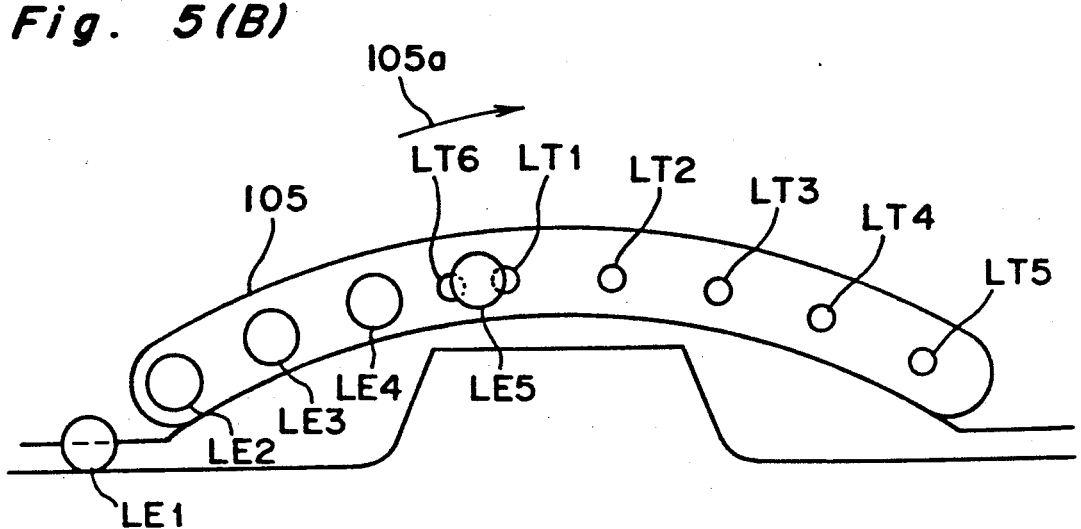
FIG. 5(B) is a diagram showing a terminal-to-terminal connection between the camera and the lens while the lens is being mounted on the camera of FIG. 1(A)

Reference character SL represents a lens mount switch which assumes an ON state, when the interchangeable lens is mounted, to permit the microcomputer 1 to execute a program flow INT3 as will be described later with reference to FIG. 6(C). The ON and OFF states of the lens mount switch SL will be discussed with reference to FIG. 5(A) and 5(B). The interchangeable lens (not shown) is provided with five terminals for electrically transmitting information to the camera, which five terminals are identified by LE1, LE2, LE3, L4 and LE5 in FIGS. 5(A) and 5(B). On the other hand, as respective terminals on the part of the camera, terminals LT1, LT2, LT3, LT4, LT5 and LT6 each depicted in a size smaller than any one of the terminals LE1 to LE5 on the part of the lens are provided. FIG. 5(A) illustrates a condition in which the lens has been properly mounted on the camera with the lens side terminals LE1 to LE5 connected with the camera side terminals LT1 to LT5, respectively. FIG. 5(B) illustrates a condition in which the lens is being mounted on the camera, and by turning the lens in a clockwise direction 105a, the condition shown in FIG. 5(A) can be attained. Let it be assumed that the camera side terminal LT1 is a grounded level terminal and a voltage pulled up through a resistor is outputted from a source of electric power in the camera to the camera side terminal LT6. When the condition of FIG. 5(B) is established while the interchangeable lens is being mounted on the camera, the terminals LT1 and LT6 are connected together through the lens side terminal LE5 thereby rendering the terminal LT6 to be of a grounded level. It is the lens mount switch SL which detects this condition, and this lens mount switch SL is constituted by the camera side terminals LT1 and LT6 in combination with the lens side terminal LE5. As has been explained with reference to FIG. 2, the microcomputer 1 is interrupted to execute a predetermined program flow INT3 when the switch SL is brought to the ON state (that is, when the terminal LT6 is rendered to be in a low level state).

Reference character SAF represents a switch for effecting a changeover between AF and MF. Reference character SM1 is a switch adapted to be brought into ON and OFF states in association with the main switch SM, and an electric power from a power source E1 can be supplied directly to the built-in flash device 18 through this switch SM1. Reference character SAV represents an exposure auto switch which is brought into an ON state when an exposure mode is set to an automatic mode. Reference character SFL represents a flash photo-taking switch when the photo-taking under flash lighting mode is selected.

Hereinafter, the power source and its associated arts will be described. Reference character E1 represents a battery which provides a power VDD and a power VCC to the whole of the camera and also provides a power V0 directly to the built-in flash device 18 through the switch SM1. Reference character C1 represents a back-up capacitor for backing up the microcomputer 1, and a diode D1 acts to prevent a charge stored in the back-up capacitor C1 from being discharged by a voltage drop of the battery E1 resulting in a large current flow in the motor M1, M2 or built-in flash device 18. From this back-up capacitor C1 an electric power VDD is supplied to respective pull-up resistors of the various switches, the microcomputer 1 and the counters CNT2 and CNT3. Reference character TR1 represents a power supply transistor for providing the power source Vcc to other devices than the devices mentioned above.

The operation of the camera circuit so constructed as hereinabove will be described with reference to the flow charts for the microcomputer 1 which are shown in FIG. 6, et seqq.

As soon as the battery E1 is mounted, the power VDD is provided to a power on reset resistor RR and a capacitor CR both shown in FIG. 2 and a signal whose level state changes from high to low is applied to a reset terminal RE of the microcomputer 1. In response to this signal, the microcomputer 1 executes a reset routine (RESET) shown in FIG. 6(A). At the outset, interruption to the whole interruption flows including this program flow is inhibited, all of the flags and registers are reset and all of the output terminals and output ports are rendered to be in a low level state (#0, #5). Then, when the photo-taking ready switch S1 is brought into the ON state, a lens back flag LBF indicative of retraction of the photo-taking lens assembly is reset (#10). This flag LBF is so operable that, in the event that the lens extension position and the contents of the counter CNT2 then monitoring it do not come to match with each other, the lens can be retracted to the extreme position for a moment to permit the counter CNT2 to be reset to accomplish an initial setting so that the lens extension position and the contents of the counter can be eventually matched with each other. Then, a decision is made to determine whether or not the main switch SM is brought into the ON state in terms of whether or not an input terminal IP6 is in a low level state (#15), and if the result of decision indicates the ON state, the program flow proceeds to step #40. On the other hand, if it is not the ON state, interruption to (INT1) by the main switch SM is enabled, and a stand-by flag STBYF indicative of a stopped condition of functions of the microcomputer 1 is set thereby stopping functions of the microcomputer 1 (#20, #25, #30).

Figure 6A:
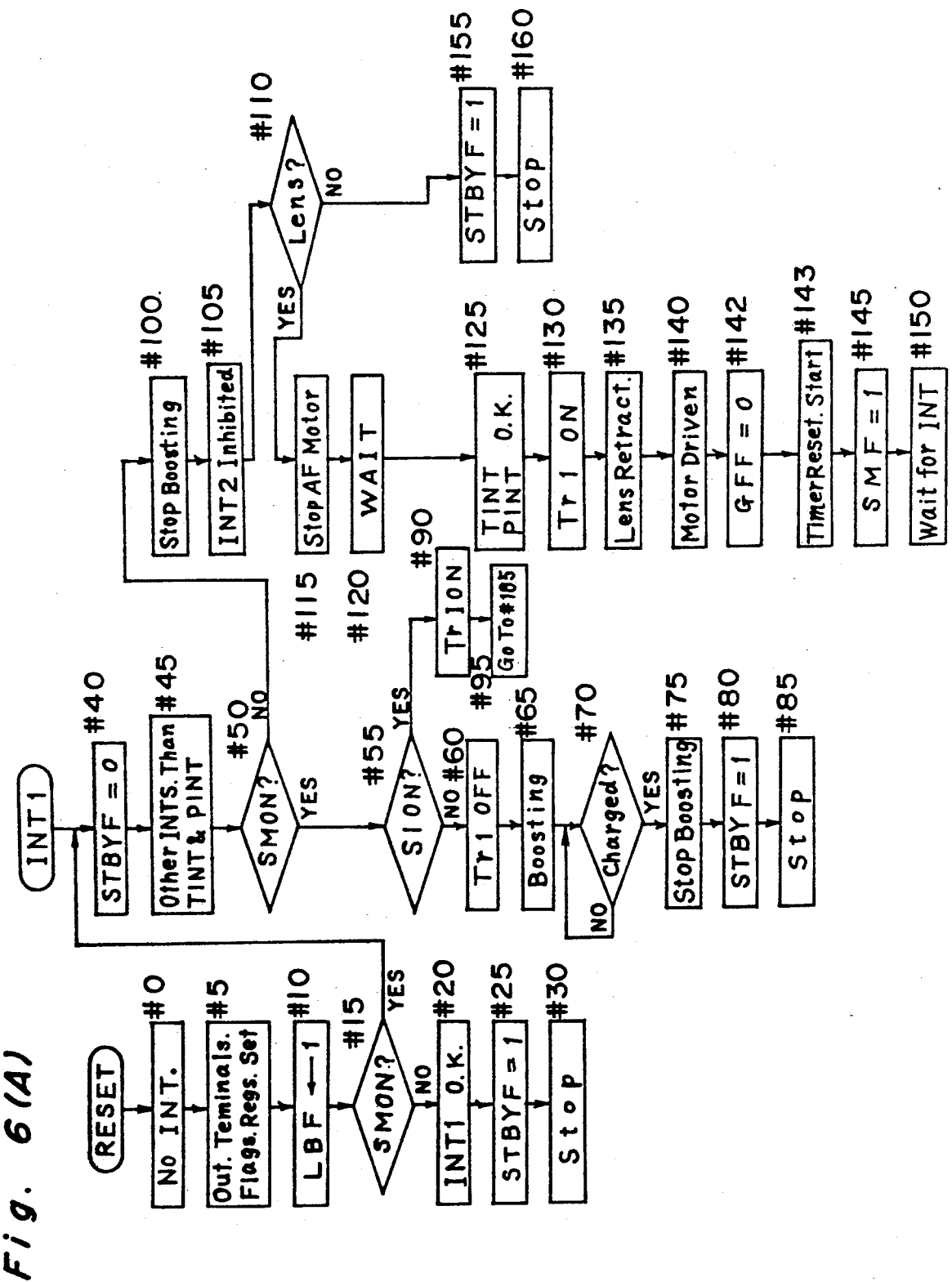
FIG. 6(A) is a flow chart showing a flow (INT1) executed when a main switch (SM) is switched on and a pulse is inputted to an interruption terminal (INT1) of a microcomputer.

Then, when the main switch SM is brought into the ON state or the OFF state while the reset routine (RESET) shown in FIG. 6(A) is not executed, or when the result of decision at step #15 indicates that the main switch SM has been brought into the ON state, a program flow from step #40, et seqq. is executed. At step #40, the stand-by flag STBYF is reset, and interruptions are enabled other than a timer interruption TINT which is interrupted at an interval of a predetermined time and an interruption PINT which is effected by an encoder pulse which monitors the rotation of the motor (#40, #45). Thereafter, a decision is made to determine the state of the main switch SM, and if the main switch SM is in the ON state and in the OFF state, steps #55 and #100 take place, respectively. When the main switch SM is judged as in the ON state, a decision is made to determine if the photo-taking ready switch S1 is in the ON state, making reference to the input terminal IP2 (#55), but if it is in the ON state, the program flow proceeds to step #185 after the terminal OP1 has been rendered to be in a high level state for the purpose of switching the power supply transistor Tr1 on (#90, #95). On the other hand, where the photo-taking ready switch S1 is in the OFF state, the terminal OP1 is rendered to be in a low level state for the purpose of switching the power supply transistor Tr1 off and, a terminal OP14 (See FIG. 8) is rendered to be in a high level state to initiate the boosting of the built-in flash device (IFL) 18 (#60, #65). The microcomputer 1 waits for a charge completion signal from the built-in flash device (IFL) 18 and, when the charge completion signal is inputted to the microcomputer, the terminal OP14 is rendered to be in a low level state to set the stand-by flag STBYF to stop (#70 to #85).

Figure 8:
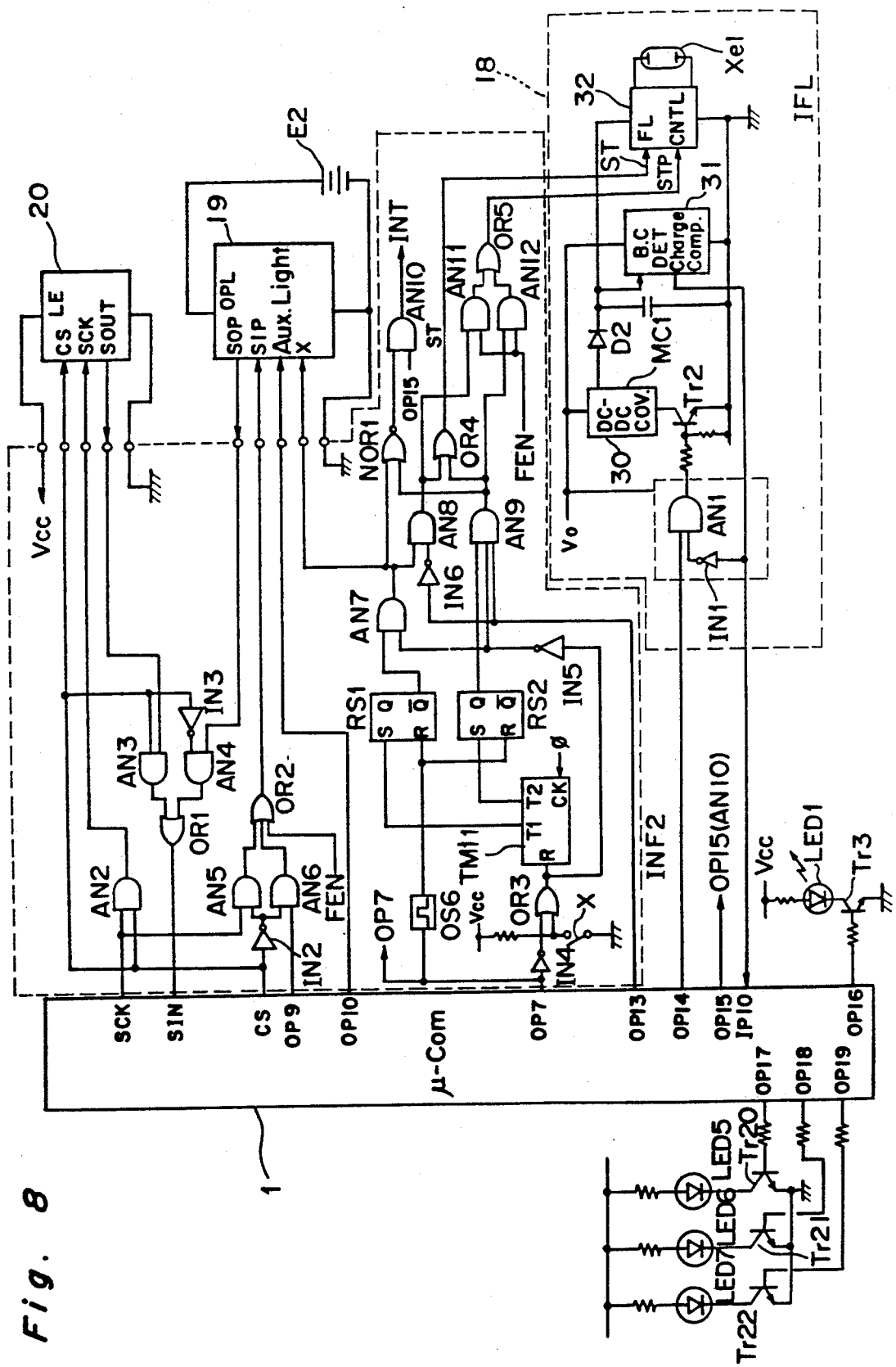
FIG. 8 is a circuit diagram showing an interface circuit IF2 of FIG. 2 and a circuit of a built-in flash device (IFL)

To describe the built-in flash device (IFL) 18 with reference to FIG. 8, the built-in flash device 18 comprises a boosting circuit or a DC-DC converter 30, a transistor Tr2 for controlling the boosting circuit 30, an AND circuit AN1, an inverter IN1, a main capacitor MC1 for accumulating flash energies through a rectifying diode D2, a charge voltage detecting circuit 31 for detecting the voltage of the main capacitor MC1, a flashing unit Xe1, and a flash control circuit 32 operable in response to a flash initiating signal and a flash terminating signal, both fed from an interface circuit INF2, to initiate and to terminated the flashing. The charge voltage detecting circuit 31 applies a high level charge completion signal to both of a terminal IP10 of the microcomputer 1 and the inverter IN1 when the voltage of the main capacitor MC1 attains a value higher than a predetermined voltage. The AND circuit AN1 when applied with a boosting interruption signal which is a low level signal fed from a terminal OP14 of the microcomputer 1, or the charge completion signal fed from the inverter IN1 generates a low level signal to the base of the transistor Tr2 for terminating the boosting, causing the transistor Tr2 to be switched off to terminate the boosting circuit 30.

Referring back to FIG. 6(A), where the main switch SM is brought to the OFF state at step #50, a terminal OP14 is rendered to be in a low level state for terminating the boosting, and then the interruption (INT2) resulting from the ON state of the photo-taking ready switch S1 is inhibited (#100, #105). Then, based on information from the lens as will be described later, a decision is made to determine if the lens has not yet been mounted. If the lens has not yet been mounted, the stand-by flag STBYF is set to terminate (#110, #155, #160). On the other hand, if the lens has been mounted, a signal necessary to stop an AF motor M2 is outputted to the motor control circuit 11 (#115). The microcomputer 1 after having waited for the passage of a time required for the motor to be stopped (#120) permits the timer interruption (TINT) and the encoder interruption (PINT) (#125). Then, the power supply transistor Tr1 is switched on, a signal for driving the motor M2 in a direction required for the lens to be retracted is outputted, a flag GFF is reset, a timer for the timer interruption (TINT) is reset to start, a main switch flag SMF indicative of having been in the program flow for the main switch SM is set, followed by a wait condition during which interruption is waited for (See the subsequent description concerning the lens control) (#130 to #150). In this way, in the event that the main switch SM is brought into the OFF state, the lens is retracted to maximize the compactness to permit a easy transportation thereof.

With reference to the flow chart shown in FIG. 7 and the circuit shown in FIG. 8, an interruption (INT2) which takes place when the photo-taking ready switch S1 is brought into the ON state while the main switch SM is in the ON state will be described. At the outset, the microcomputer 1 inhibits the timer interruption (TINT) and the encoder interruption (PINT) and resets the stand-by flag STBYF (#165, #170). For the purpose of preventing noises to a circuit which deals with a weak signal, such as the light measuring circuit 2 and others, the terminal OP14 is rendered to be in a low level state to terminate the boosting (#175). The microcomputer 1 then outputs a display data (000H) for the total lights-out, renders the terminal OP1 to be in a high level state to switch the power supply transistor Tr1 on, and outputs a light measurement initiating signal to the light measuring circuit 2 to initiate the light measurement (#177, #180, #185). The microcomputer 1 then performs a function of receiving data from the lens and the external flash device 19. For this purpose, a variable N is initially set, a chip select terminal CS is rendered to be in a high level state to inform the lens of a serial data transfer (SIO) command (#190, #200). Thereby, the microcomputer 1 generates from a serial clock terminal SCK eight clocks to a terminal SCK of a circuit 20 inside the lens, and lens data fed from a terminal SOUT of the circuit 20 inside the lens in synchronism with the set-up of this clock is taken in a terminal SIN in synchronism with the set-down of the clock, a byte of data being inputted per command (#205). Thereafter, the variable N is added with 1, followed by a decision to determine if this has become 7. If it has become 7, it is deemed that all necessary data have been inputted and, therefore, the program flow proceeds to the next step, rendering the chip select terminal CS to be in a low level state for the purpose of indicating termination of the data transfer, but if it is a value smaller than 7, the program flow returns to step #205 to effect the serial data transfer (SIO) (#210 to #220). (Reference may be had to the Japanese Laid-open Patent Publication No. 59-188622 for the details thereof.)

The lens data so inputted include:
(1) Data descriptive of the mounting of the lens,
(2) Data descriptive of the focal length of the lens,
(3) The minimum aperture value (AV0) and the maximum aperture value (AVmax) of the lens,
(4) A coefficient data for the conversion of the defocus amount into the total number of revolutions of the AF motor,
(5) The pulse number data required from the lens retracted condition (infinity distance setting) to the lens extended condition,
(6) Data descriptive of the availability of focus detection or the availability of AF, and
(7) Data descriptive of whether or not it is a macro-lens.

Then the microcomputer 1 renders the terminal OP9 to be in a high level state for a predetermined time (T1) to inform the external flash device 19 of the serial data transfer command (#225). Subsequently, the serial data transfer transmission the same operation as when the data are taken in from the lens is carried out to input one byte data from the external flash device 19 (#230). The contents of the data include:
(1) The maximum flash emitting amount data (5 bits),
(2) Data descriptive of the charge completion signal (1 bit),
(3) Data descriptive of the mounting of the external flash device (1 bit), and
(4) Data descriptive of the bounced photo-taking (1 bit).

At step #231, the microcomputer 1 undergoes a decision to determine if a low contrast flag LCF, which is set when AF detection is judged impossible as a result of scan at the time of a low contrast, is set or not. If the low contrast flag LCF is set, a display of the impossibility of AF detection is effected and the program flow proceeds to step #485 without carrying out any focus detection (#232, #233). If it is not set, a decision is made to determine if the lens has been mounted making reference to inputted data, and if the lens has not yet been mounted, the program flow proceeds to step #925, but if the lens has been mounted, a decision is made to determine whether it is in the AF mode or in the manual focusing mode by detecting a signal at the input terminal IP5 (#240). If it is in the AF mode, a decision is made on the basis of the inputted lens data to determine if the mounted lens is an AF-suited lens (AFOK lens), and if it is in the AF mode and the mounted lens is the AF-suited lens, the program flow proceeds to step #250, or otherwise, the program flow proceeds to step #310. The non-AF-suited lens referred to above includes:
(1) Lens whose minimum aperture value AVo is greater than a predetermined value (Where a converter is mounted, lens whose minimum aperture value including the converter is greater than a predetermined value),
(2) Lens having its effective minimum aperture value tending to become greater than a predetermined value as a result of zooming or extension of the lens (Where a converter is mounted, the same as (1) above),
(3) Cata-dioptric or mirror lens, and
(4) Lens provided with a macro-mechanism and capable of performing AF only by driving a front lens element thereof.

With the lens (1) to (3), the commercially available focus detecting device cannot work for the focus detection, but with the lens (4), AF cannot be always accomplished with the front lens element moved although the focus detection is possible.

Where the non-AF-suited lens of any one of the above described types is mounted, an AF-possible flag AFOKF indicative of the AF capability is reset to show that the AF capability is not available. At step #250, a decision is made to determine if AF-possible flag AFOKF is set or not, and if it is not set, both of a lens back flag LBF and the AF-possible flag AFOKF are set (#255, #260), followed by step #270. If the AF-possible flag AFOKF is set, the program flow immediately proceeds to step #270. At step #270, a decision is made to determine if the counter CNT3 has counted the encoder pulses exceeding a predetermined value making reference to an input terminal IP7. When the input terminal IP7 is not in the high level state, the lens back flag LBF is determined at step #275. If the terminal IP7 is in the high level state at step #270 or the lens back flag LBF is set at step #275, the program flow proceeds to step #280 to carry out a control for retracting the lens to the extreme position. At the outset, both a lens retraction signal and a motor drive signal are outputted to the motor control circuit 11, a flag SIF indicative of executing a flow for the photo-taking ready switch S1 is then set, both of the timer interruption (TINT) and the encoder interruption (PINT) are enabled, the timer is reset and started, and the program flow proceeds to step #485 (#280 to #305).

Hereinafter, the case will be described wherein the lens is to be retracted when the lens back flag LBF is set or when the counter CNT3 overflows while the photo-taking ready switch S1 has been brought into the ON state.

(a) In the event that the counter CNT3 overflows, as hereinbefore described, the difference between the extension amount to be driven for one pulse for driving the lens and the actual lens drive amount, or the error resulting from the play in the coupler, is accumulated to increase during the continuous drive and, therefore, the lens is retracted for avoiding this problem.

(b) The lens back flag LBF is set (1) when the battery E1 is mounted, (2) when the lens is mounted as will be described later, and (3) when the manual focus adjustment (MF) is switched over to the AF. This is by the following reason. Specifically, in the case of (1) above, the contents of the counter CNT3 storing the amount of extension will get odd when the battery E1 is removed. In the case of (2) When the lens is removed from the camera, there is a possibility that a focusing portion (an extension operating portion) of the lens may be moved, and this will not be detected with a device for monitoring the rotation of the motor M2 inside the camera by the use of an encoder and, therefore, when the lens is mounted on the camera, it occurs as a matter of course that the lens extension amount and the contents of the counter CNT3 differ from each other. (3) In the case of the manual focus adjustment (MF), as hereinabove described, the coupler in the camera is disengaged from a drive mechanism in the lens in association with the switching of the switch SAF onto the manual focus adjustment. Accordingly, when the lens is manually focused, the motor M2 does not rotate and the lens extension amount and the contents of the counter CNT3 differ from each other. It is to be noted that, when the coupler in the camera and the drive mechanism in the lens are coupled with each other, a relatively great force is required to move the extension operating portion of the lens and this cannot be accomplished in a usual manner.

In view of the foregoing reasons, the lens is retracted to make proper both of the lens extension amount and the contents of the counter CNT3, at the timing recommendable to be when the photo-taking ready switch S1 is brought into the ON state. The reason for this is that if the lens retraction is carried out during the photographing the photo-taking would occur without being focused, or if the lens retraction is carried out during the preparation of the photo-taking (while the switch S1 is in the ON state), the lens is abruptly retracted and the photographer may consider it a trouble or may miss a decisive moment. Also, since AF is generally initiated in response to ON of the switch S1, the forced retraction of the lens effected at this time will make the photographer consider it as a result of AF and can be automatically effected without the photographer knowing it.

Referring back to FIG. 7(A), at steps #270 and #275, when the count of the counter CNT3 does not overflow and the lens back flag LBF is not set, the program flow proceeds to step #320.

On the other hand, at step #240 or #245, when the manual focus adjustment (MF) mode is selected or when the lens not suited for AF is mounted, the microcomputer 1 proceeds to step #310 to reset the AF-possible flag AFOKF and then to determine if it is a lens of a type capable of detecting the focus (#315). The lens of the type capable of detecting the focus, that is, the acceptable lens, means a lens other than the lenses (1) to (3) which are not suited for AF. In the event that a lens incapable of detecting the focus is mounted, a flow of focus detection is skipped to #485. In the event the lens capable of detecting the focus is mounted, a decision is made to determine if an in-focus flag IFF is set (#315 to #320). Should the in-focus flag IFF is set, the flow of focus detection and a flow of light measurement are skipped to step #650 (#325), but if this in-focus flag INF is not set, the flow of focus detection starting from step #330 et seqq. shown in FIG. 7 (B) takes place.

At the outset, a decision is made to determine if a flag ALF for issuing a command for effecting an auxiliary light emission is set, and if it is set, an auxiliary light emitting flag ALMF is set, followed by a decision to determine if the external flash device 19 is mounted (#330 to #340). It is to be noted that, in the instance now under discussion, the external flash device 19 is a type having an auxiliary light emitter for the purpose of focus detection. Should the external flash device 19 is mounted, a high level signal for instructing the auxiliary light emission is applied from a terminal OP10 to the external flash device 19 at step #345, but should the external flash device 19 is not mounted, a high level signal for causing a built-in auxiliary light emitter (LED1) to be emitted is applied from a terminal OP16 to the built-in flash device 18 at step #355, followed by the start of an integrating operation of the charge-coupled device 10 (#360). It is to be noted that, although the possibility of emitting two auxiliary light simultaneously can be contemplated, arrangement has been made to cause only one auxiliary light to be emitted so that the consumption of the electric power of the battery E1 in the camera can be minimized to increase the number of shootings accomplished with the camera. It is also to be noted that, since the auxiliary light of a type having fitted in front thereof a filter having a random pattern, there may be a possibility that, if the both are simultaneously emitted, the random pattern will not be established. (With respect to this random pattern, see the Japanese Patent Application No. 59-261194.)

At step #330, if the auxiliary light emission commanding flag ALF is not set, the auxiliary light emission flag ALMF is reset at step #350 and then a high level signal is outputted to a terminal OP2 at step #360, as is the case with that during the auxiliary lighting, to initiate the integrating operation of the charge-coupled device 10. A timer for measuring the integrating time is then started at step #370, followed by a decision to determine if a signal indicative of the completion of the integration is inputted from the monitor circuit 8 to the terminal IP0 of the microcomputer 1 (#375). Should the signal indicative of the completion of the integration is inputted to the terminal IP0, the microcomputer 1 generates from a terminal OP3 to the interface circuit INF1 a shift pulse signal commanding the termination of the integration (#375, #385). On the other hand, if no integration terminating signal is outputted from the monitor circuit 8, a shift pulse signal is generated after the timer which has been started as hereinabove described has counted 20 msec. in a manner similar to the case wherein the integration terminating signal is inputted (#380, #385). Then, in order to terminate the auxiliary light emission, the microcomputer 1 renders terminals OP10 and OP16 to be in a low level state at step #390 and then digital-converted data of the charge-coupled device 10 can be taken in to calculate the defocus amount Δε (#395, #400). As a result of this calculation, and if the focus detection is possible, a decision is made to determine if the absolute value |Δε| of the defocus amount is smaller than a predetermined value K1 (#405, #410). This predetermined value K1 represents a width which can be regarded as falling in an in-focus condition. If the absolute value |Δε| of the defocus amount is smaller than the predetermined value K1, it is deemed focused and an in-focus display is then effected, followed by a decision to determine the AF-possible flag AFOKF. If the AF-possible flag is set, an in-focus flag IFF is set with a motor stopping signal outputted to the motor control circuit 11 (#465 to #480), the program flow then proceeds from step #485 to a flow for the exposure calculation. At step #410, when the absolute value |Δε| of the defocus amount is equal to or greater than the predetermined value K1, a decision is made to determine if this defocus amount Δε is positive, and if it is positive, it means a direction in which the lens should be extended and, therefore, after a high level signal indicating a count-up is outputted from a terminal OP4 to the counter CNT2, a display of the direction is effected (#415 to #425). On the other hand, if the defocus amount is negative, it means a direction in which the lens should be retracted and, therefore, after a low level signal indicating a count-down is outputted to the counter CNT2, a display of the direction is effected (#430, #435). It is to be noted that concrete examples of the in-focus display and the direction display will now be described with reference to Table 7. When in the in-focus condition, only the terminal OP17 is rendered to be in a high level state, causing a green light emitting diode LED5 to be lit. When in a defocus condition in the direction of extension, only the terminal OP18 is rendered to be in a high level state, causing a red light emitting diode LED6 to be lit. Finally, when in the defocus condition in the direction of retraction, only the terminal OP19 is rendered to be in a high level state, causing a red light emitting diode LED7 to be lit while the direction of an arrow is reversed with respect to that during the extension.

Figure 7A:
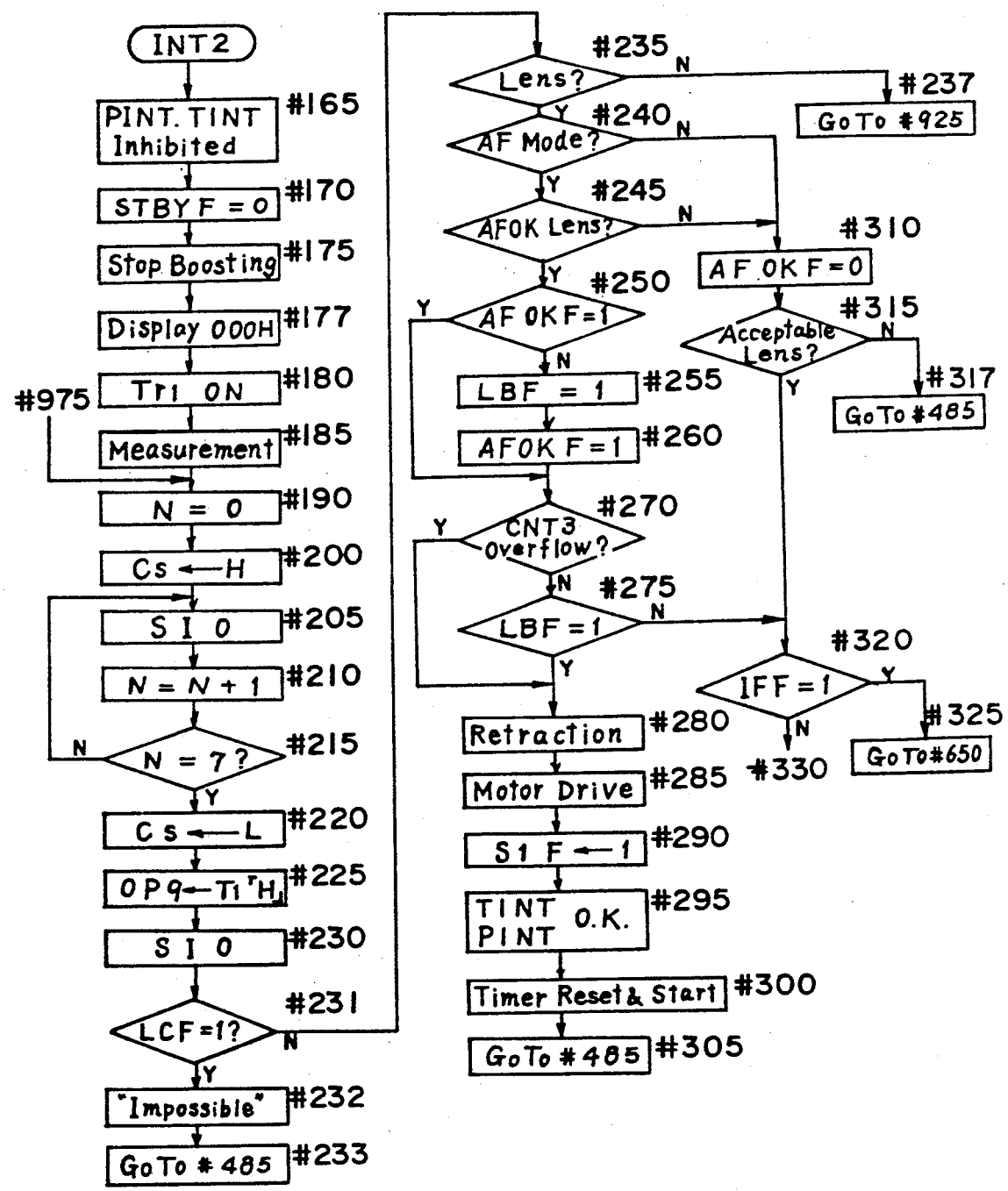
FIGS. 7(A), 7(B), 7(C), 7(D), 7(E), 7(H), 7(I) and 7(K) are flow charts showing a flow (INT2) executed when a pulse is inputted to an interruption terminal (INT2) of the microcomputer.
Figure 7B:
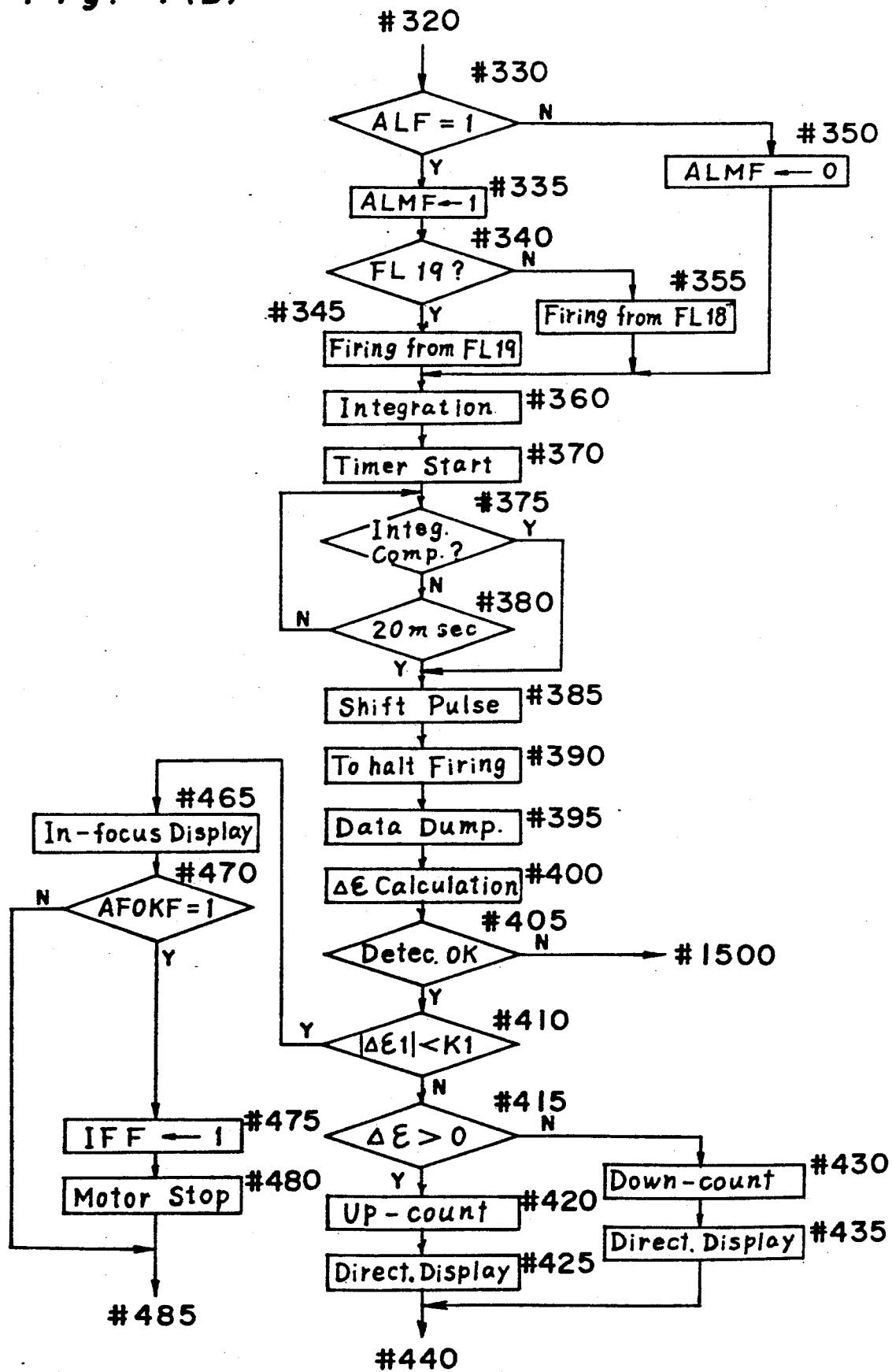
Figure 7C:
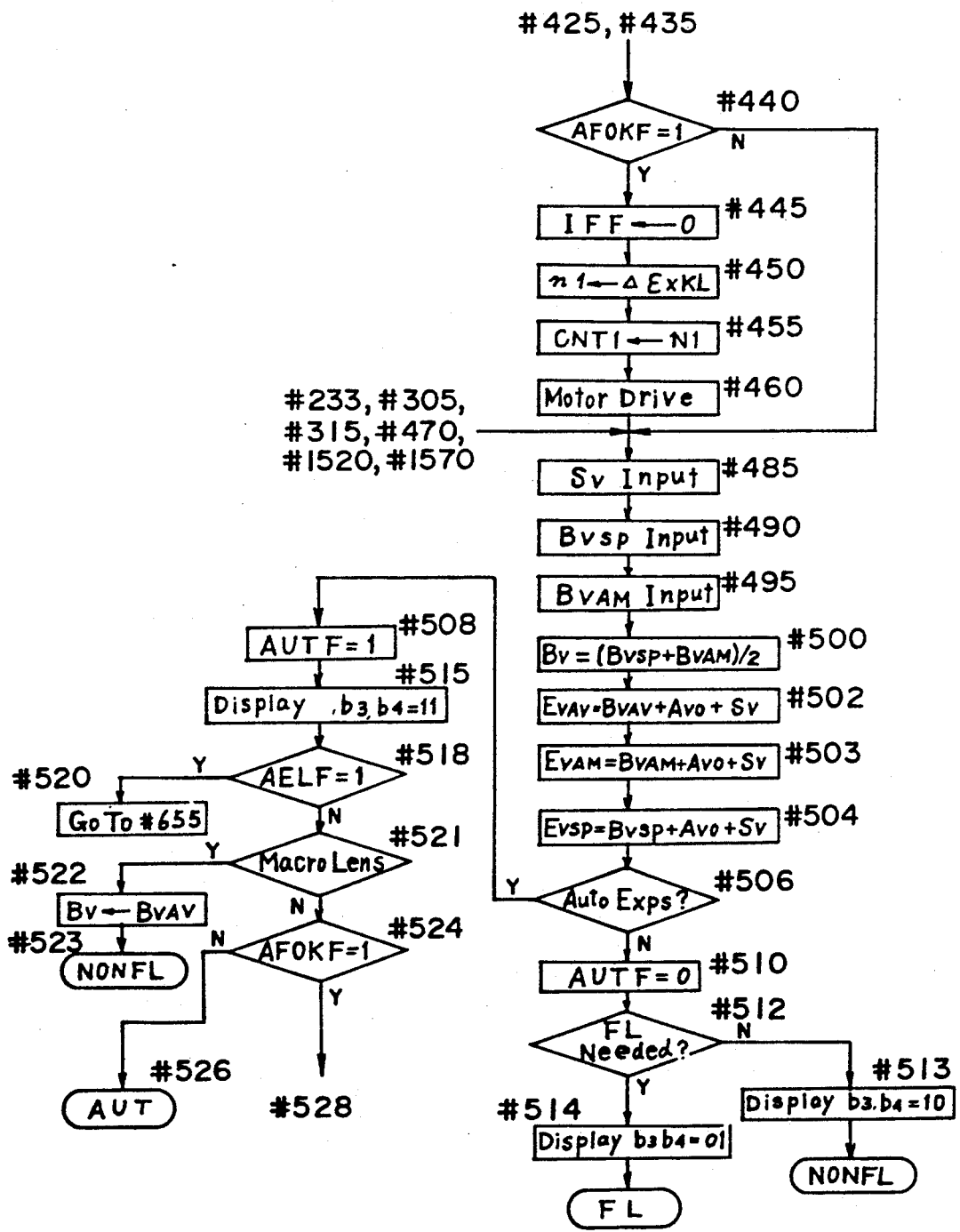

Then, at step #440 shown in FIG. 7(C) a decision is made to determine the AF-possible flag AFOKF, and if it is not set, the program flow proceeds to step #485 for the exposure calculation. On the other hand, if the flag AFOKF is set, the in-focus flag IFF is reset and then the total number of revolutions n1 is obtained by multiplying the defocus amount Δε by a conversion coefficient KL used to convert the defocus amount into the number of revolution of the motor, which is in turn outputted to the counter CNT1, and signal for driving the motor M2 in a direction corresponding to the defocusing direction is outputted to the motor control circuit 11, followed by the execution of the exposure calculating flow (#445 to #460).

Figure 7D:
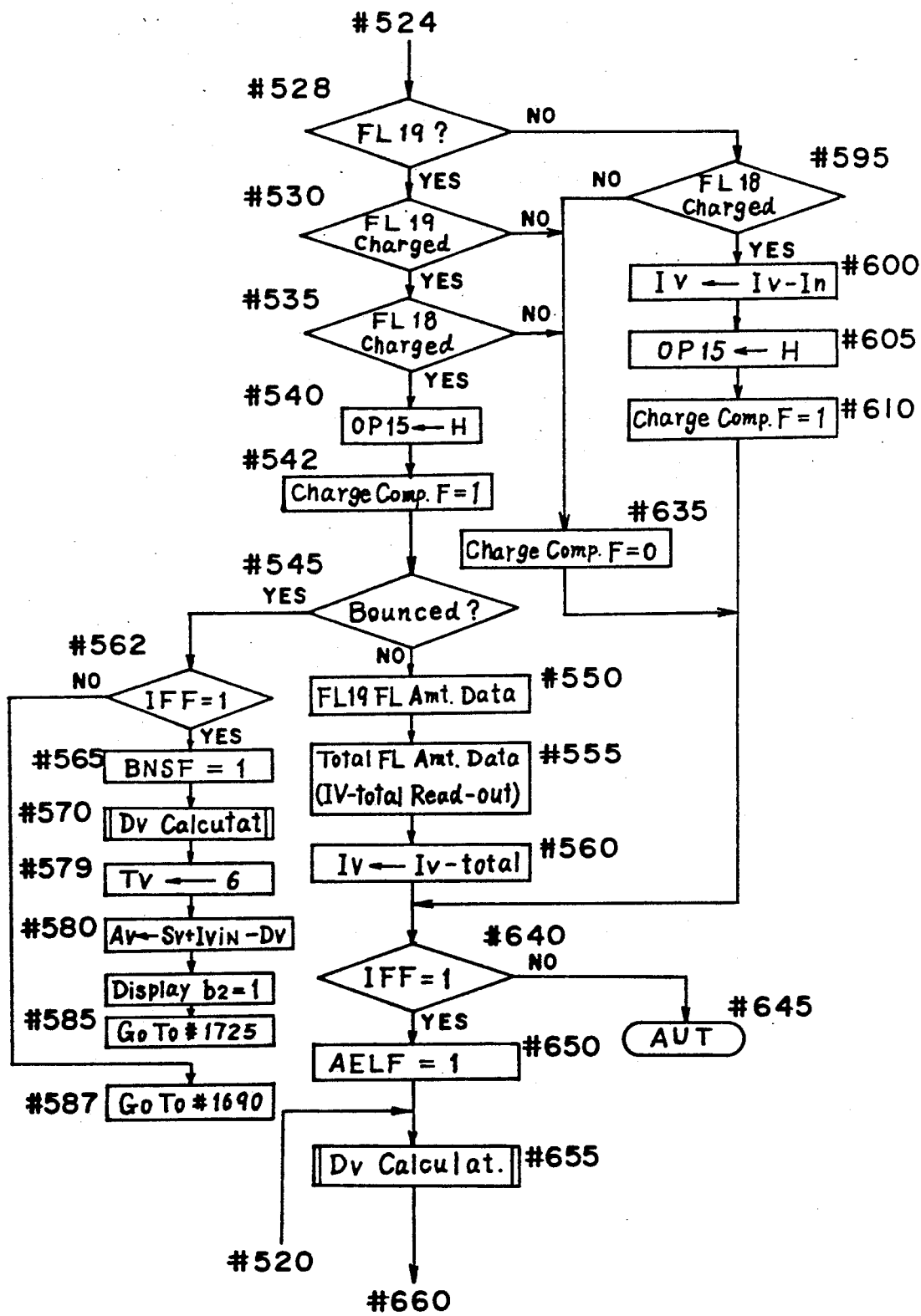
Figure 7E:
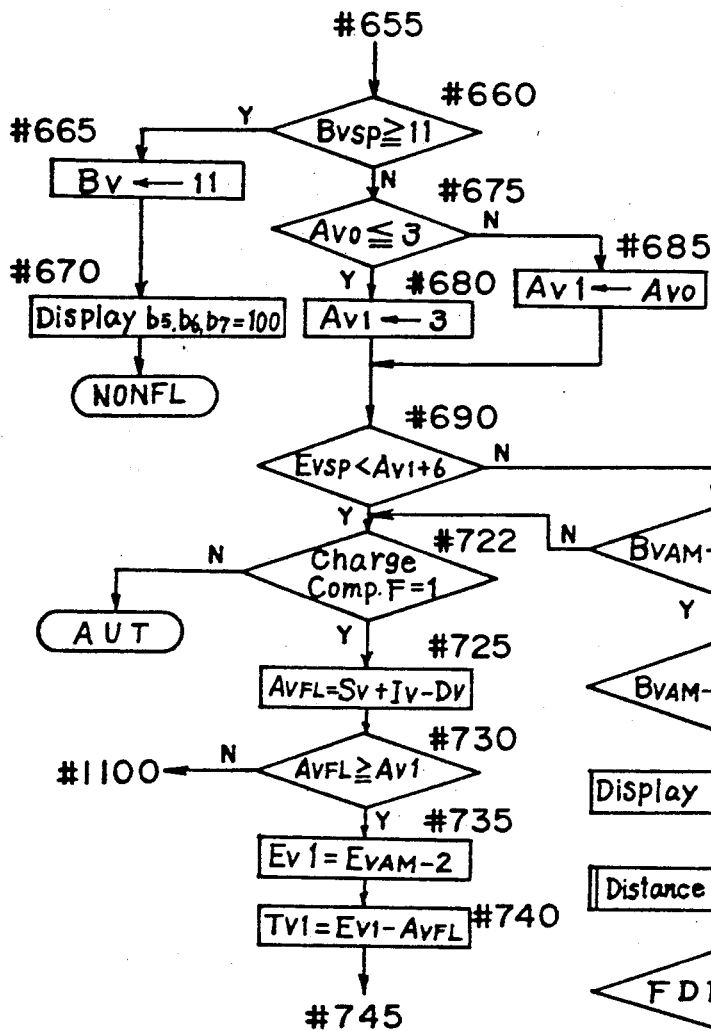
Figure 7F:
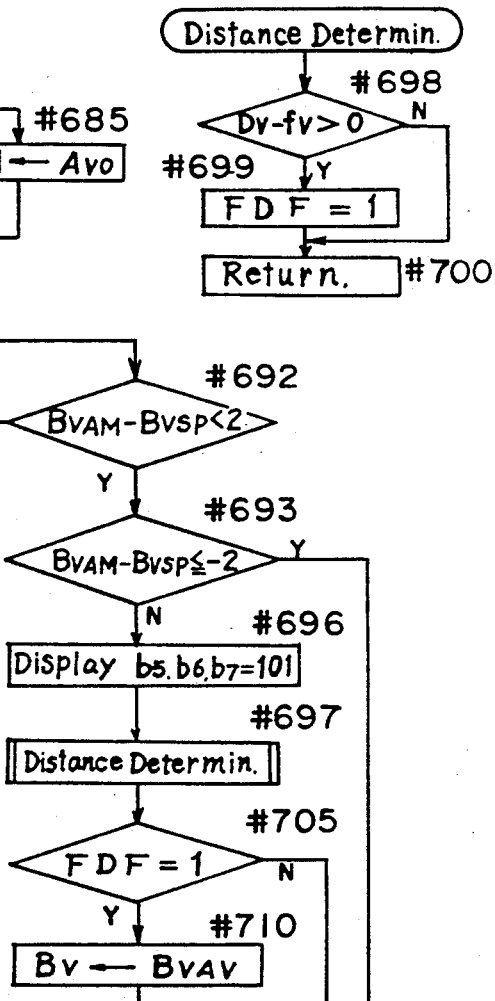
FIG. 7(F) is a flow chart for the determination of a distance which is executed at step #697 shown in FIG. 7(E)
Figure 7G:
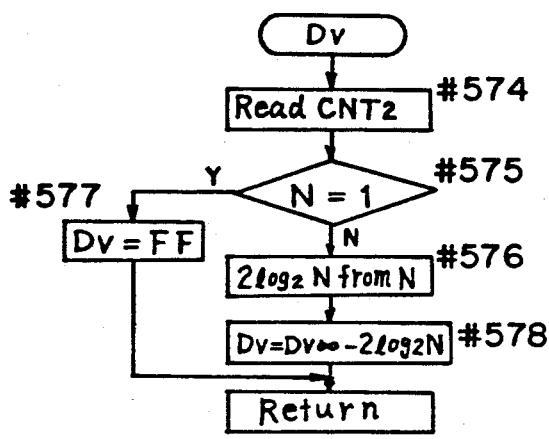
FIG. 7(G) is a flow chart for calculating a parameter (DV) corresponding to the distance, which is executed at step #655 shown in FIG. 7(D)
Figure 7H:
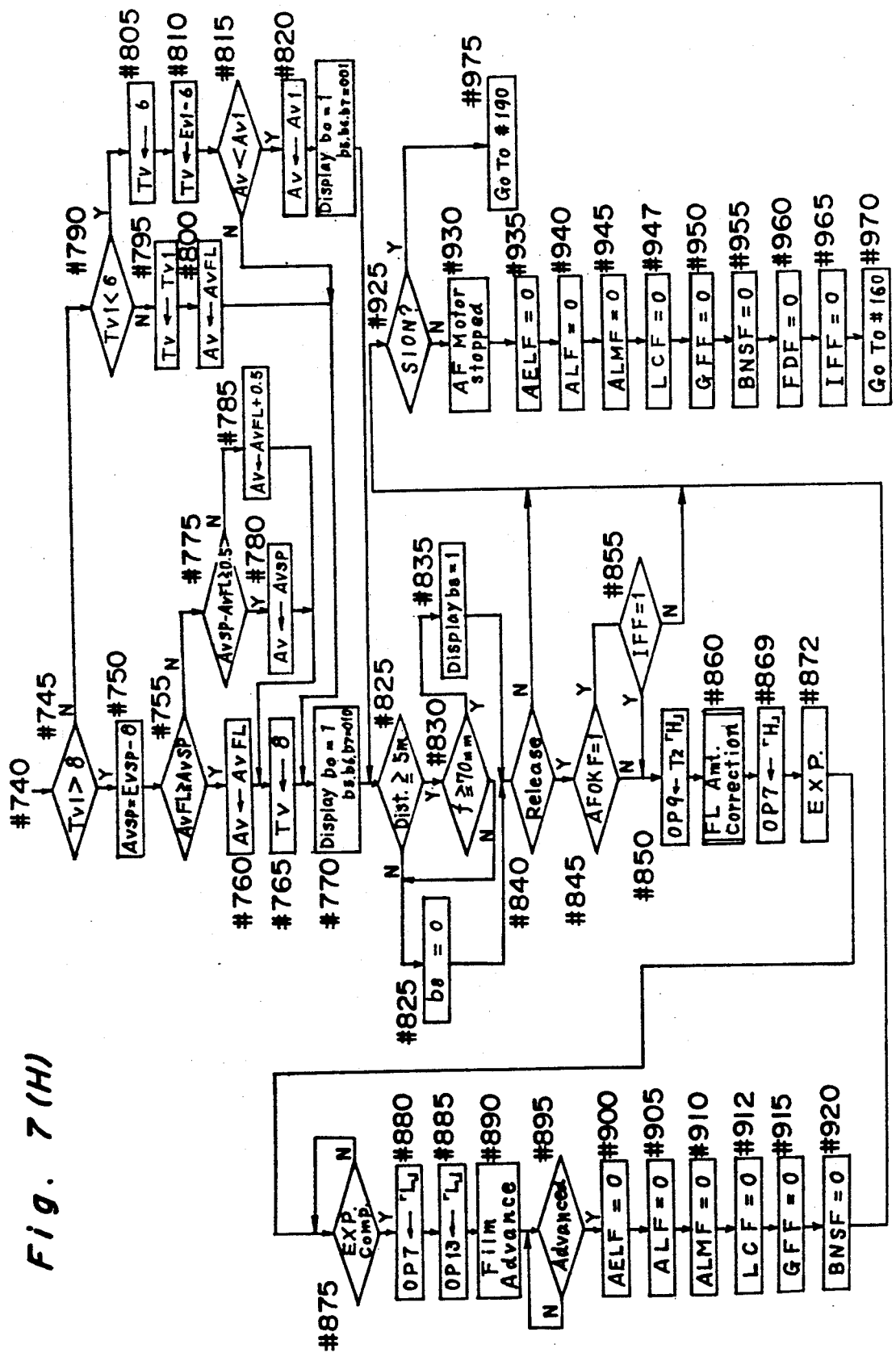
Figure 7I:
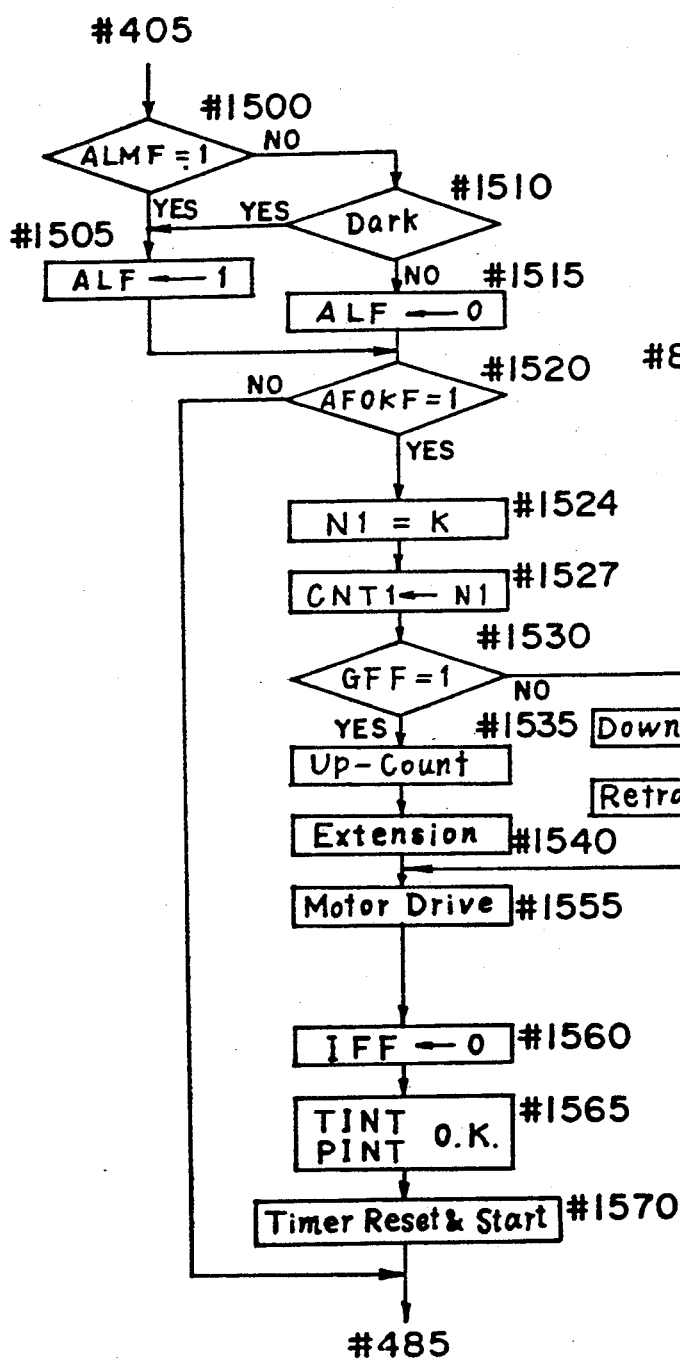

If it is determined at step #405 shown in FIG. 7(B) that the focus detection is impossible, the program flow proceeds to step #1500 shown in FIG. 7(I). At step #1500, a flag ALMF indicative of the emission of the auxiliary light is determined, and if it is set, or when the target object is dark even though it is not set, the auxiliary light emission commanding flag ALF is set, followed by step #1520 (#1500 to #1505). The determination that the target object is dark can be determined by the detection of a signal outputted from the monitor circuit 8 to the terminal IP1. Where at step #1510 the target object is deemed not dark, the auxiliary light emission commanding flag ALF is reset, followed by step #1520. In the event that the AF is possible (AFOKF=1), a control of a low contrast scan as will be subsequently described is carried out. In the first place, a value K far greater than the number of revolutions driven during a period of time required to accomplish the focus detection is entered in the total number N1 of revolutions and then outputted to the counter CNT1 (#1524, #1527). Whether or not a flag GFF indicative of the extension is set is determined at step #1530, and if it is not set, a low level signal indicative of the count-down is outputted to the counter CNT2 and a retraction signal is outputted to the motor control circuit 11 to drive the motor M2 in the retraction direction, but if it is set, a high level signal indicative of the up-count is outputted to the counter CNT2 and an extension signal is outputted to the motor control circuit 11 to drive the motor M2 in the extension direction (#1530 to #1555). Then, the in-focus flag IFF is reset, both of the timer interruption TINT and the encoder interruption PINT are permitted, a timer for the timer interruption is reset and started, followed by step #485 from which the exposure calculation flow starts. If the AF is not possible at step #1520 (AFOKF=0), step #485 is immediately followed by the exposure calculation flow.

During the execution of the exposure calculation flow starting from step #485 shown in FIG. 7(C), the film speed SV expressed by the film sensitivity setting circuit 6 according to the APEX system, the brightness value BVSP at the spot area expressed by the light measuring circuit 2 according to the APEX system, and the brightness value BVAM at the entire screen except for the spot area expressed by the light measuring circuit 2 according to the APEX system are inputted to determine an average brightness value BVAV (#485 to #500). Then, the microcomputer 1 makes reference to the minimum aperture value AVo of the lens, the film sensitivity SV and the brightness values BVAV, BVAM and BVSP to determine an exposure value EVAV relative to the average brightness, an exposuee value EVAM excluding the spot area and an exposure value EVSP relative to the spot area (#502 to #504). Whether or not the exposure mode is set in an automatic mode is determined depending on the level of the terminal IP11, and in the case of the automatic mode, an auto flag AUTF is set, and a display data b3b4=11 is set, followed by step #518. If it is not in the automatic mode, the auto flag AUTF is reset and a decision is then made in reference to the level of a terminal IP12 to determine whether or not the photo-taking under flash lighting mode is established. If it is in the photo-taking under flash lighting mode, the display data b3b4=01 is set, followed by a flow (FL) for the photo-taking under flash lighting, but if it is not, the display data b3b4=10 is set, followed by a flow (NONFL) for the photo-taking under natural lighting. When the output for the display data is to be specified, a signal whose specific bits (b3 and b4 in the illustrated instance) vary is outputted.

At step #518, if an AE lock flag AELF for retaining the brightness value is set, the program flow proceeds to step #655, but if it is not set under auto exposure mode, a decision is made at step #521 to determine whether or not the macro lens is mounted and, if the macro lens is mounted, the program flow proceeds to the photo-taking under natural lighting flow NONFL with the use of the average brightness BVAB (#518 to #523). Should the macro lens be not mounted and if distance information DV cannot be inputted, that is, when the AF-possible flag AFOKF is not set, the program flow proceeds to the flow AUT for the auto exposure mode (#524, #526).

Hereinafter, the above mentioned three exposure modes will be described.

Figure 9:
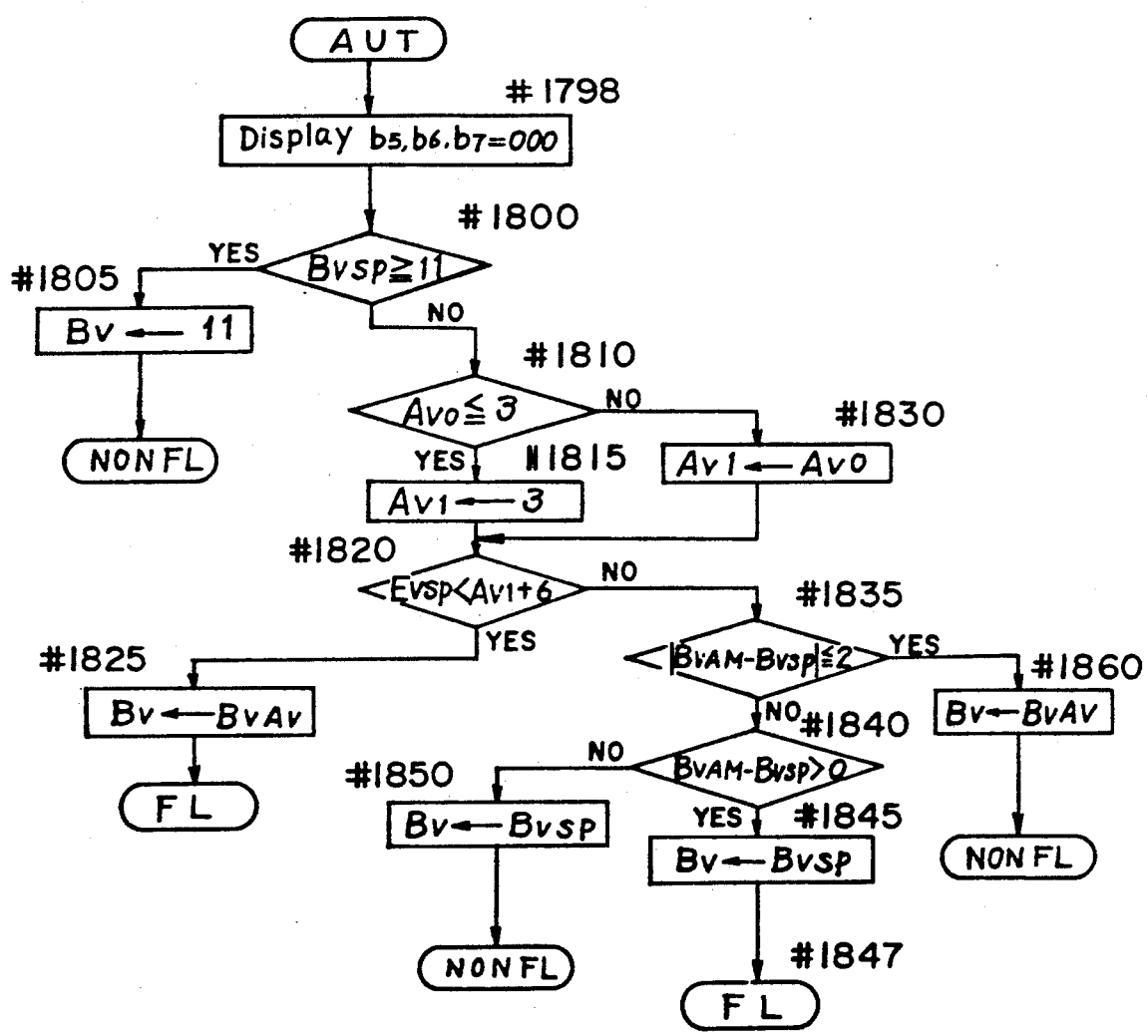
FIG. 9 is a flow chart showing a flow (AUT) of an auto-exposure mode.

Referring first to FIG. 9 which illustrates the flow AUT for the auto exposure mode, the display data b5b6 b7=000 is rendered and an exposure display is turned off (#1798). Then, a decision is made to determine if the brightness BVSP of the spot area is equal to or greater than 11 (APEX value), and if it is equal to or greater than 11, the brightness BV is rendered to be 11 as the highest brightness limit with the program flow proceeding to the flow NONFL for the photo-taking under ambient lighting (#1800 to #1805). However, if the brightness BVSP of the spot area is smaller than 11, a decision is made to determine if the minimum aperture value AVo is not greater than 3, and if the minimum aperture value is not greater than 3 and is greater than 3, the aperture value AV1 is rendered to be 3 and the minimum aperture value AVo, respectively. The aperture value AV1 and 6 (corresponding to a shutter speed of 1/60 sec.) are summed together, and a decision is then made to determine if this value exceeds the exposure value EVSP of the spot area (#1810 to #1820). If the value AV1+6 exceeds the exposure value EVSP of the spot area, a control brightness value BV is rendered to be the average brightness BVAV and then the program flow proceeds to the flow for the photo-taking under flash lighting mode FL, but if it is equal to or smaller than the exposure value EVSP of the spot area, decision is made to determine if the absolute value of the difference between the brightness BVAM of the substantially whole screen except for the spot are and the brightness BVSP of the spot area is not greater than 2. If the absolute value is not greater than 2, the whole screen is deemed having no difference in brightness and, therefore, using the average brightness BVAV as the brightness value BV, the program flow proceeds to the flow NONFL for the photo-taking under ambient lighting (#1835 and #1860). On the other hand, if the absolute value is greater than 2, a decision is made to determine if the difference thereof is positive. If the difference is positive, it is deemed that the background is bright with a central portion dark, that is, a back-lighting condition has occurred, and the program flow proceeds to the flow for flash lighting so that a day-light synchro can be established. AT this time the control brightness BV is used in the form the brightness BVSP of the spot area (#1845 and #1847). On the other hand, if the difference is negative, it is deemed that a spot lighting in which the center portion is bright occurs and a main target object to be photographed is deemed residing there, and, therefore, the program flow proceeds to the photo-taking under ambient lighting flow NONFL with the brightness value BV employed in the form of the BVSP of the spot area (#1850).

Figure 10A:
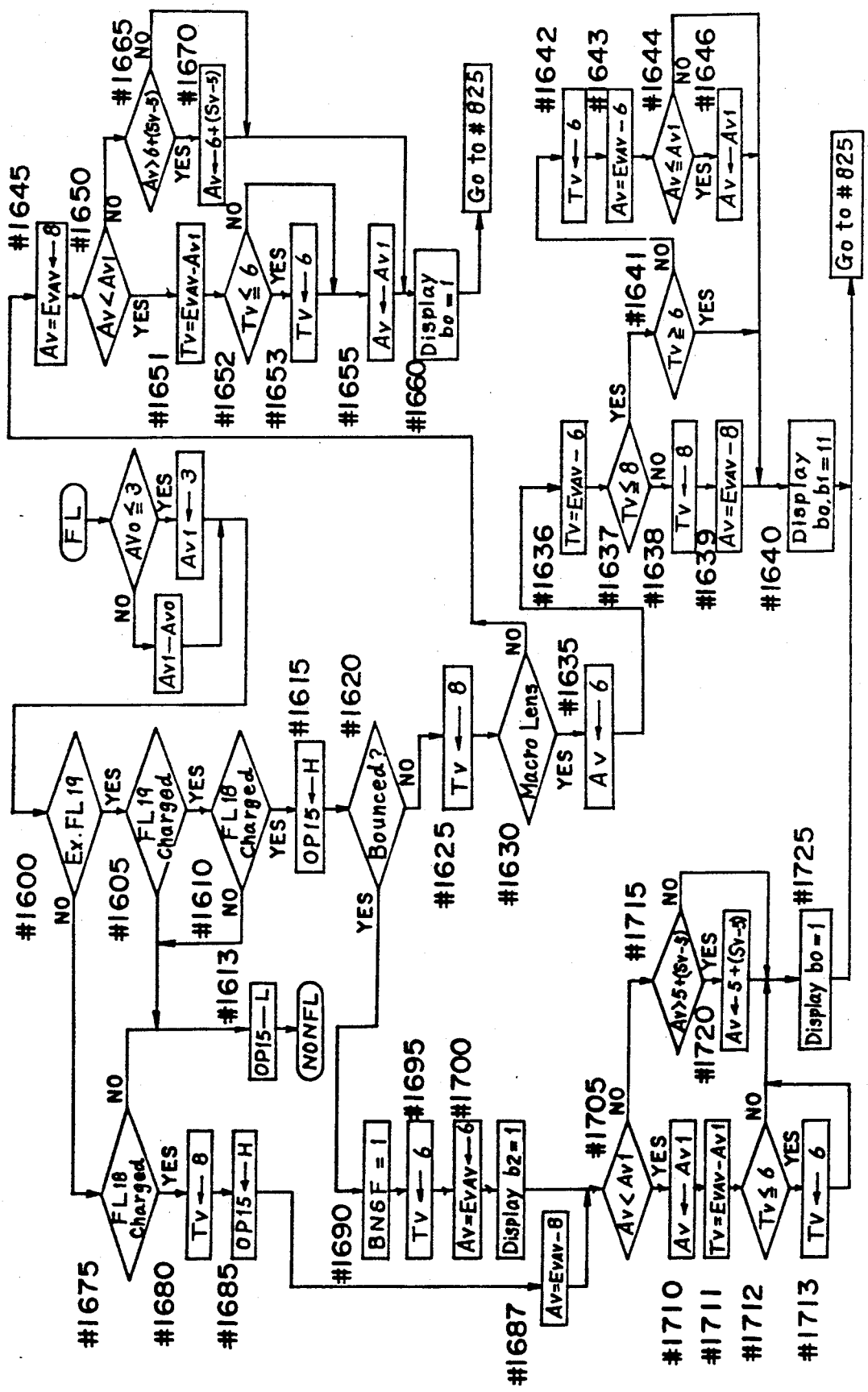
FIG. 10(A) is a flow chart showing a flow (FL) for flash photography.
Figure 10B:
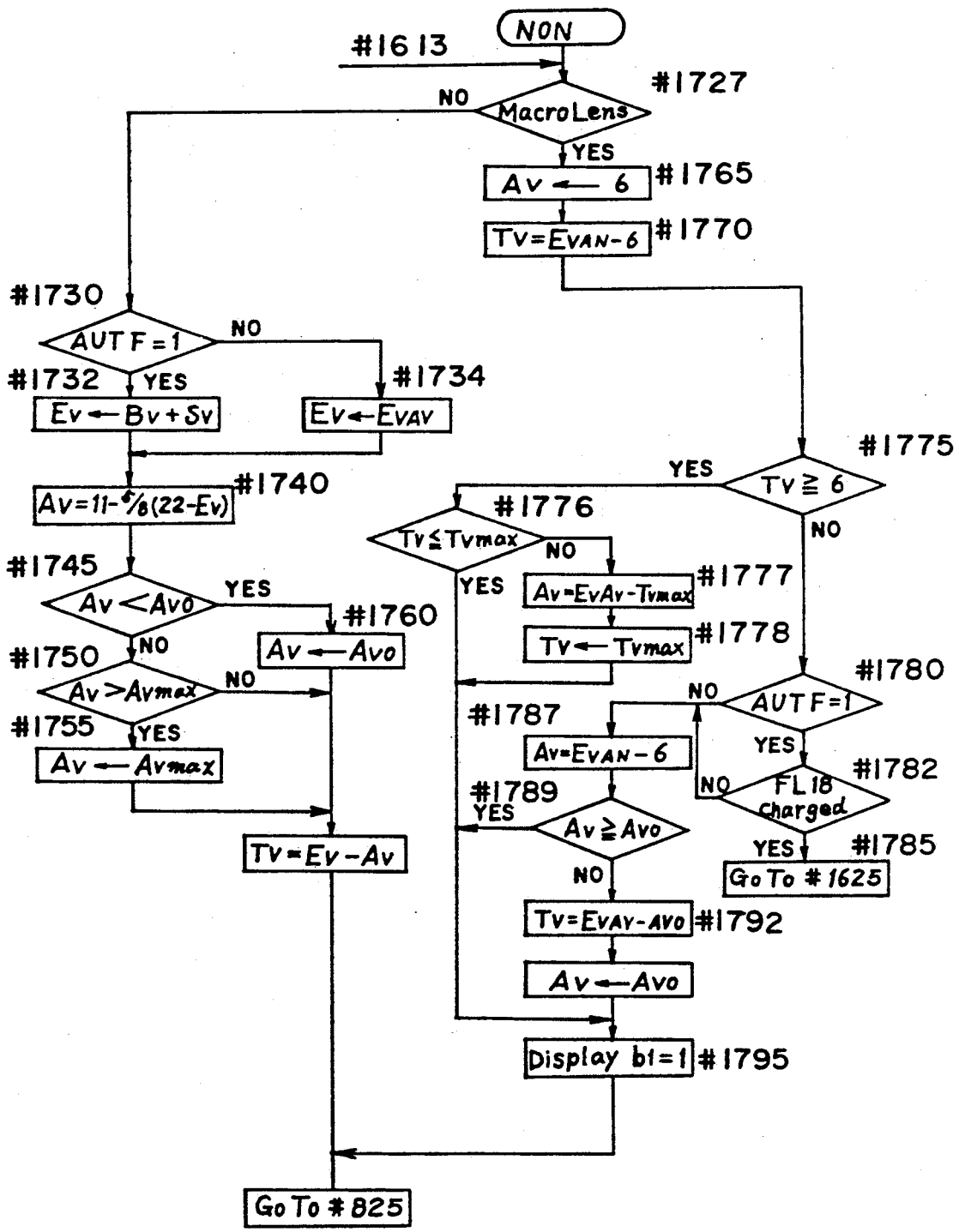
FIG. 10(B) is a flow chart showing a flow (NONFL) for the photo-taking under ambient lighting.

Hereinafter, the flow FL for the photo-taking under flash lighting and the flow NONFL for the photo-taking under ambient lighting will be described with reference to FIGS. 10(A) and 10(B), respectively. Let it be assumed that the guide number GN of the built-in flash device 18 is 16 (ISO=100). Referring first to FIG. 10(A) illustrating the flow FL for the photo-taking under flash lighting, the microcomputer 1 makes a decision to determine if the minimum aperture value AV0 is not greater than 3, and if it is greater than 3, the minimum aperture value AV0 thereof is rendered to be AV1. Then, a decision is made to determine if the external flash device 19 is mounted, and if it is mounted and either one of the external and built-in flash devices 19 and 18 has not yet been completely charged, or the charging of the built-in flash device 18 has not yet been completed while no external flash device 19 is mounted, the terminal OP15 is rendered to be in a low level state to show that the charging has not yet been completed, with the program flow consequently proceeding to the flow for the photo-taking under ambient lighting (#1600 to #1613, #1675). If the external flash device 19 is not mounted, but the built-in flash device 18 has been completely charged, the shutter speed is rendered to be 1/250 (TV=8) which is the highest synchronizing shutter speed, and the terminal OP15 is rendered to be in a high level state to show that the charging of the flash device 18 has been completed (#1680, #1685). Then, 8 is subtracted from the average exposure value EVAV to determine the aperture value AV, and if this aperture value AV is smaller than the aperture value AV1 so obtained as hereinabove described, the aperture value AV is rendered to be AV1, with the TV value being calculated from EVAV-AV1 (#1687, #1705 to #1711). A decision is subsequently made to determine if this TV value is not greater than 6 (1/60), and if it is not greater than 6, the TV value is restricted to 6 (#1712 to #1713). If this aperture value AV is not smaller than the aperture value AV1, a decision is made to determine if this aperture value AV is greater than {5 (corresponding to F5.6)+(SV−5 (corresponding to ISO=100))}, and if it is greater than that, the aperture value AV is rendered to be 5+(SV−5) and a display data bo=1 is outputted, followed by step #825 (#1705, #1715 to #1725). Where during this condition the photo-taking under flash lighting is to be performed using only the built-in flash device 18 (wherein ISO=100) having the guide number GN of 16, the limit of a controllable aperture will be F5.6 in order to obtain a proper exposure with respect to the target object up to 3 meters away from the built-in flash device.

If the charging of both of the built-in and external flash devices 18 and 19 had been completely charged at the time the external flash device 19 is mounted, the terminal OP15 is rendered to be in a high level state to show that the charging thereof has been completed, followed by a decision to determine if the photo-taking should be performed under bounced flash lighting with external flash device 19 used as the source of the bounced lighting (#1615, #1620). If it is the photo-taking under bounced flash lighting, a bounced flash lighting flag BNSF is set while the shutter speed is set to 1/60 sec. (TV=6), and 6 (TV) is then subtracted from the average exposure value EVAV to determine the aperture value AV to make a display data b2=1, followed by the execution of the flow of steps #1705, et seqq. because a main lighting source is the built-in flash device (#1620, #1690 to #1700). Should it be not the photo-taking under bounced flash lighting, the shutter speed is rendered to be 1/250 (TV=8), and a decision is then made to determine if the macro lens is mounted (#1625, #1630). When the macro lens is mounted, the aperture value AV is rendered to be 6 (corresponding to F8) and the TV value is calculated from EVAV-6. A decision is then made to determine if this TV value is not greater than 8 (1/250), and if it exceeds 8, the TV value is rendered to be 8 and the AV value is calculated from EVAV-8, followed by step #1640 (#1636 to

1639). On the other hand, if the TV value is not greater than 8, a decision is made to determine if the TV value is not smaller than 6, and if it is not smaller than 6, the step #1640 takes place. If it is smaller than 6, the TV value is rendered to be 6 and the aperture value AV is determined from EVAV-6, followed by a decision to determine if this AV value is not greater than AV1. Should it be not greater than AV1, the AV is rendered to be AV1 and step #1640 subsequently takes place. Where it exceeds AV1, the program flow proceeds immediately to step #1640 (#1641 to #1644). After a display data bob1=11 has been set in a predetermined register at step #1640 to show that the macro photography takes place under flash lighting, the program flow proceeds to step #825. If the result of decision at step #1630 indicates that no macro lens is mounted, a process similar to steps #1687 except for the following point is executed. More specifically, the difference lies in that, when the aperture value AV is not smaller than AV1 at step #1650, the aperture value AV is compared at step #1665 with {6 (corresponding to F8)+(SV−5)}, and if the aperture value AV is larger than {6+(SV−5)}, the aperture value AV is rendered to be {6+(SV−5)}, and this is because the aperture value is changed in view of the increase in amount of flash light emitted from the external flash device 19 (#1645 to #1660).

The flow NONFL for the photo-taking under ambient lighting will now be described with particular reference of FIG. 10(B). At the outset, a decision is made to determine if the macro lens is mounted, and if it is mounted, the aperture value AV is rendered to be 6 (corresponding to F8) and 6 is subtracted from the average exposure value EVAV to determine the TV value, followed by a decision to determine if this TV value is not smaller than 6 (corresponding to the shutter speed of 1/60) which is the limit of shutter speed presumed to be effective to avoid any possible camera wobbling (#1765 to #1775). If this TV value is not smaller than 6, a decision is made to determine if this TV value is not greater than TVmax (for example, 11). If the TV value is not greater than the TVmax, the program flow directly proceeds to step #1795, but if it is greater than the TVmax, the TV value is rendered to be the TVmax and the program flow, after AV has been determined from EVAV-TVmax, proceeds to step #1795 (#1776 to #1778). At step #1795 a display of macro photography is effected (b1=1), followed by step #825 (#1795). On the other hand, if the TV value is smaller than 6, an auto exposure mode flag AUTF is examined, and if it is in the auto exposure mode, another decision is made to determine if the built-in flash device 18 has been completely charged, and if it has been completely charged, the photo-taking under flash lighting is effected from step #1625 (#1780 to #1785). If it is not in the auto exposure mode (that is, when a NONFL mode is selected) or if the built-in flash device 18 has not yet been completely charged, the TV value of 6 corresponding to the shutter speed presumed to be effective to avoid any possible camera wobbling is subtracted from the average exposure value EVAV to determine the aperture value AV (#1787). Then, if the aperture value AV is not smaller than the minimum aperture value AV0, the program flow proceeds to step #1795, but if it is smaller than the AV0, the TV value is again calculated by subtracting the minimum aperture value AV0 from the average exposure value EVAV, and the aperture value AV is rendered to be the minimum aperture value AV0, followed by step #1795.

If the result of decision at step #1727 indicates that the macro lens has not been mounted, and if the mode is in the auto exposure mode, the film sensitivity SV is added to the brightness BV to determine the exposure value EV, but if the mode is not in the auto exposure mode, the average exposure value EVAD is rendered to be the exposure value EV (#1730 to #1734). The aperture value AV is then determined from $\{11-\frac{1}{8}(22-EV)\}$, and if this aperture value AV is smaller than the minimum aperture value AVo, the aperture value AV is rendered to be the minimum aperture value AVo, but if the aperture value AV is greater than the maximum aperture value AVmax, the aperture value AV is rendered to be the maximum aperture value AVmax (#1740 to #1755). Furthermore, the aperture value AV is subtracted from the exposure value EV to determine the TV value corresponding to the shutter speed.

Figure 17A:
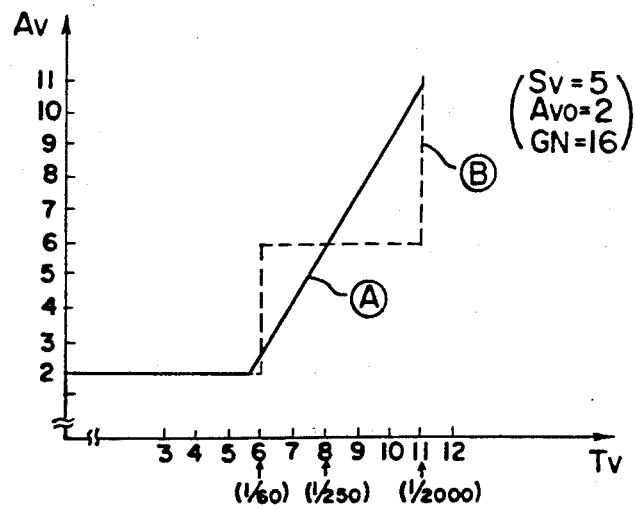
FIG. 17(A) is a program line diagram under ambient lighting showing an AV value relative to a TV value.
Figure 17B:
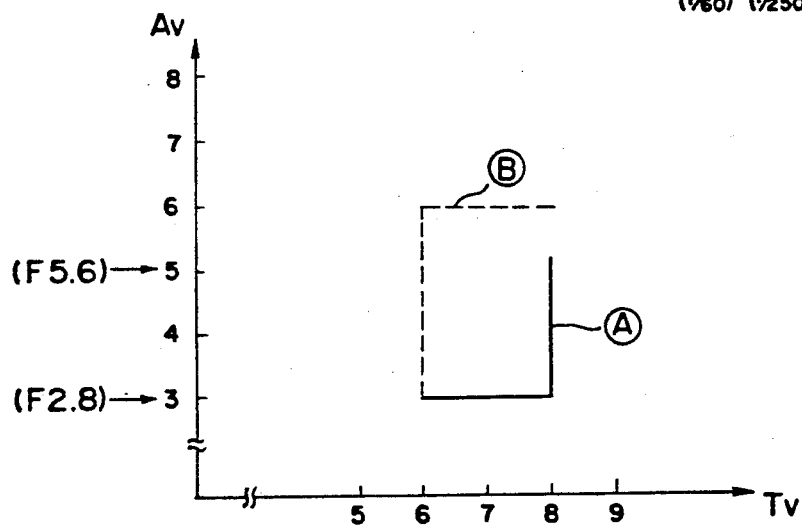
FIG. 17(B) is a program line diagram under flash lighting showing an AV value relative to a TV value.

Program line diagrams obtained in the manner as hereinabove described will now be described with reference to FIGS. 17(A) and 17(B). FIG. 17(A) illustrates the program line diagram associated with ambient lighting, wherein Ⓐ represents a normal mode and Ⓑ represents a mode when the macro lens is mounted. It is to be noted that: SV=5, AVo=2, and GN=16 (ISO=100). On the other hand, FIG. 17(B) illustrates the program line diagram associated with the photography under flash lighting, wherein Ⓐ represents a normal mode and Ⓑ represents a mode when the macro lens is mounted.

Referring back to FIG. 7(D), when the microcomputer 1 determines as a result of examination of the status of the flash device that, although the external flash device 19 is not mounted, and the built-in flash device 18 has not yet been completely charged (#528, #595), or although the external flash device 19 and the built-in flash device 18 has not yet been completely charged (#530, #535), a flag CHR.F indicative of the completion of charging of the flash device is reset, followed by step #640. Where both of the external and built-in flash devices 19 and 18 are completely charged, the terminal OP15 is rendered at step #540 to be in a high level state to show that the charging has been completed and the flag CHR.F is set, after which a decision is made to determine if the photo-taking takes place under bounced flash lighting (#540 to #545). If the photo-taking takes place under bounced flash lighting, the in-focus flag IFF is examined, and if it is not set, the program flow proceeds to step #1690 (#562, #587). If the in-focus flag IFF is set, a bounce flag BNSF is set and the distance DV to the target object is converted into a value according to the APEX system (#565, #570). Then, the shutter speed is rendered to be TV=6, and a value (IVin) which is the amount of light emitted from the built-in flash device 18 expressed according to the APEX system is added to the film sensitivity SV and subtracted by the distance DV so obtained to calculate the aperture value AV, followed by rendering a display data b2=1 before the program flow proceeds to step #1725 (#575 to #585).

Here, the method of determining the distance DV will be discussed.

If the lens extension amount, the photo-taking distance and the focal length of the lens are expressed by x, D and F, respectively, these parameters can be approximately expressed as follows.

$$f^2/D \approx x \quad (1)$$

The value n of the counter CNT2 which counts the encoder pulses from the extreme position to which the lens is retracted to a position in which the lens is extended, and the extension amount x have a generally proportional relationship with each other.

$$n = ax \quad (a: \text{constant}) \quad (2)$$

Hence, the equation (1) can be:

$$(1/D) = n/(f^2 a) \quad (3)$$

When logarithms of both terms of the equation (3) are taken;

$$\log_2 D = \log_2 f^2 a - \log_2 n \quad (4)$$

$$\log_2 D^2 = DV^\infty - 2\log_2 n \quad (4)'$$

(wherein $DV^\infty - 2\log_2 f^2 a$)

Assuming $DV = \log_2 D^2$ (APEX system);

$$DV = DV^\infty - 2\log_2 n \quad (4)''$$

While the calculations of the camera are nowadays performed according to the APEX system, the distance DV can be obtained having been expressed according to the APEX system if $DV^\infty$ used in the equation (4)″ is obtained according to the APEX system as information peculiar to the lens and $2\log_2 n$ which is the extension amount is converted into a value according to the APEX system.

A method for converting this extension amount, that is, $2\log_2 n$, into the value according to the APEX system will now be illustrated. In the first place, as $(\frac{1}{2})DVn = \log_2 n$, $(\frac{1}{2})DVn$ is determined. As can be understood from this, when $n=1$, that is, the lens is extended an amount corresponding to one pulse, $(\frac{1}{2})DVn=0$ is established, and from the equation (4)″, the distance will become $\infty$.

Where the number n is not smaller than two, the following method is adopted to determine the integer portion and the decimal fraction portion of the whole number. The integer portion is determined by the position of the highest bit that carries "1" of the data produced from the counter CNT2. For example, if the counter CNT2 produces a 16 bit long data, and the highest bit that carries "1" is the ninth bit from the least significant bit as indicated below:

(0 0 0 0 0 0 0 1 0 1 1 1 x x x x)

the highest bit that carries "1" is the ninth bit and, therefore, the integer portion of the whole number is "9". The first, second, third and fourth bits following the ninth bit are "0", "1", "1" and "1" and, therefore, the fraction portion is:

$$(0 \times \tfrac{1}{2}) + (1 \times \tfrac{1}{4}) + (1 \times \tfrac{1}{8}) + (1 \times 1/16) = 7/16$$

Thus, the whole number indicated by the above 16 bit long data is $9 \times 7/16$.

Similarly, for example, a 16 bit long data, (0 0 1 1 0 1 0 0 0 0 0 0 0 0 0 0)

represents $12 \times 10/16$. The bits after the fourth bit form the highest bit carrying "1" are disregarded. This value $12 \times 10/16$ is assumed to be $\log_2 n$. By doubling this value, $2\log_2 n$ can be obtained, which in the instance now under discussion $9 \times 7/16$ will become $18 \times \tfrac{7}{8}$ and $12 \times 10/16$ will become $24 \times 10/8$ and, hence, $25 \times 2/8$. Accordingly, by using the equation $DV = DV - 2\log_2 n$ of the equation (4)″, the distance DV can be obtained. At this time, although a slight error (0.1 EV) may occur in the value of the distance DV, it can be of a negligible value. With respect to the value of $DV^\infty$, it can be determined by adding to the value of DV corresponding to the distance at which the lens is focused at the time the count n shows 2, that is, the bit $a_1$ is set to 1.

The integer portions of $\log_2 n$ when the highest significant bit is set to 1, and the relationship between the value of DV and the distance are shown in Tables 1 and 2, respectively.

A program flow DV for calculating the distance DV is shown from steps #574 to #578 in FIG. 7(G). Depending on the type of lens, there is a lens which does not satisfy such a relationship of $n = ax$ at an earliest stage of extension, and in such case, so far as this type of lens is concerned, the initial count value may be disregarded and the calculation of DV is initiated when a predetermined count value is attained, or otherwise DV may be set to be $\infty$. By way of example, when the bit $a_3$ counted from the highest significant bit is for the first item set to 1 (when the lens is extended an amount corresponding to 8 pulses), the calculation of DV is carried out, and $\infty$ of the DV so calculated may be a value obtained by adding 6 to a value, for example, 12 (64 m), which is exhibited when the bit $a_3$ is set to 1.

Referring back to the flow chart of FIG. 7(D), if the result of decision at step #545 indicates that the photo-

| $a_{16}$ | $a_{15}$ | $a_{14}$ | $a_{13}$ | $a_{12}$ | $a_{11}$ | $a_{10}$ | $a_9$ | $a_8$ | $a_7$ | $a_6$ | $a_5$ | $a_4$ | $a_3$ | $a_2$ | $a_1$ |
|---|---|---|---|---|---|---|---|---|---|---|---|---|---|---|---|
| 0 | 0 | 0 | 0 | 0 | 0 | 0 | 1 | x | x | x | x | x | x | x | x | the integer portion of the whole number is "9".

The fraction portion of the whole number is determined by the four bits that follow the above-mentioned bit, the highest bit that carries "1".

The fraction portion of the whole number is determined as follows. The first bit following the above-mentioned highest bit that carries "1" is weighted as $\tfrac{1}{2}$. Similarly, the second, third and fourth bits following the above-mentioned highest bit are weighted as $\tfrac{1}{4}$, $\tfrac{1}{8}$ and 1/16, respectively. Thus, for example, if the counter CNT2 produces a 16 bit long data as follows;

taking is not intended under the bounced flash lighting, the amount of light emitted is read out from the data of the external flash device 19 inputted and, on the basis of this, the data of the amount of light emitted including that of the built-in flash device 18 is read out from an internal memory (#550, #555). The relationship between the data of the amount of light IVex from the external flash device 19 and the data of the total amount of light IVtotal is illustrated in Table 3. It is to be noted that the amount of light from the built-in flash device 18 is IV=3 (corresponding to the guide number of 16 when the film sensitivity is 100) and that, each time this amount of light doubles, IV is incremented by 1. Then, using the total amount of light IVtotal as the date of the amount of light IV, the microcomputer 1 proceeds to step #640.

Where at step #528 the external flash device 19 is not mounted and the charging of the built-in flash device 18 has been completed, the amount of flash lighting 3 from the built-in flash device 18 is inputted as the amount of light IV with a charge completion signal outputted from the terminal OP15 to set the charge completion flag Charge Comp. F (#595 to #61.0), followed by step #640.

The microcomputer 1 then determines the in-focus flag IFF (#640). If the in-focus flag IFF is not set, the program flow proceeds to the auto exposure mode AUT, but if it is set, an AE lock flag AELF is set and the distance DV is determined in the manner similar to that described above (#645 to #655). A decision is subsequently made to determine if the brightness BVSP of the spot area inputted from the light measuring circuit 2 is not smaller than 11, and if it is not smaller than 11, the brightness value BV is set to 11 and a display data is rendered to be $b_5b_6b_7=100$, followed by the flow NONFL for the photo-taking under ambient lighting (#655, #670).

On the other hand, if the brightness BVSP of the spot area is smaller than 11, a decision is made to determine if the minimum aperture value AV0 is equal to or smaller than 3 and, if the minimum aperture value AV0 is equal to or smaller than 3, the aperture value AV1 is rendered to be 3, but if it is not smaller than 3, the value AV0 is employed as the aperture value AV1 (steps #675 to #685).

AT step #690, a decision is made to determine whether or not the exposure value EVSP of the spot area is smaller than the sum of the value AV1 and 6 (corresponding to the shutter speed of 1/60 sec). This is a decision for the purpose of determining whether or not for a given brightness of the spot area (the brightness of the main target object to be photographed) a flash lighting should be effected. If the exposure value EVSP of the spot area is smaller than the sum (AV1+6), the flash lighting should be effected and, therefore, the program flow proceeds to step #722, but if it is not smaller than the sum, a decision is made to determine whether or not the difference of the brightness BVAM other than that of the spot area and the brightness BVSP of the spot area is smaller than 2, and if it is not smaller than 2 the program flow proceeds to step #722 to effect a daylight synchronization of the flash device. On the other hand, if the difference (BVAM-BVSP) is smaller than 2, a decision is made to determine if this difference is greater than −2, and if this difference is not greater than −2, that is, in the case where the main target object is illuminated and therefore bright because it is on, for example, a stage, a display data is set to $b_5b_6b_7=001$ at step 694 and the brightness BV is used as the brightness BVSP of the spot area, followed by the flow NONFL for the photo-taking under ambient lighting. Where the difference (BVAM-BVSP) is greater than −2, the display data is rendered to be $b_5b_6b_7=111$ at step #696 and a decision is subsequently made to determine if an important target object is located at a distance far away from the camera at step #697.

The determination of this distance is carried out for the purpose of changing an exposure system depending on the distance to the target object. For the purpose of the distance determination, the distance is deemed small if the brightness of the face of the important target object (it being assumed to be a person) can be measured within the spot area, or otherwise the distance is deemed great. The size of the face of the person is chosen to be the average size of faces of people. Whether or not the face of an actual person can be measured within the spot area depends on the focal length of the lens. If the focal length of the lens is 50 mm, and if the distance to the target object is 5.6 m, it will be nearly an available limit at which the brightness of the face thereof can be measured within the spot area, and if the target object moves far away from this distance, the brightness of the background will fall into the spot area. In view of this, the relationship between the lens focal length and the distance DV to the target object with the above taken as a reference is illustrated in Table 4. (Data of the lens focal length is inputted as fV.) By way of example, in the case where the lens having a focal length of 70 mm is mounted, it can be deemed near when the distance is 8 m (corresponding to DV=6), but far if the distance exceeds 8 m. In the flowchart, at step #698 as shown in FIG. 7(F), the focal length fv is subtracted from the distance DV and, if the balance is positive, it is deemed far and a flag FDF indicating the far distance is set, but if the balance (DV−fv) is zero or negative, return of the program flow takes place without the flag FDF being set (#698 to #700).

Then, at step #705 the microcomputer 1 makes a decision to determine if the flag FDF is set, and if it is not set, the flow NONFL for the photo-taking under ambient lighting is executed with the use of the brightness BVSP of the spot area as the brightness value BV. If the distance is great and the flag FDF is set, the photo-taking under ambient lighting flow NONFL is executed with the use of the average brightness BVAV as the brightness value BV. This is for the purpose that, when DV>fv, in most cases scenic photographs of a scene appearing on the entire viewing screen are being taken and, therefore, the average brightness BVAV is employed, but when DV≦fv, in most cases photographs of one or more objects for example, persons, which appear on a portion of the viewing screen are being taken and, therefore, the spot brightness BVSP is used. In this way, a correct exposure proper to the purpose of photo-taking can be obtained.

A flow or the flash photography starts from steps #722, et seqq, shown in FIG. 7(E), reference to which will now be made. In the first place, the microcomputer 1 makes a decision to determine at step #722 if the charge completion flag Charge Comp. F is set or not, and if it is not set, the program flow proceeds to the auto exposure mode flow AUT. On the other hand, if it is set, the microcomputer 1 performs a calculation of AVFL=SV+IV−DV, that is, the aperture value AVFL required for the flash photography is determined from the film sensitivity SV, the amount of flash IV and the distance DV. Then, a decision is made to determine if the aperture value AVFL so determined is not smaller than the aperture value AV1 determined in the manner as previously described (#730). If the aperture value AVFL for the flash photography is not smaller than the aperture value AV1, it means that, when the target object is illuminated by the flash light emitted from the flash device, a proper exposure can be obtained. On the other hand, when the aperture value AVFL is smaller than the aperture value AV1, it means that underexposure will occur even when the target object is illuminated by the flash light and, therefore, the program flow proceeds to a flow starting from step #1100, et seqq., shown in FIG. 7(K).

During the execution of the flow shown in FIG. (K), when the brightness BVSP of the spot area is not greater than 2, a display data is set in a predetermined register, and the brightness value BV for the control is rendered to be the average brightness BVAV, and the program flow then proceeds to the photo-taking under ambient lighting mode NONFL (#1103 to #1115). On the other hand, when the brightness BVSP exceeds 2, but when the absolute value of the difference between the brightness BVAM excluding that of the spot area and the brightness BVSP of the spot area is smaller than 2, a display data $b_5b_6b_7 = 111$ is set in the predetermined register and the program flow then proceeds to the photo-taking under ambient lighting mode NONFL with the use of the average brightness BVAV as the brightness BV for the control (#1100 to #1115). Where the brightness BVSP of the spot area exceeds 2 and the absolute value of the difference between the brightnesses BVAM and BVSP is not smaller than 2, a decision is made to determine if the value of BVAM-BVSP is positive (#1120). If it is equal to zero or negative, the brightness BV is rendered to be the brightness BVSP of the spot area, a display data $b_5b_6b_7 = 001$ is set, and the program flow proceeds to the photo-taking under ambient lighting flow NONFL (#1155, #1160). This condition may occur, for example, when the target object is illuminated while standing on a stage and is located a distance away. On the other hand, where the difference of BVAM-BVSP is positive, a decision is made to determine if the brightness BVAM is not smaller than 11, and if it is not smaller than 11, the brightness BVAM is rendered to be 11 which is the highest brightness limit and the average brightness BVAV is rendered to be (BVSP+11)/2, followed by the calculation of the control brightness BV from (BVSP+BVAV)/2. However, if the brightness BVAM is smaller than 11, after the control brightness BV has been calculated directly from (BVSP+BVAV)/2, a display data $b_5b_6b_7 = 010$ is set, followed by the execution of the photo-taking under ambient lighting flow NONFL (#1125 to #1150).

Where a proper exposure can be obtained only with the flash lighting with no regard paid to the brightness, the program flow proceeds to a flow starting from step #735, et seqq., shown in FIG. 7(E), for the portion excluding the spot area (#730). At the outset, 2 is subtracted from an exposure value EVAM corresponding to the brightness BVAM excluding the spot area to determine a first exposure value EV1, and the aperture value AVFL for the flash photography is subtracted from the exposure value EV1 to determine a shutter speed TV1 (#735, #740). The determination of the exposure value EV1 by subtracting 2 from the exposure value EVAM of the spot area is for the purpose of establishing an overexposure condition of the background relative to the target object in a quantity corresponding to two EV so that what appears to be photo of back-lighted scene can be obtained. The value of the two EV referred to above is selected in consideration of the latitude of a positive film or a printing paper within which the color reproductivity can be guaranteed. However, the latitude of the printing paper varies with the type of printing material and, therefore, the number of overexposure may not be always limited to two.

The microcomputer 1 then makes a decision at step #745, which rs shown in FIG. 7(H), to determine if the shutter speed TV1 is higher than 8 ( corresponding to the shutter speed of 1/250 sec.) which is the flash synchro shutter speed limit. In other words, a decision is made to determine if, even though the difference in exposure value between the target object and the background exceeds 2 EV, an overexposure will occur during the flash photography. When TV1 > 8, it means that the overexposure in excess of 2 EV occurs. Therefore, in the event that the value of TV1 is greater than 8, 8 is subtracted from the exposure value EVSP of the spot area to determine a second aperture value AVSP, after which a decision is made to determine if the second aperture value AVSP is not greater than the aperture value AVFL for the flash photography (#745 to #755). This is for the purpose of determining whether or not the target object can be illuminated by the flash light so properly as to result in a proper exposure when the photo-taking under flash lighting takes place. In the event that the aperture value AVSP is not greater than the aperture value AVFL for the flash photography and the target object can be illuminated by the flash light so properly as to result in the proper exposure, the aperture value AV is rendered to be the aperture value AVFL for the flash photography and the shutter speed TV is set to 8 (#760, #765). By so doing, the difference in exposure between the target object and the background can be reduced from the difference between the brightnesses BVAM and BVSP by a quantity corresponding to that portion which contributes to the exposure under flash lighting. By way of example, where the target object can be properly illuminated only by the flash light so as to result in the proper exposure, the difference in exposure will be AVFL-AVSP. The target object is so illuminated by mixed ambient and flash lighting as to result in the proper exposure.

On the other hand, when the aperture value AVFL for the flash photography is smaller than the second aperture value AVSP, that is, when the proper exposure cannot be obtained during the flash photography of the target object, the program flow proceeds to step #775 at which a decision is made to determine if the difference between the second aperture value AVSP and the aperture value AVFL for the flash photography is greater than 0.5 EV. If it is greater than 0.5 EV, the control aperture AV is rendered to be the second aperture value AVSP, followed by step #765. AT this time, only the ambient lighting is used to give a proper exposure of the target object with no flash lighting participating in the exposure, but merely used as a catch light (a phenomenon in which an image of flash light is cast on the eyes of a person being photographed). At this time, if the difference between the second aperture value AVSP and the aperture value AVFL for the flash photography is 0.5 EV, a proper exposure can be obtained only under ambient lighting and 0.75 EV overexposure under flash lighting will occur when the flash is utilized (the target object will be adversely affected by 0.75 EV when the maximum amount of flash light is projected while under 0.5 EV underexposure), accordingly it may happen that the target object will be 0.75 EV overexposed at the worst. However, when it is reproduced on a film, the target object will be properly photographed with the difference in exposure between it and the background reduced further. Where the flash amount control is of an automatic adjusting type, since the bright ambient lighting (especially in this case, the background is brighter by 2 EV or more than the target object) is also automatically adjusted at the same time with the flash lighting, no maximum lighting amount will be attained and the target object will not be overexposed so much as 0.75 EV and, accordingly, a nearly proper exposure can be obtained. On the other hand, when the difference between the second aperture value AVSP and the aperture value AVFL for the flash photography is not greater than 0.5 EV, the aperture value AV is the aperture value AVFL for the flash photography which is added with 0.5 EV and the program flow proceeds to step #765 (#785). In such case, if both of the aperture values approximate with each other, the target object may be 0.5 EV underexposed under the ambient lighting but can be compensated for by the flash lighting so that a proper exposure can be substantially obtained, however, the difference in exposure between it and the background will be an underexposure by an amount corresponding to the amount of flash light. While in this instance it is assumed that AV=AVFL+0.5 when AVSP-AVFL<0.5, the value of 0.5 may be any value within the range of 0 to 1. It is to be noted that the reason that the limit of 1 is provided is that, if 1 is chosen, the target object can be properly exposed in view of 1 EV underexposure resulting from the ambient lighting and 1 EV underexposure resulting from the flash lighting, but it will be underexposed when it exceeds 1. At step #765, the shutter speed TV is rendered to be 8, followed by step #770.

Where the result of decision at step #745 indicates that the shutter speed TV1 is smaller than 8, a decision is made at step #790 to determine if the shutter speed TV1 is smaller than 6, that is, to determine if the shutter speed TV1 is of a value which would result in a camera wobbling. If the shutter speed is equal to or greater than 6 and equal to or smaller than 8, the control shutter speed TV is rendered to be TV1 and the control shutter speed AV is rendered to be AVFL so that a properly exposed photo of the target object can be obtained while the suitable difference in brightness between the target object and the background, which is 2 EV, is retained (if the difference is not smaller than 2 EV). On the other hand, if the shutter speed TV1 is smaller than the limit (TV=6) of shutter speed presumed to be effective to avoid any possible camera wobbling, that is, when the exposure value EVAM excluding the spot area is smaller than {AVFL+6(TV)+2}, the control shutter speed TV is rendered to be 6 and the aperture value is again calculated by subtracting 6, which is the value of TV, from the first exposure value EV1 to determine the control aperture value AV (#805, #810). Should the result of decision at step #815 indicate that this aperture value AV is smaller than the aperture value AV1 determined during the execution of steps #675 to #685, the control aperture value AV is rendered to be AV1 (#820) and display data bo=1 and $b_5b_6b_7=001$ are set in predetermined registers, followed by step #825. On the other hand, should the result of decision at step #815 indicate that the aperture value AV is not smaller than the above described aperture value AV1, the program flow proceeds to step #770 at which display data bo=1 and $b_5b_6b_7=010$ are set in the predetermined registers.

In this way, in the case where the control shutter speed Tv is within the range of 6≦TV≦8 when the difference between the brightness of the target object and the brightness BVAM excluding the spot area is greater than 2 EV with the brightness BVAM greater than (AV1+6+2), a photo wherein the difference in brightness between the target object and the background is maintained at 2 EV can be obtained, but if the brightness BVAM is within the range of (AV1+6) BVAM (AV1+6+2), a photo wherein the brightness difference is maintained at {BVAM−(AV1+6)} (provided that the brightness difference is greater than 2 EV) can be obtained, and if the brightness BVAM is smaller than AV1+6, the target object can be properly exposed under flash lighting while the background is darkened by {(AV1+6)−BVAM}.

The exposure attained when the distance has been detected with the foregoing flowcharts will be specifically discussed with reference to FIGS. 18(A) to 18(D).

Figure 18A:
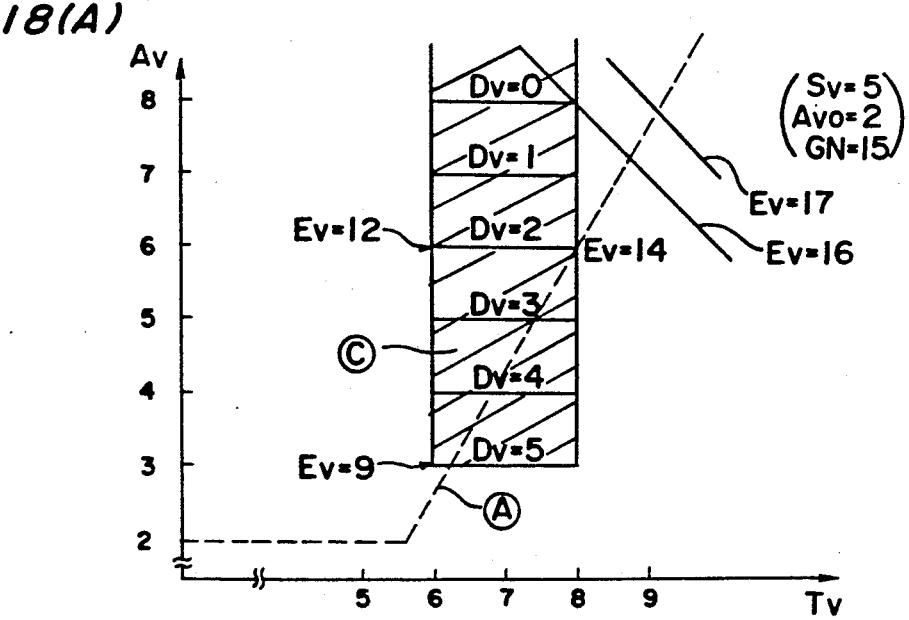
FIG. 18(A) is a program line diagram of FIG. 17(A) for the flash photography.

In FIG. 18(A), the broken line Ⓐ is identical with the program line Ⓐ shown in FIG. 17(A). Hatched areas Ⓒ represent program lines (areas) for the flash photography which vary with the distance, the program line related with the distance per 1 EV being shown by the solid line. (However, even during the flash photography, it will not follow the program line Ⓒ corresponding to the distance. This is when steps #775 to #785 in the flowchart are executed.) By way of example, assuming that the film sensitivity SV is 5 (ISO=100), the full open F-Value AV0 of the lens is 2 (F2), the maximum flash amount IV of the flash lighting is 3 (GN=16) and DV is 2 (2 m in distance), and when the control exposure value EV is 14, the control aperture value AV will be 6 (F8) and the shutter speed TV will be 8 (shutter speed=1/250 sec.) and, therefore, the shutter speed varies until the exposure EV becomes 12, the shutter speed TV becoming 6 (shutter speed=1/60 sec.) when the exposure value EV has attained a value of 12. If the exposure value EV becomes smaller than that, the aperture value is correspondingly modified toward the largest aperture opening. In other words, the aperture value is modified toward the largest aperture opening until the exposure value EV becomes 9, that is, until the aperture value AV becomes 3 (F2.8). Even in the case where the exposure value EV is smaller than that, the control is effected with aperture value AV=3 and shutter speed TV=6.

Figure 18B:
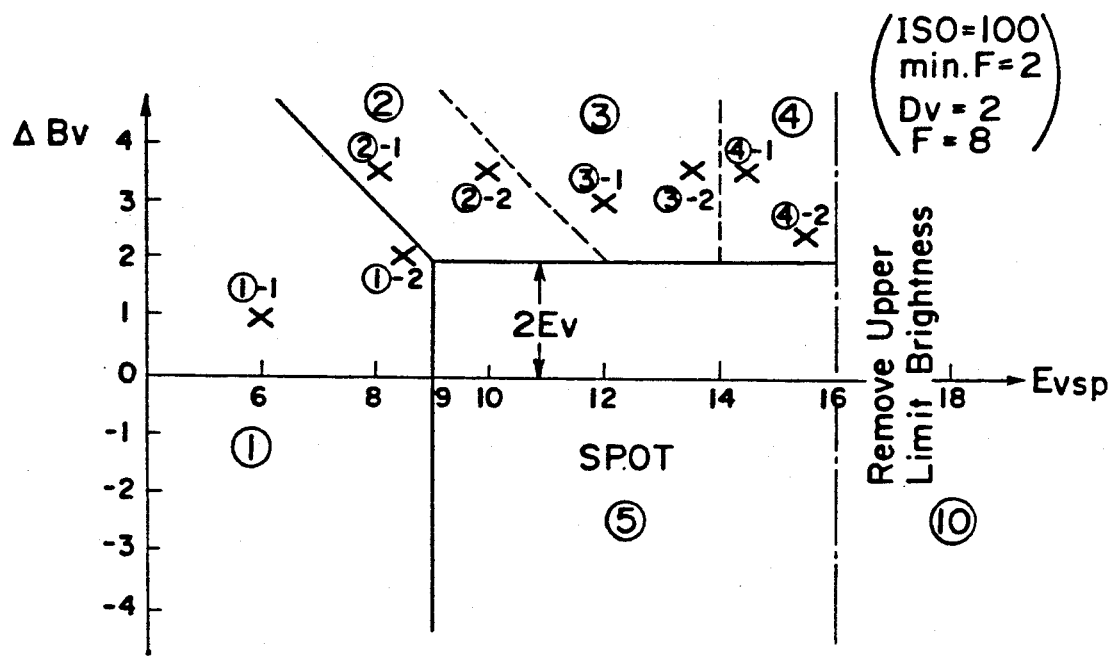
FIG. 18(B) is a program line diagram when a main target object is properly exposed under flash lighting.
Figure 18C:
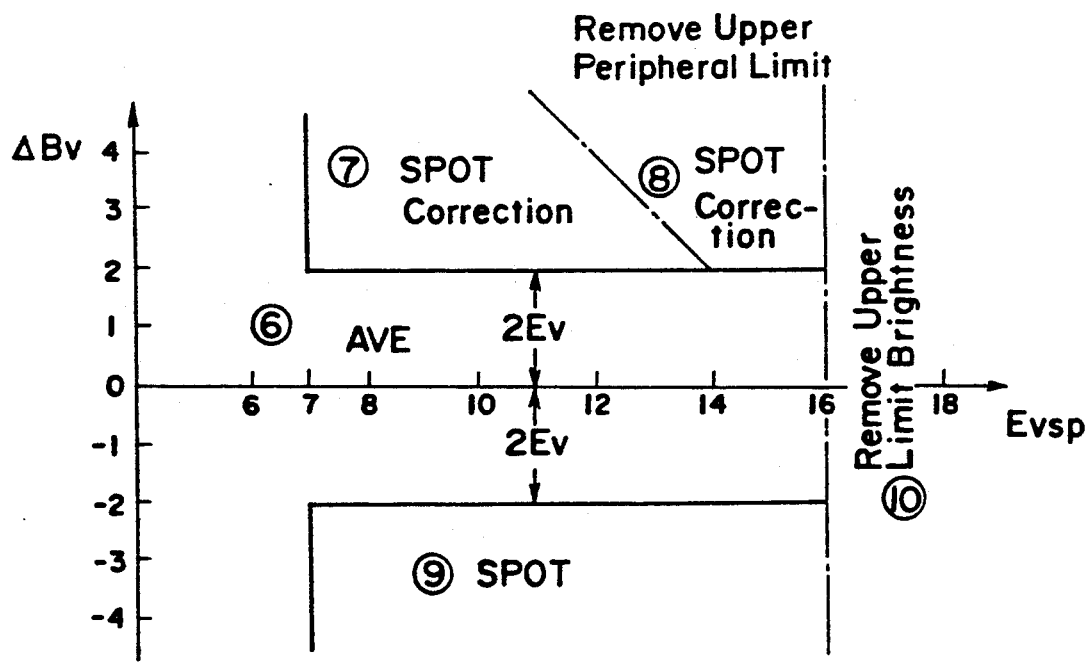
FIG. 18(C) is a program line diagram when the main target object is not properly exposed under flash lighting.

FIGS. 18(B) and 18(C) illustrate a different method of determining the exposure depending upon whether or not during the flash photography the target object can be properly exposed, wherein FIG. 18(B) is the case wherein the target object can be properly exposed under flash lighting and FIG. 18(C) is the case wherein the target object is not properly exposed and no flash lighting is effected. In both of FIGS. 18(B) and 18(C), the axis of abscissas represents the exposure value EVSP of the spot area measuring the target object and the axis of ordinates represents the difference ΔEV between the exposure value EVAM of the substantially entire surface of the screen excluding the spot area and the exposure value of the spot area.

Referring first to FIG. 18(C), in the event that the exposure value EVSP of the spot area is smaller than 7 such as represented by a region Ⓖ, or the exposure value EVSP is within the range of 7 to 16, but the difference between the exposure value EVSP of the spot area and the exposure value EVAM of the substantially entire screen is not greater than 2 EV, it means that no substantial difference exists between the target object and the background or the target object occupies the screen in a small proportion and, therefore, the exposure is carried out on the basis of the brightness of the average measurement of light (AVSP+AVAM)/2. On the other hand, in the event that the exposure value EVSP of the spot area exceeds 7 and differs by −2 EV or more from the exposure value EVAM of the substantially entire screen such as represented by a region ⑨, it means that the target object is illuminated by a spot light while, for example, standing on a stage, and therefore the spot measurement of light is carried out. In the event that the exposure value EVSP exceeds 7 and the difference between it and the exposure value EVAM of the substantially entire screen exceeds −2 EV, the following two possibilities occurs.

(i) When the exposure value EVAM of the substantially entire screen is smaller than 16 such as represented by a region ⑦, the target object can be properly photographed even under backlighting condition by giving a priority to the spot area. The brightness used for the control at this time is:

$$BV = (BVAV + BVSP)/2$$
$$= \{(BVAM + BVSP/2\} + BVSP/2$$
$$= (BVAM + 3.BVSP)/4$$

(ii) When the exposure value EVAM of the substantially entire screen is equal to or greater than 16 such as represented by a region Ⓑ, this brightness is imparted the upper most limit and the average brightness BVAM is rendered to be (11+BVSP)/2 and the brightness BV used for the control is rendered to be (11+3.BVSP)/4.

Finally, where the exposure value EVSP of the spot area is equal to or greater than 16, the brightness BV used for the control is limited to 11 and the exposure value EV is limited to 16. This is because no target object brighter than this brightness can be considered (so far as people is being photographed) and, in such a case, an object such as a light source may be presumed to have fallen into the spot measuring area.

Hereinafter, FIG. 18(B) will be explained. When the exposure value EV of the spot area is equal to or greater than 16 such as represented by a region ①⓪, the brightness BV used for the control is rendered to be 11 and the exposure value EV is limited to 16. The reason for this is the same as hereinabove described. When the exposure value EVSP of the spot are is equal to or greater than 9 and the difference between it and the substantially entire screen is smaller than +2 EV such as represented by a region ⑤, the target object is frequently photographed and the spot measurement of light is effected.

In cases other than the above described cases the photo-taking under flash lighting takes place, the details of which will be described with reference to FIG. 18(D). The region ① represents the case wherein the exposure value EVSP of the spot area is smaller than 9 and the exposure value EVAM of the substantially entire screen is smaller than 11. In this case, the exposure value for the control is 9 (AV=3, TV=6) and the boundary between it and the region ② lies where the difference between this control value and the exposure value EVAM of the substantially entire screen is +2 EV, and if it is equal to or smaller than 2 EV, it will be in the region ①, but if it exceeds 2 EV, it will be in the region ②. With respect to X points ①-1 and ①-2 in the region ① will be described with reference to FIGS. 18(D)-(a) and (b).

Figure 18D:
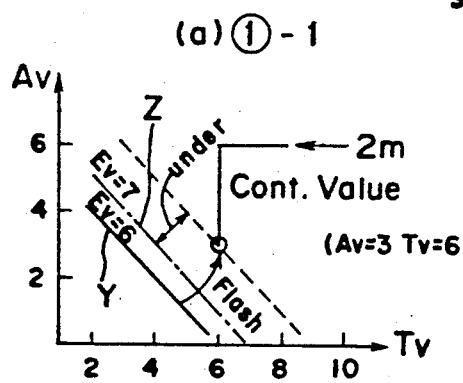
Figure 18D:
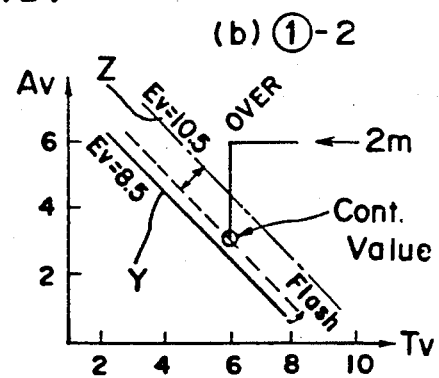
Figure 18D:
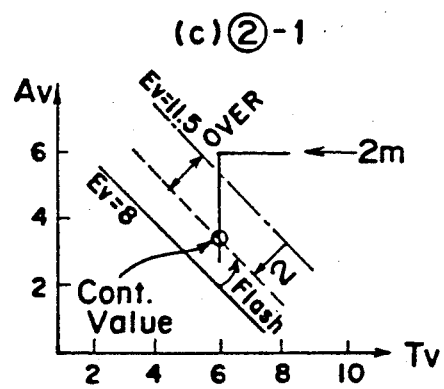
Figure 18D:
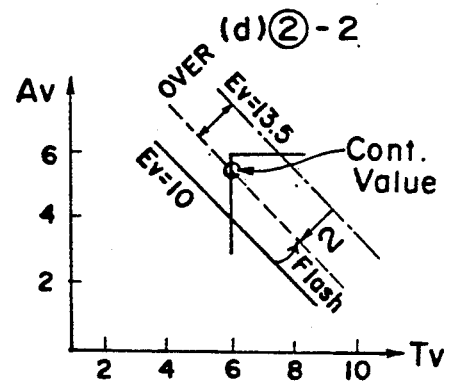
Figure 18D:
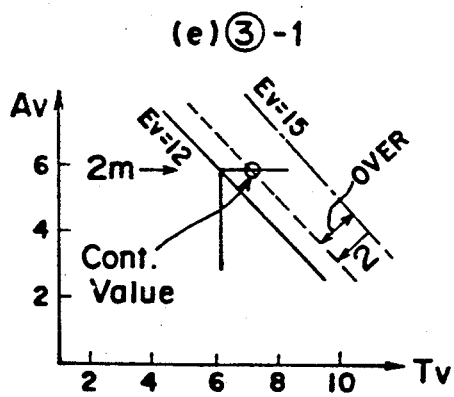
Figure 18D:
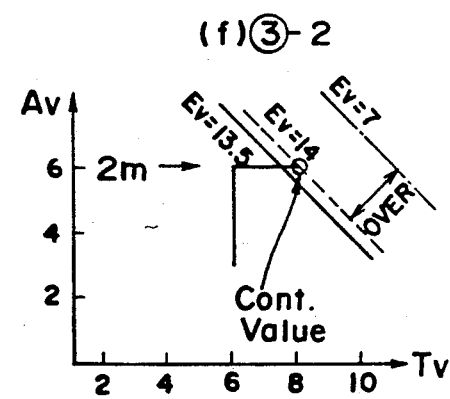
Figure 18D:
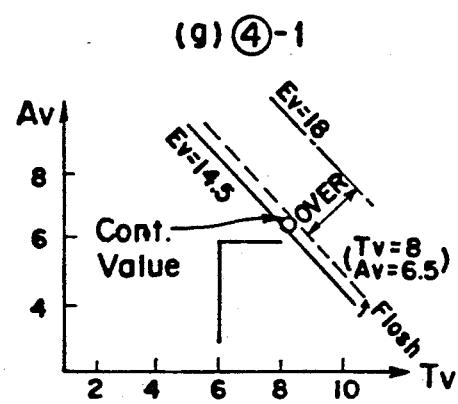
Figure 18D:
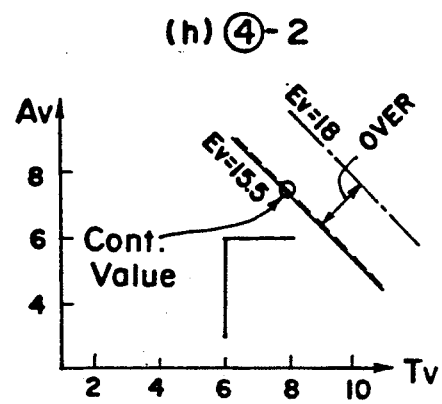

In FIG. 18(D), the axis of abscissas represents the shutter speed TV and the axis of ordinates represents the aperture value AV, wherein an EV line indicated by Y represents the exposure value EVSP of the spot area and an EV line indicated by Z represents the exposure value EVAM of the substantially entire screen and a small circle o represents the control exposure value. In the case of ①-1 of FIG. 18 (D)-(a), the control exposure value is EV=9 (AV=3, TV=6) and the exposure value EVSP of the spot area is 6 and the exposure value EVAM of the substantially entire screen is 7. At this time, the target object is properly exposed under flash lighting and, since no flash lighting reaches the background, 2 EV underexposure occurs. In the case of ①-2 of FIG. 18(D)-(b), the control exposure value is EV=9 (AV=3, TV=6), the exposure value EVSP of the spot area is 8.5 and the exposure value EVAM of the substantially entire screen is 10.5, the result of photo-taking indicates that the target object is properly exposed under flash lighting while the background is 1.5 EV underexposed.

Referring back to FIG. 18(B), the region ② is such that the exposure value EVAM of the substantially entire screen exceeds the exposure value EVSP of the spot area by 2 EV and the shutter speed is controlled to 1/60 (TV=6). Points ②-1 and ②-2 in this region ② be described with reference to FIGS. 18(D)-(c) and 18(D)-(d). In the case of ②-1 of FIG. 18(D)-(c), the control exposure value is EV=9.5 (AV=3.5, TV=6), and the exposure value EVSP of the spot area is 8 and the exposure value EVAM of the substantially entire screen is 11.5, and at this time the difference in brightness between the target object and the background is 3.5 EV. When this is photographed under flash lighting, this difference can be reduced to 2 EV so that the brightness of both of the target object and the background can be similar to that perceived by the eyes while falling within the latitude of the film used. More specifically, by the utilization of the flash lighting, the target object is properly exposed (with the exposure corresponding to EV=9.5) while the background is properly exposed with 2 EV overexposure. In the case of ②-2 of FIG. 18(D)-(d), the control exposure value is EV=11.5 (AV=5.5, TV=6), and the exposure value EVSP of the spot area is 10 with the exposure value EVAM of the substantially entire screen being 13.5, the difference thereof being consequently 3.5 EV. By the flash lighting, the target object can be properly exposed (corresponding to EV=11.5) with the background being 2 EV overexposed.

Referring back to FIG. 18(B), the region ③ is such that the aperture value is fixed (AV=6), and this aperture value AV is the one calculated from AV=IV+SV−DV, wherefore the target object will be underexposed when the photo-taking is effected only under flash lighting while the aperture is stopped down to a value smaller than this calculated aperture value. Because of this, in order to cope with the bright background as much as possible, the shutter speed is shifted to the limit of synchronized shutter speed. Points ③-1 and ③-2 in the region ③ will be described with reference to FIGS. 18(D)-(e) and 18(D)-(f). In the case of ③-1, the control exposure value is EV=13 (AV=6, TV=7) and the exposure value EVSP of the spot area and the exposure value EVAM of the substantially entire screen are 12 and 15, respectively. Since the photo-taking under flash lighting in this case is identical with (c) and (d), the details thereof will not be discussed. In the case of the control exposure value is EV=14 (AV=6, TV=8), and this exposure value is the limit for the photo-taking under flash lighting with the use of the aperture determined in consideration of the distance (2 m). The exposure value EVSP of the spot area and the exposure value EVAM of the substantially entire screen are 13.5 and 17, respectively. If the photo-taking under flash lighting is effected during this condition, although the target object can be properly exposed (corresponding to EV=14), the background will be overexposed by 3 EV and, as compared with the case wherein the photo-taking is effected with no flash lighting used, the difference in brightness between the target object and the background can be reduced by 0.5 EV.

Referring back to FIG. 18(B), the region ④ is such that, since the aperture is stopped down (currently AV=6), the target object will not be properly photographed only with the flash light even though the photo-taking is effected under flash lighting. To describe points ④-1 and ④-2 within the region ④ with reference to FIGS. 18(D)-(g) and 18(D)-(h), in the case of ④-1, the control exposure value is EV=14.5 (AV=6.5, TV=8), the exposure value of the spot area is EV=14.3 and the exposure value of the substantially entire screen is EV=18. At this time, the target object will be underexposed by 0.2 EV when illuminated only with the ambient lighting, but in view of the flash lighting being added, the target object will be properly, but slightly overexposed (this value cannot be specified). In FIG. 18(D)-(g), the exposure appropriate to the target object moves to that indicated by the broken line. In this way, the difference in exposure (brightness) between the background and the target object is minimized by an amount corresponding to the flash lighting. In the case of FIG. 18(D)-(h), when the control exposure is EV=15.5 (AV=7.5, TV=8) and the exposure value of the spot area and the exposure value of the substantially entire screen are EVSP=15.5 and EVAM=18, respectively, no influence is substantially brought about by the flash lighting and the exposure level of the target object is proper as usual and it will be a catch light relative to the target object.

Then, the microcomputer 1 detects whether or not during the flash photography the red-eye phenomenon tends to occur. It can be done by making reference to the angle formed between the optical axis of the photo-taking lens and the firing center of the flash device with the apex occupied by the target object. The smaller this angle, the more frequent the occurrence of the red-eye phenomenon. It can also be determined whether or not the red-eye phenomenon even though it has actually occurred can be negligible or tolerable, depending on the size of the target object caught in the photo-taking screen. Since the minimum distance between the optical axis and the firing center of the built-in flash device 18 (hereinafter referred to as FL-L distance) is fixed once the design thereof has been determined, the above mentioned angle can be calculated if the distance to the target object is measured. By way of example, in the camera shown in FIG. 1, the red-eye phenomenon tends to occur if the distance to the target object is greater than 5 m, and if the lens has a focal length of 70 mm or greater, the red-eye phenomenon occurring in the target object spaced 5 m or more away from the camera cannot be tolerable. Accordingly, if the distance to the target object is smaller than 5 m or the focal length is smaller than 70 mm, the red-eye phenomenon does not substantially occur and can be tolerable even though it has actually occurred, and therefore, the problem associated with the red-eye phenomenon need not be substantially taken into consideration. The distance to the target object which is a criterion for the determination of the occurrence of the red-eye phenomenon varies with the FL-LE distance, and so does the focal length of the lens (that is, the size of the target object occupying the photo-taking screen) which would result in the red-eye phenomenon hard to be tolerable when a photo is prepared. Accordingly, the criterion for the determination of the distance to the target object and the focal length is preferably adjusted according to the above consideration.

Returning back to the flow shown in FIG. 7(H), if the distance to the target object is 5 m or more at step #825 and the focal length f of the lens is 70 mm or more at step #830, a display data b8=1 is set to effect a warning of the possible occurrence of the red-eye phenomenon, or otherwise the display data is reset, after which step #840 takes place. At step #840 a decision is made in reference to the terminal IP3 to determine if the release is effected, and in the event that it is determined that the release has been effected, a flag AFOKF indicative of the capability of AF is determined. If the flag AFOKF is set, an in-focus flag IFF is determined at step #855. Should this in-focus flag IFF be set, the program flow proceeds to step #850 to carry out a photo-taking action, but should it be not set, the program flow proceeds to step #925 to continue the AF operation (#845, #855). At step #845, if the AF-possible flat AFOKF is not set, it means that no AF operation can be carried out and, therefore, the program flow immediately proceeds to steps #850, et seqq. The microcomputer 1 renders a terminal OP9 to be in a high level state for a predetermined time T2, indicates an exposure mode to the external flash device 19 and effects a correction of the flash lighting amount (#860).

The camera in the illustrated embodiment of the present invention is contemplated to be of a TTL (through-the-lens) flash control type and is capable of controlling the amount of lighting depending on the amount of flash reflected from the target object. The amount of flash reflected from the target object is, assuming that the distance to the target object remains the same, proportional to the size of the target object occupying the photo-taking screen. However, in practice, for a given distance to the target object, the amount of lighting must be of a constant value regardless of the size of the target object occupying the photo-taking screen. What corrects this is a flash amount correcting routine. In reality, the size of the target object occupying the photo-taking screen depends on the distance to the target object and the focal length of the lens. Arrangement has been made in the illustrated embodiment that, when the lens of a focal length of 50 mm is mounted and an average person assumes a position spaced 2.8 m to 4 m away from the camera, a proper exposure (lighting control) can be obtained. Further description will be made assuming that the reflectance is of a standard value of 18%. When the size of the target object occupying the photo-taking screen is smaller than the target object occupying the photo-taking screen under the above described condition, a slight exposure to light is carried out as compared with the case wherein no correction is made, and, conversely, when it is greater than that, an ample exposure to light is carried out.

Figure 7J:
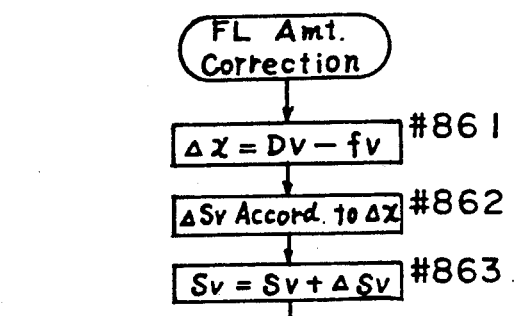
FIG. 7(J) is a flow chart for the flash amount correction executed at step #860 shown in FIG. 7(H)
Figure 7K:
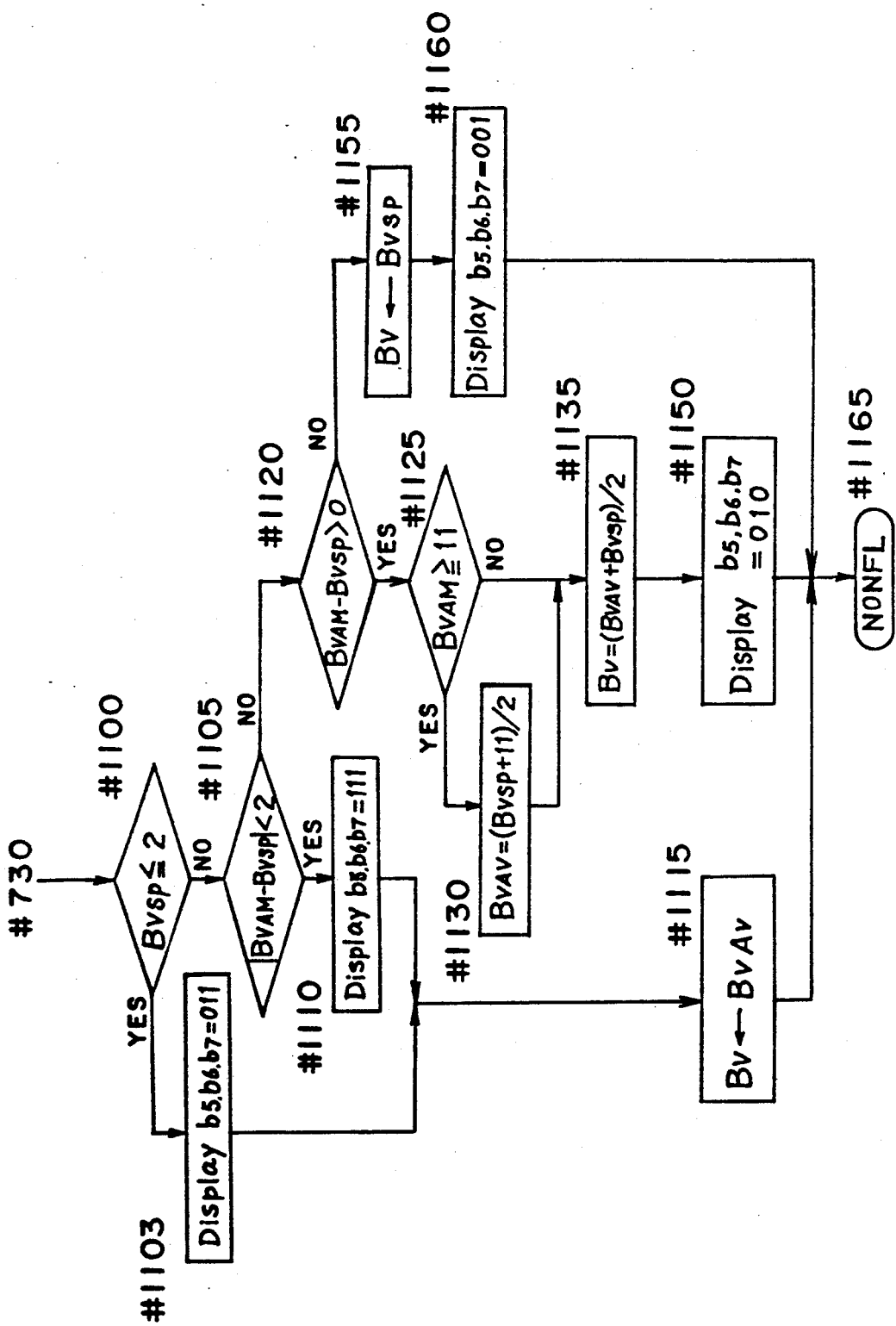

Referring to the flash amount correcting flow shown in FIG. 7(J), the microcomputer 1 subtracts the lens focal length fV from the distance DV to the target object to determine a parameter Δx (#861). This parameter Δx represents the size of the target object occupying the photo-taking screen and, if it is positive, exposure by flash light is reduced, but if it is negative, exposure by flash light is increased. Then, by this parameter Δx, the amount of correction ΔSV shown in Table 5 is read out from an internal memory for summation to the film sensitivity SV, the sum of the correction amount Δx and the film sensitivity SV being used as a new film sensitivity SV, thereby completing the correction (#862, #863). Thereafter, a bounce flag BNSF is determined, and if the photo-taking occurs under bounced flash lighting, a terminal OP13 is rendered to be in a high level state and the program flow proceeds to step #867. On the other hand, if no bounced flash lighting is effected, 0.5 is subtracted from the film sensitivity SV to establish a new film sensitivity SV and the program flow proceeds to step #867 (#864 to #866). This will be described later. At step #867, this film sensitivity SV is outputted to a D/A converting circuit with the microcomputer 1 returning to the flow shown in FIG. 7(H). The microcomputer 1 having returned to the flow of FIG. 7(H) causes a terminal OP7 to be in a high level state in readiness for the light control and issues an exposure initiating signal to the exposure control circuit 3. The exposure control circuit 3, in response to the aperture value signal and the shutter speed signal supplied from the microcomputer 1, effects an exposure control and, upon the completion of travel of leading curtain, causes an X contact (FIG. 8) to be turned on so that the photo-taking with the TTL direct flash control can be carried out during the actual photo-taking under flash lighting. Upon the subsequent completion of travel of the trailing curtain, the wind-up switch S3 is brought in the ON state with the exposure consequently completed (#872, #875). The microcomputer 1 when having detected an exposure completion signal from a terminal IP4 renders terminals OP7 and IP13 to be in a low level state and applies to the wind-up circuit 4 a one-frame advancing signal required to advance the film distance corresponding to one frame thereof (#880 to #890). When the completion of the one frame advancement of the film is detected in terms of the switch S3 having been brought into the OFF state, all of an AE lock flag AELF, an auxiliary flash firing command flag ALF, an auxiliary flash firing flag ALMF, a low contrast flag LCF, a flag GFF indicative of the lens extension and a bounce flag BNSF are sequentially reset with program flow proceeding to step #925. Even when the release switch S2 is not brought into the ON state at step #840, the program flow proceeds to step #925.

At step #925 a decision is made to determine if the photo-taking ready switch S1 is in the ON state, and if it is in the ON state, the flow from step #190 et seqq. is repeated, but if it is in the OFF state, a signal necessary to stop the AF motor M2 is outputted and, then, all of the AE lock flag AELF, the auxiliary flash firing command flag ALF, the auxiliary flash firing flag ALMF, the low contrast flag LCF, the lens extension flag GFF, the bounce flag BNSF, a flag FDF indicative of the far distance to the target object and the in-focus flag IFF are sequentially reset with the program flow subsequently proceeding to step #160 to permit the microcomputer 1 to effect the subsequent controls.

Figure 6B:
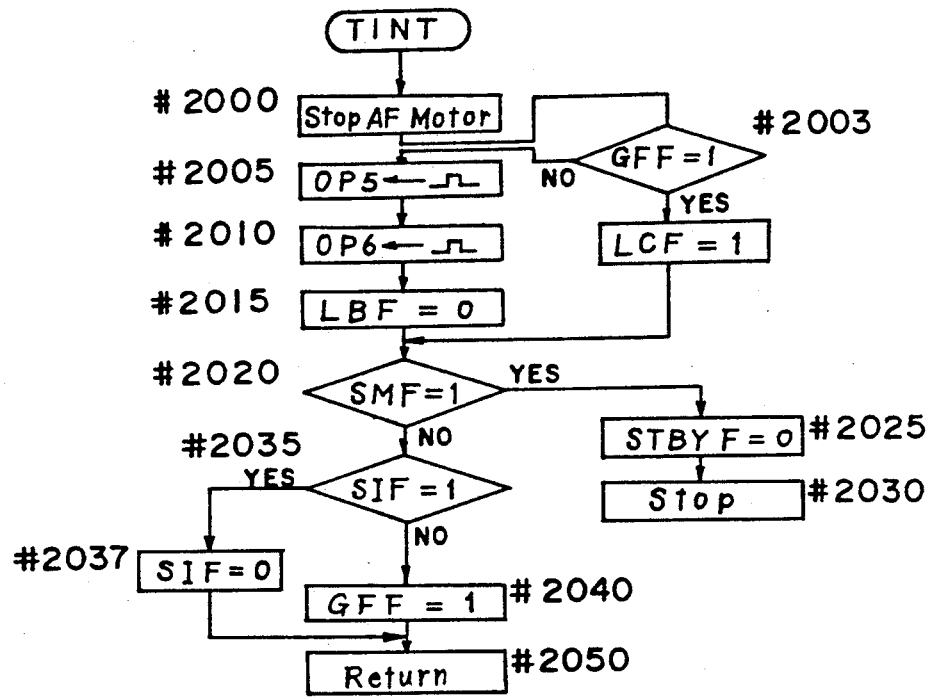
FIG. 6(B) is a flow chart showing a flow (TINT) executed in the event of a timer interruption.

Hereinafter, the flow TINT for the timer interruption and the flow PINT for the interruption by the encoder pulse will be described with reference to FIGS. 6(B) and 6(D), respectively. The timer interruption TINT is effected, when no pulse from the encoder is applied to the microcomputer 1 within a predetermined length of time to detect the complete movement of the lens to either the nearest end position or the farthest end position. When this timer interruption TINT is entered, the microcomputer 1 generates a signal required to stop the AF motor M2 and makes a decision to determine if it is in the direction of extension in terms of whether or not the flag GFF is set. If this flag GFF is set, the low contrast flag LCF is set, followed by step #2020, but if it is not set, it generates pulse signals from the terminals OP5 and OP6 to reset counters CNT2 and CNT3, respectively, and resets the lens retraction flag LBF, followed by step #2020 (#2000 to #2015). Since in this way the counters CNT2 and CNT3 are reset at the farthest end position (infinity position), any error between the lens extension amount and the value of the counter CNT2 can be cleared. Then, the microcomputer 1 makes a decision to determine if the interruption is effected by the flow for the operation of the main switch SM in view of the flag SMF, and if it is effected by the main switch SM, a stand-by flag STBYF is reset to stop (#2025, #2030). On the other hand, if it is not effected from the main switch SM, a decision is made in reference to the flag SIF to determine if a forced interruption is effected by the ready switch S1, and if it is effected by the ready switch S1 (when SIF=1), the flag SIF is reset, but if it is effected by the ready switch S1 signifying that the lens is brought to the end position as a result of the low contrast scanning, the flag GFF is set followed by the return to the step at which the interruption is entered.

Figure 6C:
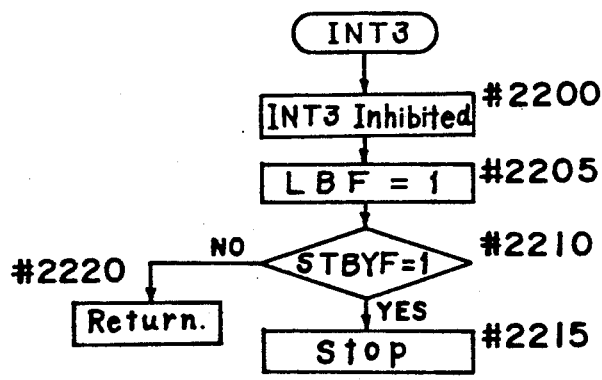
FIG. 6(C) is a flow chart showing a flow (INT3) of interruption caused by a lens mount switch (SL)
Figure 6D:
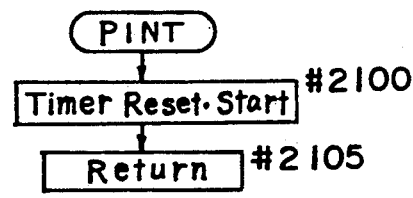
FIG. 6(D) is a flow chart showing a flow (PINT) executed in the event of an encoder pulse interruption.

Referring to FIG. 6(D) showing the flow PINT for the interruption by the encoder pulse, in this instance, a timer for the interruption is reset and started, followed by the return to the initial flow (#2100, #2105).

Referring to FIG. 6(C), the flow INT3 for the interruption effected by the lens mount switch SL will now be described. At the outset, interruption to this flow INT3 is inhibited (#2200). This is for the purpose of avoiding the interruption each time the switch SL is brought into the ON state since the switch SL is repeatedly on and off five times during the mounting operation of the lens. Then, the microcomputer 1 sets the lens retraction flag LBF (#2205), determines the stand-by flag STBYF (#2210), and stops (#2210) when the flag STBYF is set or returns to the initial flow (#2220) when the flag STBYF is not set.

The details of the interface circuit 17 shown in FIG. 2 will be hereinafter described with reference to FIG. 8. During the transmission of data with the lens the microcomputer 1 generates a high level signal from a terminal CS which is applied to a terminal CS in the lens circuit 20 within the lens thereby to bring the lens circuit 20 in a condition ready to receive data. At the same time an AND circuit AN2 is brought into an active state in response to the high level signal from the terminal CS of the microcomputer 1, and clocks from a terminal SCK of the microcomputer 1 are outputted to a terminal SCK of the lens circuit 20. The lens circuit 20, in response to the set-up of the clock, outputs a data signal from a terminal SOUT bit by bit, which data signal is outputted to a terminal SIN of the microcomputer 1 through an AND circuit AN3, then brought into an active state in response to a signal from the terminal CS, and an OR circuit OR1 following the AND circuit AN3. (The details of this lens circuit are disclosed in the Japanese Laid-open Patent Publication No. 59-84228.)

Since at this time both of AND circuits AN5 and AN4 to which an inverted version of the high level signal emerging from the terminal CS of the microcomputer 1 is applied are in an inactive state, no clock is outputted to the external flash device 19 and no data signal from the external flash device 19 is inputted to the microcomputer 1.

On the other hand, since the terminal CS of the microcomputer 1 is in a low level state when the data transmission takes place with the external flash device 19, all of the AND circuits AN4, AN5 and AN6 are in an active state. The microcomputer 1 outputs a high level signal for a predetermined time T1 from a terminal OP9 to indicate the data transmission mode, which high level signal is applied to the external flash device 19 through the AND circuit AN6 and then the OR circuit OR2, and at the same time, outputs from the terminal SCK clocks for the data transmission to the external flash device 19 through the AND circuit AN5 and the OR circuit OR2. In response to the set-up thereof, data is bit by bit inputted to the terminal SIN of the microcomputer 1 from a terminal SOP of the external flash device 19 through the AND circuit AN4 and the OR circuit OR1.

Here, the external flash device 19 will be explained with reference to FIG. 11. At the initial state, terminals FC and ES of a timer discriminating circuit 50 are in a low level state, and a NOR circuit OR7 having its input terminals connected with the respective terminals FC and ES outputs a high level signal to one of input terminals of an AND circuit AN16. In this way, the AND circuit AN16 is held in an active state. The high level signal is, during the predetermined time T1 indicative of the data transmission mode, applied from the microcomputer 1 to a terminal SIP of the external flash device 19 and then to a terminal DS of the timer discriminating circuit 50 through the AND circuit AN16. At this time, the timer discriminating circuit 50 counts the number of clocks applied from an oscillating circuit 44 to a terminal CK of the timer discriminating circuit 50 through an AND circuit 17 then brought into an active state by the high level signal from the AND circuit AN16, and measures the predetermined time T1. Then, if the timer discriminating circuit 50 determines the data transmission mode, the level of a terminal FC of the timer discriminating circuit 50 is rendered to be a high level state to bring the AND circuit AN13 into an active state and waits for clocks which are to be applied thereto from the microcomputer 1 through the terminal SIP. When the clock is inputted from the microcomputer 1 through the terminal SIP, this clock is applied to a clock terminal CK of a parallel-serial converter (hereinafter referred to as a P/S converter) 41 through the AND circuit AN13 then in the active state. After a mixing circuit 42 has been applied and mixed with a data (5-bit) of the guide number outputted from a guide number output circuit 43, a data (1-bit) outputted from a charge completion detecting circuit 48 indicating the completion of charging, a data (1-bit) indicative of whether or not it is a bounced flash photography determined by switching on the bounce switch BSW, and a data (1-bit) indicative of a mounting signal, they are outputted to the P/S converter 41 in the from of a 8-bit parallel data. In response to the set-up of the clock inputted to the terminal CK the P/S converter 41 outputs the 8-bit data bit by bit serially. It is to be noted that the mounting signal can be formed in the mixing circuit 42.

The clock signal outputted from the AND circuit AN13 is also inputted to a counter 45 which applies a high level signal to a one-shot circuit OS5 when the counter 45 has counted 8 clocks. A pulse signal emerging from the one-shot circuit OS5 is inputted to a reset terminal R of the timer discriminating circuit 50 through an OR circuit OR6 whereby the timer discriminating circuit 50 is reset to render a terminal FC to be in a low level state.

Similarly, during a predetermined time T2 representative of the exposure mode a high level signal is inputted to a terminal DS of the timer discriminating circuit 50 through the terminal SIP and AND circuit AN16, and when the timer discriminating circuit 50 determines it, it generates a high level signal from a terminal ES. Thereby, the AND circuit AN14 is brought into an active state and, when a flash firing stop signal FEN generated from a light control circuit 16 (FIG. 2) as will be described later is inputted from the terminal SIP, the AND circuit AN14 generates a high level signal to a firing control circuit 47 thereby to stop the flash firing. The high level signal from the terminal ES of the timer discriminating circuit 50 is inputted to a reset terminal R of a timer 46 as a pulse signal through the one-shot circuit OS3. Thereby the timer 46 starts it counting operation and, after it has counted a predetermined length of time, generates a high level signal to the reset terminal R of the timer discriminating circuit 50 through the one-shot circuit OS4 and an OR circuit OR6 to reset the timer discriminating circuit 50. The length of time counted by the timer 46 is a time elapsed substantially from the inputting of a release initiating signal to the completion of the travel of the trailing curtain when at a shutter speed (1/60).

Figure 11:
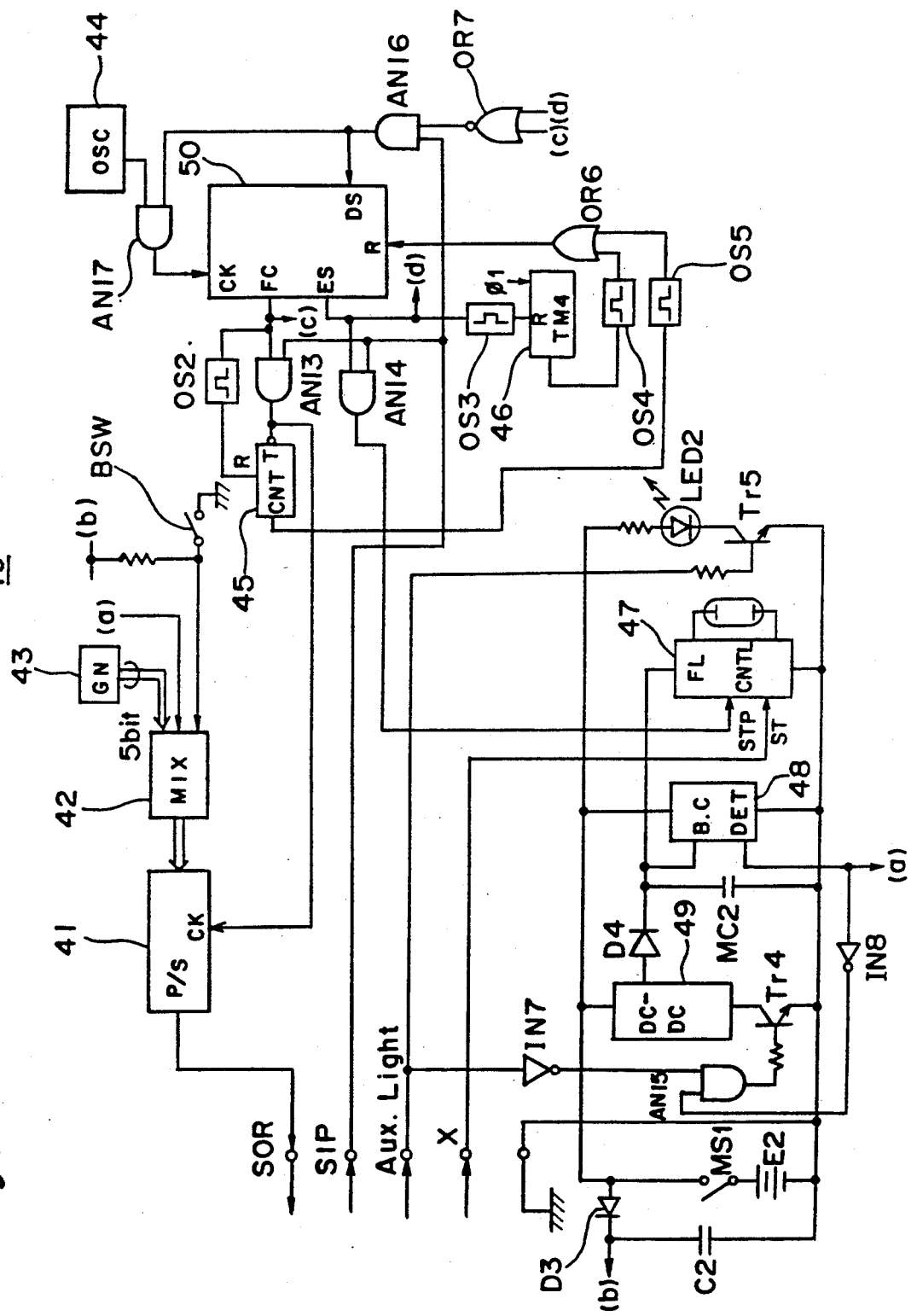
FIG. 11 is a diagram showing a circuit of an external flash device (19) shown in FIG. 2.

When an auxiliary light signal is inputted to the external flash device 19 shown in FIG. 11 from a terminal OP10 of the microcomputer 1, a transistor TR5 is switched on to light an LED2. It is to be noted that, in front of this LED, a filter having a random pattern is disposed. The details of this filter are disclosed in the Japanese Patent Application No. 59-261194.

In addition to the component parts described hereinbefore, the external flash device 19 also includes a power source E2, a main switch MS1, a DC-DC converter 49, an AND circuit AN15 for controlling this DC-DC converter 49, a transistor Tr4, a rectifying diode D4, a main capacitor MC2, a charged-voltage detecting circuit 48, a reverse-flow preventive diode D3, and a capacitor C2 for back-up. Upon the completion of the charging, or during the firing of the auxiliary light, the AND circuit AN15 generates a low level signal, the transistor Tr4 is switched off accompanied by the switching off of the DC-DC converter circuit 49, and the boosting is interrupted. When a firing signal X is inputted to the firing control circuit 47 from an interface circuit INF2 (FIG. 8) in the camera body, the firing control circuit 47 performs a control for initiating the firing. A switch BSW shown therein is a bounce switch which is manually turned on during the bounced flash photography.

Referring back to FIG. 8, the control for the flash photography will be described. When the release operation is initiated, a high level signal is outputted from a terminal OP7 of the microcomputer 1, which signal is transformed into a pulse by the one-shot circuit OS6 and is inputted to the reset terminals of respective RS flip-flops RS1 and RS2 to reset the latter. At the same time, the high level signal emerging from the terminal OP7 of the microcomputer 1 is inputted to a first input terminal of the OR circuit OR3 through an inverter IN4, one terminal of the X contact being grounded, and the other terminal being connected with a second input terminal of the OR circuit OR3. When in this condition the leading curtain of the shutter has completely traveled, the X contact is switched on to close and, therefore, an output terminal of the OR circuit OR3 is rendered to be in a low level state with the consequence that the reset of a timer circuit TM11 is released and starts counting a time. An output signal from this OR circuit OR3 is inverted by an inverter IN5 and inputted to an AND circuit AN7. Since the AND circuit AN7 is brought into an active state at the time the RS flip-flop RS1 has been reset, it generates a high level signal in response to a high level signal from the inverter IN5. This signal is outputted as the X signal to the external flash device 19 and, at the same time, brings an AND circuit AN8 into an active state.

When not under the bounced flash lighting, since the terminal OP13 of the microcomputer 1 is in a low level state, an output from the inverter IN6 is in a high level state, and the AND circuit AN8 outputs a high level signal for initiating the firing to the firing control circuit 32 of the built-in flash device 18 through the OR circuit OR4. On the other hand, when under the bounced flash lighting, the built-in flash device 18 does not fire simultaneously with the external flash device 19. The timer circuit TM11 outputs high level signals from respective terminals T1 and T2 2.5 and 3.5 msec. after the X contact has been switched on, to set the RS flip-flops RS1 and RS2. Therefore, the AND circuit AN7 receiving an output from an output terminal $\overline{Q}$ of the RS flip-flop RS1 outputs a high level signal during a period of 2.5 msec. subsequent to the switching on of the X contact and a low level signal during a period other than that period. On the other hand, the AND circuit AN9 receiving an output from an output terminal Q of the RS flop-flop RS2, since a high level signal is inputted from the terminal OP13 of the microcomputer 1 when under the bounced flash lighting, outputs a high level signal 3.5 msec. after the X contact has been switched on, which signal is outputted through the OR circuit OR4 to the firing control circuit 32 to cause the built-in flash device 18 to initiate its firing 3.5 msec. subsequent to the switching on of the X contact. The respective high level signals from the AND circuits AN7 and AN9 are also outputted to the NOR circuit NOR1, and the NOR circuit NOR1, in response to these high level signals, outputs to an AND circuit AN10 a high level signal before the X contact is switched on, a low level signal during a period of 2.5 msec. subsequent to the switching on of the X contact, a high level signal after 2.5 msec. has passed subsequent to the switching on of the X contact and before 3.5 msec has passed, and a low level signal after 3.5 msec, has passed subsequent to the switching on of the X contact. A signal from a terminal OP15 of the microcomputer 1 which generates a high level signal upon the completion of the charging is connected with the other input terminal of the AND circuit AN10, and, therefore, the AND circuit AN10 outputs from an output terminal INT to the light control circuit 16 (FIGS. 2 and 12), as will be described later, a high level signal when the charge has been completed, but a low level signal when the charge has not yet been completed.

The firing stop signal FEN from the light control circuit 16 (FIGS. 2 and 12) is outputted to the firing control circuit 47 of the external flash device 19 through the OR circuit OR2 and also to the firing control circuit 32 of the built-in flash device 18 through an OR circuit OR5 following the AND circuit AN11 or AN12, thereby to stop the flash firing.

The flash amount control operation of the flash device will be described with reference to the concrete example of the light control circuit 16 shown in FIG. 12.

Figure 12:
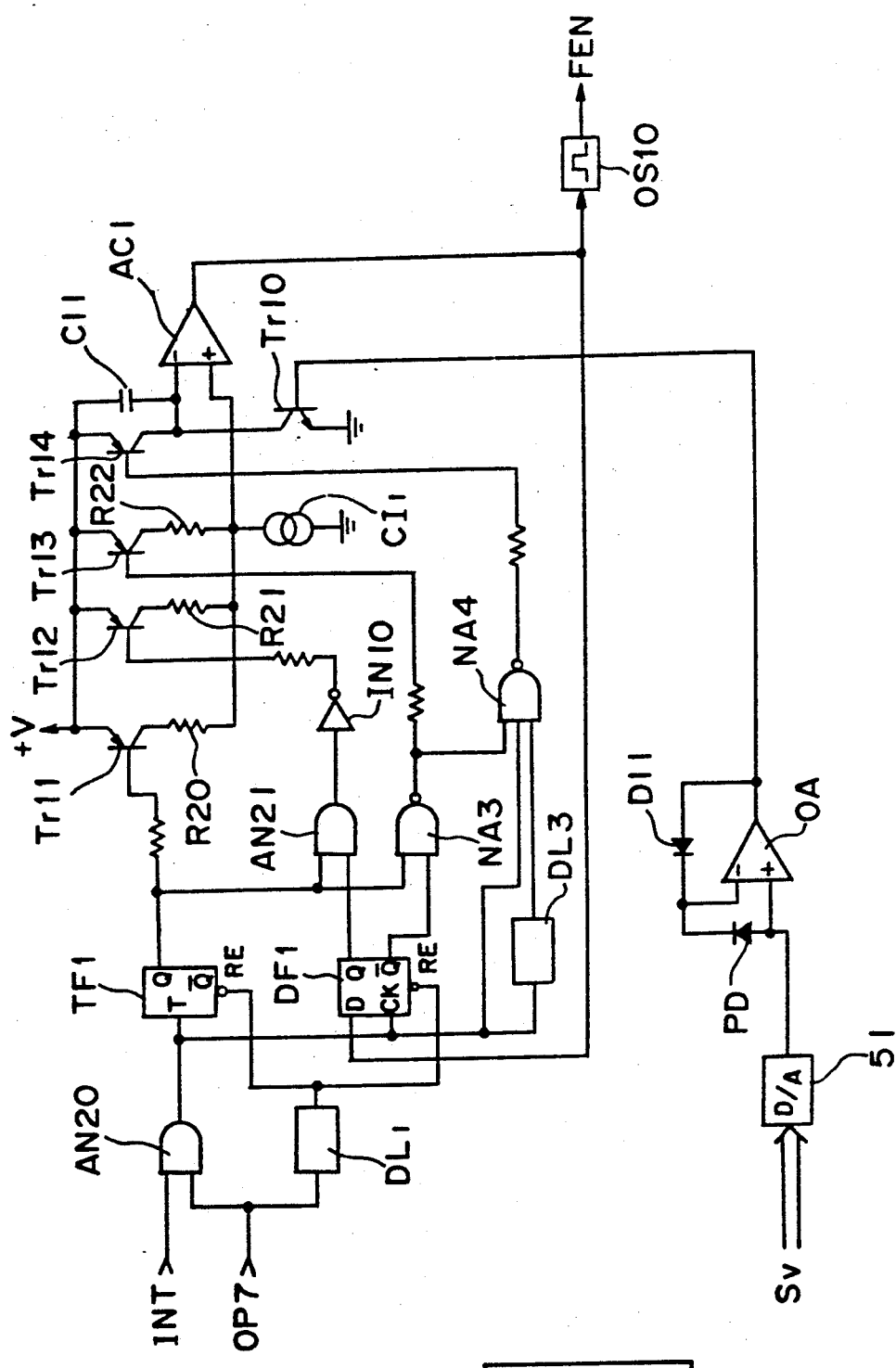
FIG. 12 is a diagram showing a circuit of a flash light control circuit (16) shown in FIG. 2.

Referring now to FIG. 12, reference character PD represents a light receiving element disposed at a position where it receives a beam of light having passed through the photo-taking lens and the aperture of the camera and having been subsequently reflected from a film plane and so designed as to aim at the substantially entire screen with the center aligned with a central portion thereof. An output current from this light receiving element PD is logarithmically compressed by a diode D11. Information of the film sensitivity SV is inputted from the microcomputer 1 to a digital-to-analog converting circuit (D/A circuit) 51 and, after the D/A conversion, the D/A converter 51 outputs a SV signal when under the bounced flash lighting mode, but a SV-0.5 signal when not under the bounced flash lighting mode. An output from an operational amplifier OA contains information associated with the intensity QV of flash light reflected from the target object, the control aperture AVf and the film sensitivity SV when the flash lighting is effected, and an analog signal voltage of $\{QV+SV-AVf\}$ or $\{QV+(SV-0.5)-AVf\}$ is applied to the base of a transistor Tr10. It is to be noted that QV−AVf is a value, logarithmically compressed by the diode D11, of the intensity of the flash light reflected from the target object and received by the light receiving element PD as information of light which has passed through the photo-taking lens and the aperture. The analog signal output from the operational amplifier OA is logarithmically expanded and outputted as a collector current from the transistor Tr10, which collector current is integrated by a capacitor C11. Accordingly, the integrated voltage of the capacitor C11 is expressed as follows.

$$2^{Sv} \times \int 2^{Qv} dt / 2^{Avf} \tag{5}$$

or $$2^{(Sv-0.5)} \times \int 2^{Qv} dt / 2^{Avf}$$

A terminal OP7 shown in FIG. 12 is connected with the terminal OP7 of the microcomputer 1 and is rendered to be in a high level state when the exposure control operation is initiated as hereinbefore described and, when this terminal OP7 is rendered to be in the high level state, an AND circuit AN20 is brought into an active state. Also, the high level signal from the terminal OP7 is delayed by a delay circuit DL1, after which it is applied to inverted reset terminals RE of respective T flip-flop TF1 and D flip-flop DF1, to release the flip-flops TF1 and DF1 from being reset and to bring them in an operative state. Accordingly, at this moment, $\overline{Q}$ outputs of the flip-flops TF1 and DF1 are in a low level state and a Q outputs thereof are in a high level state. The terminal INT is connected with an output of the AND circuit AN10, shown in FIG. 10, and during the exposure mode this terminal INT is in a high level state until the flash firing is effected provided that the charging has been completed, and in a low level state for 2.5 msec. and in a high level state for 1 msec. when the X contact has been closed, and in a low level state thereafter. Accordingly, at the moment the output from the delay circuit DL1 shown in FIG. 12, is brought into a high level state, an output from an AND circuit AN21 is in a low level state, an output of an inverter IN10 is in a high level state, an output from an NAND circuit NA3 is in a high level state, and an output from an NAND circuit NA4 is in a low level state, and transistors Tr11 and Tr14 are in a conductive state. Accordingly, a non-inverting input terminal of a comparator AC1 is in a level determined by a resistor R20 and a constant current source CI1, the resistance of the resistor R20 and the current of the constant current source CI1 being so selected that a potential of a level 70% of a proper exposure level can appear at the non-inverting input terminal of the comparator AC1.

Starting from the case not under the bounced flash photography mode, the light control operation will be described. When the flash firing is effected, the output of the AND circuit AN20 is rendered to be in a low level state and an output of the NAND circuit NA4 is rendered to be in a high level state with transistor Tr14 brought into a non-conductive state, and the collector current of the transistor TR10 is integrated by the capacitor C11. In this case, since a signal of (SV−0.5) is outputted from the D/A converter 51, the output from the comparator AC1 is inverted into a high level state when the following condition is established.

$$2^{Sv} \times \int 2^{Qv} dt/2^{Avf} \times 2^{0.5} = 0.7 \times 2^{Sv} \times \int 2^{Qv} dt/2^{Avf} = 0.7 K \quad (6)$$

Upon the inversion of the output from the comparator AC1 into the high level state, the one-shot circuit OS10 generates a high level pulse which is applied to the external flash device 19 through the OR circuit OR2, shown in FIG. 8, or to the built-in flash device 18 through the the OR circuit OR5 following the AND circuit AN11 or AN12 to interrupt the flash firing. The equation (6) becomes;

$$\int 2^{Qv} dt = \frac{2^{Avf} \times K}{2^{Sv}} \quad (7)$$

and, therefore, the flash firing continues until the proper exposure is attained.

Under the bounced flash photography mode, the firing operation of one flash is carried out in a manner similar to that described hereinabove. However, at this time a signal of SV is outputted from the D/A converter 51 and, accordingly, it will become;

$$\int 2^{Qv} dt = 0.7 \frac{2^{Avf} \times K}{2^{Sv}} \quad (8)$$

and the flash amount $\int 2^{Qv} dt$ attains 70% of the proper exposure amount. When the terminal INT sets up from the low level state to the high level state after the lapse of 2.5 msec., the flip-flop TF1 inverts its output with the Q and $\overline{Q}$ outputs rendered to be in high and low level states, respectively, if the flash amount of one flash has attained 70% of the proper exposure. At this time, a flip-flop DF1 receives an output from a comparator AC1 and generates a high level signal and a low level signal from a Q output terminal Q and a $\overline{Q}$ output terminal, respectively, if the flash amount of one flash has attained 70% of the proper exposure. If the flash amount of one flash has not yet attained 70% of the proper exposure, the output from the comparator AC1 remains in the low level state and, therefore, the Q and $\overline{Q}$ outputs of the D flip-flop DF1 remain in the low and high level states, respectively. However, if the flash amount of one flash has attained 70% of the proper exposure, the output of the NAND circuit NA3 remains in the high level state and, therefore, the output of the NAND circuit NA4 is rendered to be in a low level state after a predetermined time determined by the delay circuit SL3 subsequent to the timing at which the terminal INT is brought into a high level state, thereby to switch the transistor Tr14 on to permit the capacitor C11 to discharge its integrated charge. On the other hand, unless the flash amount of one flash attains 70% of the proper exposure, the output of the NAND circuit NA3 is reversed to the low level state. Therefore, even when the output of the delay circuit D13 is reversed into the high level state, the output of the NAND circuit NA4 remains in the high level state, the transistor Tr14 does not conduct, and, therefore, the integrated charge of the capacitor C11 for one flash is retained.

In the event that the flash amount of one flash has attained 70% of the proper exposure, the output of the AND circuit AN21 is rendered to be in a high level state, and the output of the inverter IN10 is rendered to be in a low level state with the consequence that the transistor TR12 is brought into a conductive state, and the level of the non-inverting input terminal of the comparator AC1 attains a level determined by the resistor R21 and the constant current source CI1. The resistance of the resistor R21 and the constant current of the constant current source CI1 are so selected as to permit a potential of 30% of the proper exposure to appear at the non-inverting input terminal of the comparator AC1. On the other hand, unless it is not attained 70% of the proper exposure, the output of the NAND circuit NA3 is in a low level state and the transistor TR13 conducts. Therefore, the level of the non-inverting input terminal of the comparator AC1 is of a level determined by the resistor R22 and the constant current source CI1, the resistance of the resistor R22 and the current of the constant current source CI1 being so selected as to permit a potential of a level corresponding to the proper exposure to appear at the non-inverting input terminal of the comparator AC1. Then, when the firing of the second flash is to be initiated, the terminal INT sets down to a low level state and, in the event that the first flash has attained 70%, the transistor Tr14 is again brought into the non-conductive state and the collector current of the transistor Tr10 is again integrated by the capacitor C11.

On the other hand, in the event that the exposure amount resulting from the firing of one flash has not yet been attained 70% of the proper exposure, the transistor Tr14 remains in the non-conductive state and, therefore, the capacitor C11 integrates to add the integrated charge resulting from the firing of the second flash to the integrated charge resulting from the firing of the first flash. When the exposure resulting from the firing of the first flash attains 70% of the proper exposure, the firing stop signal is outputted when a condition expressed by the following equation;

$$\int 2^{Qv2} dt = 0.3 \times \frac{2^{Avf}}{2^{Sv}} \times K \quad (9)$$

is attained, and the flash amount of the second flash attains 30% of the proper exposure, and in this case the ratio of flash amounts of the first and second flashes is 7:3, and, therefore, the sum of these flash amounts results in the proper exposure. In this instance, $QV_2$ represents the intensity of light reflected from the target object and received by the light receiving element PD in the second flash, and, hereinafter, the intensity of the reflected light in the first flash will be expressed by $QV_1$. On the other hand, in the event that the flash amount of the first flash has not attained 70% of the proper exposure, and when a condition expressed by the following equation;

$$\int (2^{Qv}1 + 2^{Qv}2)dt = \frac{2^{Avf}}{2^{Sv}} \times K \quad (10)$$

is established, a firing stop signal for the second flash is outputted. Therefore, although in this case the ratio of the flash amounts of these two flashes cannot be controlled to 7:3, the proper exposure can be guaranteed by the two flash firings.

Modifications of the foregoing embodiment will now be described.

Figure 14:
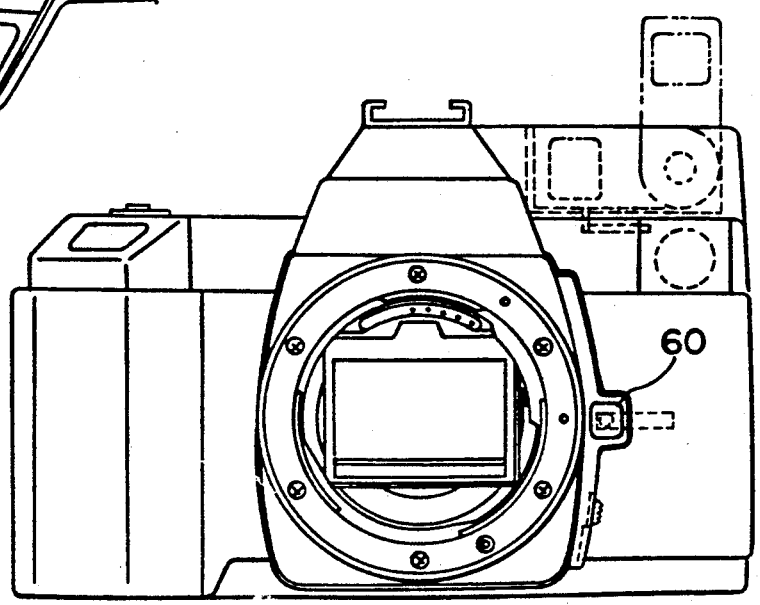
FIG. 14 is a front elevational view of the camera showing a modified form of the switch for detecting the mounting of the lens.

In the foregoing embodiment the switch for detecting the mounting of the lens is formed by providing the plates 105, formed with the terminal for exchange of information with the lens as shown in FIG. 1(A) and FIGS. 5(A) and 5(B), with an additional terminal. However, it can be accomplished by providing a switch operatively associated with a member 60 which, as shown in FIG. 14, can be depressed for disengaging the lens from the camera body when the lens is to be removed, which switch will be turned on when the member 60 is depressed. A flow chart may be identical with that shown in FIG. 6.

Also, a modification for detecting the lens being removed will be illustrated. In this modification, the removal of the lens is detected without the lens mount switch being provided and, for this purpose, the microcomputer 1 is interrupted at intervals of a predetermined time while the microcomputer is halted, to effect a data transmission between the microcomputer 1 and the circuit 20 within the lens, whether or not the lens is mounted being determined depending on a result of the data transmission. A flow for this interruption T2INT and a circuit construction for this modification are shown respectively in FIGS. 15 and 16, it being, however, to be noted that, other than this, a timer for the interruption has to be reset and started before the halt of each flow to permit the interruption T2INT and, also, the interruption T2INT has to be inhibited when a flow other than this interruption T2INT is entered.

Figure 16:
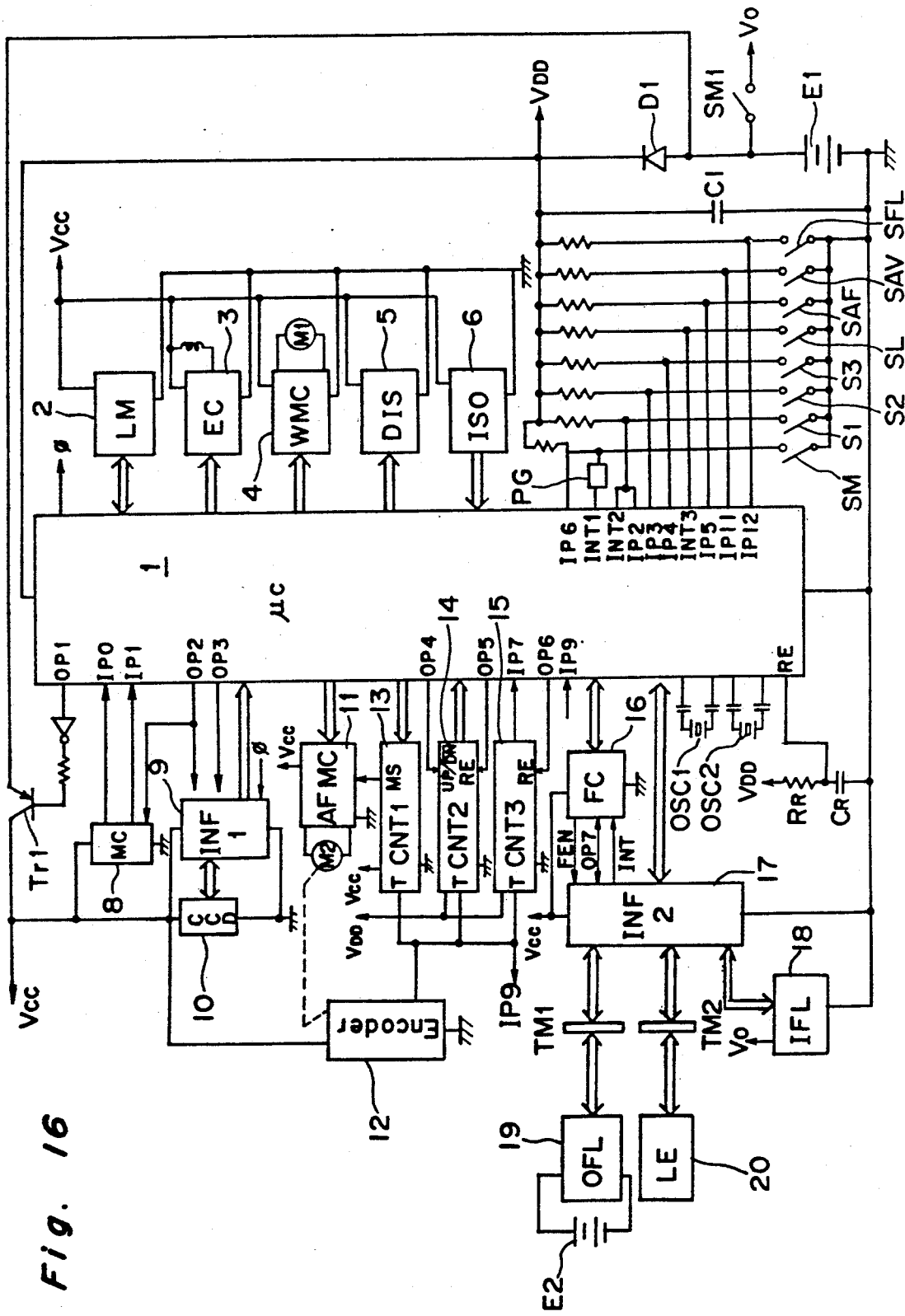
FIG. 16 is a block diagram showing the modified entire circuit of the camera of FIG. 1(A) provided with two oscillating elements.

FIG. 16 illustrates the circuit wherein, in addition to the oscillating element OSC1 shown in FIG. 2, an oscillating element OSC2 slower in oscillating frequency than that of the oscillating element OSC1 is utilized, and the amount of electric power consumed can be minimized by selectively utilizing these oscillating elements one at a time.

Figure 15:
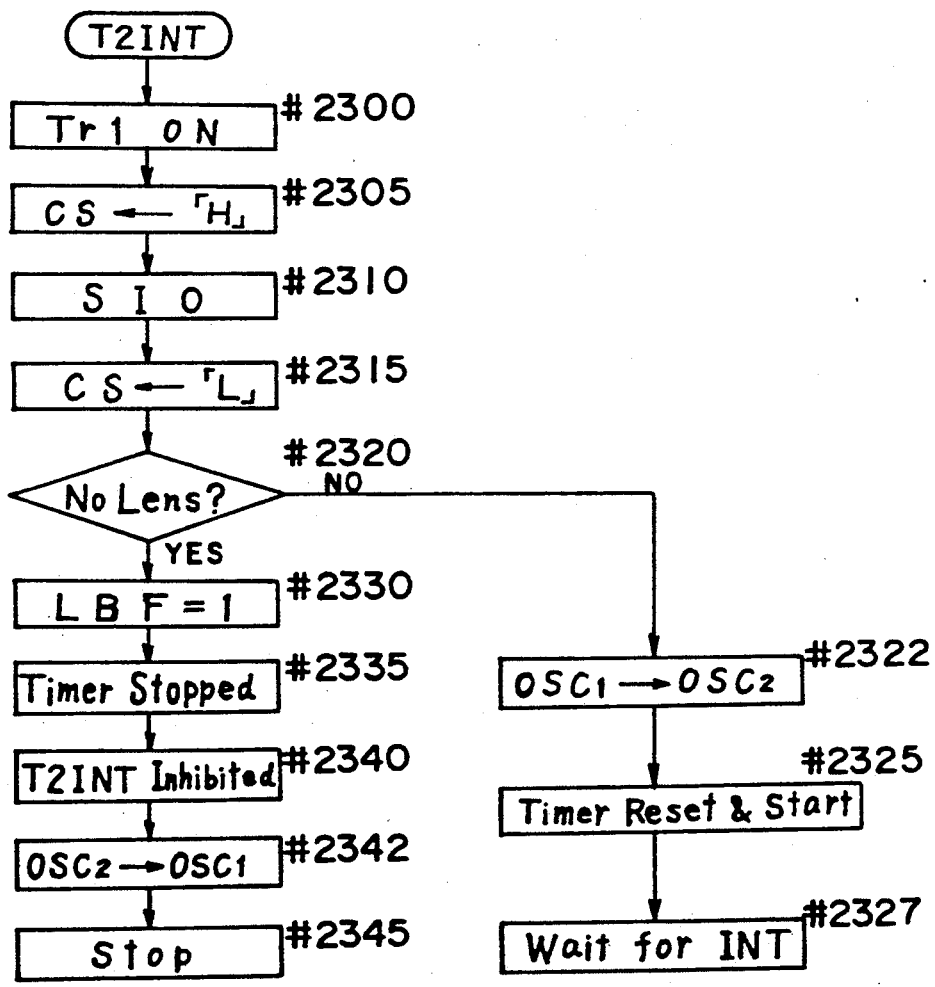
FIG. 15 is a flow chart showing a flow (T2INT) for the interruption for detecting the mounting of the lens by carrying out a data transmission with a circuit within the lens while the microcomputer is interrupted.

Referring now to FIG. 15, the power supply transistor Tr1 shown in FIG. 16 is switched on and, then, a serial data transmission with the lens circuit 20 is carried out one time (#2300 to #2315). A data clarifying whether or not the lens is mounted is included in this data transmitted from the lens circuit 20 and, accordingly, a decision is being made to determine if the lens is mounted. In such case, since the data indicative of the mounting of the lens is included in the first data, no more data transmission is required. However, in the event that no data indicative of the mounting of the lens is included, data transmission should be carried out until the data indicative of the mounting of the lens is read out. In the event that the lens is mounted, switching is made to the oscillating element OSC2 having an oscillating frequency slower than the normal oscillating frequency, followed by the resetting of the timer to start until the interruption is effected (#2320, #2325). In the event that no lens is mounted, a lens back flag LBF is set, the timer is halted to inhibit the interruption to this flow, and during the subsequent interruption, the oscillating element is switched so as to utilized the oscillating element OSC1 having the high speed oscillating frequency, followed by the stop. That is all right if the lens once detached is detected. This is because, when the lens once detached is again mounted, it may happen that the contents of the counter (CNT2) 14 actual lens extension amount and, in order to compensate for this difference, when the photo-taking ready switch S1 is turned on, the detachment of the lens is detected so that the lens can be retracted, and it suffices that the detachment of the lens once effected is detected.

In describing the present invention in connecting with the preferred embodiment with reference to the accompanying drawings, reference has been made to the application to the camera. However, the present invention can be broadly applicable to any photo-taking device having the photo-taking lens.

TABLE 1

| Maximum Bit | Value of Integer Portion of $\log_2 n$ |
|---|---|
| $a_0$ | 0 |
| $a_1$ | 1 |
| $a_2$ | 2 |
| $a_3$ | 3 |
| $a_4$ | 4 |
| $a_5$ | 5 |
| . | . |
| . | . |
| . | . |
| $a_{12}$ | 12 |
| $a_{13}$ | 13 |
| $a_{14}$ | 14 |
| $a_{15}$ | 15 |

TABLE 2

| Dv | Distance |
|---|---|
| . | . |
| . | . |
| −1 | 70 cm |
| 0 | 1 m |
| 1 | 1.4 m |
| 2 | 2 m |
| 3 | 2.8 m |
| . | . |
| . | . |
| 10 | 32 m |
| 11 | 45 m |
| 12 | 64 m |
| . | . |
| . | . |
| FF | ∞ |

TABLE 3

| Flash Amt. Data of External Flash Device | Total Flash Amt. Data (IV-Total) |
|---|---|
| −1 | 3 |
| 0 | 3 × ½ |
| 1 | 3 × ¼ |
| 2 | 3 × ½ |
| 3 | 4 |
| 4 | 4 × ½ |
| 5 | 5 × ½ |
| 6 | 6 |
| . | . |
| . | . |

TABLE 7

|  | OP17 | OP18 | OP19 | Display |
|---|---|---|---|---|
| In-focus | H | L | L | ◁○▷ |
| Direction of Extension | L | H | L | ◁○▵ |
| Direction of Retraction | L | L | H | ▴○▷ |

TABLE 6

| b₀ | b₁ | b₂ | b₃ | b₄ | b₅ | b₆ | b₇ | b₈ | DISPLAY CONDITION | DISPLAY CONTENTS |
|---|---|---|---|---|---|---|---|---|---|---|
| 1 | X | X | X | X | X | X | X |  |  | Flash photography |
| X | 1 | X | X | X | X | X | X |  | MR | Macro photography |
| X | X | 1 | X | X | X | X | X |  | BS | Photo-taking under bounced lighting |
| X | X | X | 1 | 0 | X | X | X |  | NF | Photo-taking under ambient lighting |
| X | X | X | 0 | 1 | X | X | X |  | FL | Photo-taking under flash lighting |
| X | X | X | 1 | 1 | X | X | X |  | A | Auto-exposure mode |
| X | X | X | X | X | 1 | 1 | 1 | X |  | No significant difference in brightness between the background and the center area |
| X | X | X | X | X | 0 | 0 | 1 | X |  | When the background is dark. For example, a flash photography in the night, or the photo-taking on a theatre stage. |
| X | X | X | X | X | 0 | 1 | 0 | X |  | When the background is brighter than the center area. For example, back-lighting condition |
| X | X | X | X | X | 0 | 1 | 1 | X |  | When the whole scene is dark during the night |
| X | X | X | X | X | 1 | 0 | 0 | X |  | Limited brightness at the center area |
| X | X | X | X | X | X | X | 1 |  | blinking | Possible occurrence of a red-eye phenomenon |
| 0 | 0 | 0 | 0 | 0 | 0 | 0 | 0 |  |  | Totally turned off |

(NOTE) X represents an arbitrarily chosen 0 or 1.

TABLE 4

| Data of Focal Length (fv) | Focal Length (f) mm. | Distance (DV) |
|---|---|---|
| . | . | . |
| . | . | . |
| . | . | . |
| 3 | 28 | 3 |
| 4 | 35 | 4 |
| 5 | 50 | 5 |
| 6 | 70 | 6 |
| 7 | 105 | 7 |
| 8 | 150 | 8 |
| 9 | 210 | 9 |
| 10 | 300 | 10 |
| 12 | 600 | 12 |
| . | . | . |
| . | . | . |
| . | . | . |

TABLE 5

| Parameter Δx | Correction Amt. ΔSv |
|---|---|
| . | . |
| . | . |
| −6 ≦ Δx < −5 | −0.6 |
| −5 ≦ Δx < −4 | −0.4 |
| −4 ≦ Δx < −3 | −0.2 |
| −3 ≦ Δx ≦ −1 | 0 |
| −1 < Δx ≦ 0 | 0.2 |
| 0 < Δx ≦ 1 | 0.4 |
| 1 < Δx ≦ 2 | 0.6 |
| . | . |
| . | . |

As hereinbefore described, since the provision has been made of a control means for driving a drive means to retract the photo-taking lens only by switching off a switch for driving a photo-taking device and also for stopping the drive means when a condition in which the photo-taking lens is retracted to a predetermined position is determined by a discriminating means, the photo-taking lens then relatively long extended from the body of the photo-taking device can be automatically retracted merely by switching off the switch after the photo-taking thereby to permit the photo-taking device as a whole to be compact in size for the convenience of portability as compared with the prior art devices. Accordingly, when it comes to the transportation of the photo-taking device from place to place after photo-taking, there can be appreciated an advantage in that the photo-taking lens then extended need not be manually retracted.

Although the present invention has been fully described in connection with the preferred embodiment thereof with reference to the accompanying drawings, it is to be noted that various changes and modifications are to be understood as included within the scope of present invention as defined by the appended claims unless they depart therefrom.

We claim:

1. A lens retracting apparatus in a photo-taking device which comprises:
   a photo-taking lens including a focusing lens;
   a focus detecting means;
   means for driving the focusing lens so that a front end of the photo-taking lens is selectively retracted and extended by means of the drive of the focusing lens;
   first means for controlling the driving means to drive the focusing lens towards an in-focus position on the basis of a result of focus detection carried out by the focus detecting means;
   a first switch manually operable to start the focus detecting operation of the focus detecting means;
   a second switch selectively switchable between a first position for enabling an operation of said first switch and a second position for disabling the operation of said first switch;

second means in response to the switching of the second switch from the first position to the second position for controlling the driving means to drive the focusing lens so that the front end of the photo-taking lens is retracted;

means for determining whether or not the focusing lens is located at a predetermined position; and third means for controlling the driving means to stop the movement of the focusing lens caused by the second controlling means when a condition in which the focusing lens is driven to the predetermined position is determined by the determining means.

2. The apparatus as claimed in claim 1, wherein the photo-taking lens is an interchangeable photo-taking lens.

3. A lens retracting apparatus in a photo-taking device which comprises:
a photo-taking lens including a focusing lens;
a focus detecting means;
means for driving the focusing lens;
first means for controlling the driving means to drive the focusing lens towards an in-focus position on the basis of a result of focus detection carried out by the focus detecting means;
a first switch manually operable to start the focus detecting operation of the focus detecting means;
a second switch selectively switchable between a first position for enabling an operation of said first switch and a second position for disabling the operation of said first switch;
second means in response to the switching of the second switch from the first position to the second position for controlling the driving means to drive the focusing lens toward a predetermined position;
means for determining whether or not the focusing lens is located at the predetermined position;
third means for controlling the driving means to stop the movement of the focusing lens caused by the second controlling means when a condition in which the focusing lens is driven to the predetermined position is determined by the determining means;
means for detecting an extension amount of the focusing lens from the predetermined position; and
means for resetting the extension amount of the focusing lens from the predetermined position; and
means for resetting the extension amount when the third controlling means operates.

4. The apparatus as claimed in claim 3, wherein the driving means includes a motor for driving the focusing lens, and the extension amount detecting means comprises a monitor for monitoring the amount of revolution of the motor; a pulse generator for generating pulses, the number of which corresponds to the amount of revolution of the motor; and an up-down counter for counting the number of pulses applied from the pulse generator wherein the up-down counter up-counts or down-counts the pulses according to the driving direction of the focusing lens.

5. The apparatus as claimed in claim 3, wherein the predetermined position is the most retracted position.

6. The apparatus as claimed in claim 3, wherein the predetermined position is a position corresponding to a predetermined object distance.

7. The apparatus as claimed in claim 3 further comprising means for detecting the distance corresponding to the present position of the focusing lens based on the detected extension amount detected by the extension amount detecting means.

8. A lens retracting apparatus in a photo-taking device which comprises:
a photo-taking lens including a focusing lens;
a focus detecting means;
means for driving the focusing lens;
first means for controlling the driving means to drive the focusing lens towards an in-focus position on the basis of a result of focus detection carried out by the focus detecting means;
means for detecting an excessive occurrence of the drive of the focusing lens driven by the driving means;
second means for controlling the driving means to drive the focusing lens toward a predetermined position when the excessive occurrence detecting means detects the excessive occurrence of the drive of the focusing lens;
means for determining whether or not the focusing lens is located at the predetermined position;
third means for controlling the driving means to stop the movement of the focusing lens caused by the second controlling means when a condition in which the focusing lens is driven to the predetermined position is determined by the determining means; and
means for resetting the detected excessive occurrence when the third controlling means comprises.

9. The apparatus as claimed in claim 8, wherein the predetermined position is the most retracted position.

10. The apparatus as claimed in claim 8, wherein the predetermined position is a position corresponding to a predetermined object distance.

11. The apparatus as claimed in claim 8, wherein the excessive occurrence detecting means includes means for counting the driven amount of the focusing lens and means for comparing the driven amount with a predetermined amount.

12. The apparatus as claimed in claim 11, wherein the driving means includes a motor for driving the focusing lens, and the counting means comprises a monitor for monitoring the amount of revolution of the motor; a pulse generator for generating pulses, the number of which corresponds to the amount of revolution of the motor; and a counter for counting the number of pulses applied from the pulse generator.

13. The apparatus as claimed in claim 8, further comprising:
means for detecting an extension amount of the focusing lens from the predetermined position; and p1 means for detecting the distance corresponding to the present position of the focusing lens based on the detected extension amount.

14. The apparatus as claimed in claim 13, further comprising means for resetting the extension amount detected by the extension amount detecting means when the third controlling means operates.

15. The apparatus as claimed in claim 13, wherein the driving means includes a motor for driving the focusing lens, and the extension amount detecting means comprises a monitor for monitoring the amount of revolution of the motor; a pulse generator for generating pulses, the number of which corresponds to the amount of revolution of the motor; and an up-down counter for counting the number of pulses applied from the pulse generator wherein the up-down counter up-counts or down-counts the pulses according to the driving direction of the focusing lens.

16. A lens retracting apparatus in a photo-taking device which comprises:
   a photo-taking lens including a focusing lens;
   a battery;
   battery detecting means for detecting that the battery has just been mounted;
   a focus detecting means;
   means for driving the focusing lens;
   first means for controlling the driving means to drive the focusing lens towards an in-focus position on the basis of a result of focus detection carried out by the focus detecting means;
   second means for controlling the driving means to drive the focusing lens toward a the predetermined position when the battery detecting means detects that the battery has just been mounted;
   means for determining whether or not the focusing lens is located at the predetermined position;
   third means for controlling the driving means to stop the movement of the focusing lens caused by the second controlling means when a condition in which the focusing lens is driven to the predetermined position is determined by the determining means;
   means for detecting an extension amount of the focusing lens from the predetermined position; and
   means for resetting the extension amount when the third controlling means operates.

17. The apparatus as claimed in claim 16, wherein the predetermined position is the most retracted position.

18. The apparatus as claimed in claim 16, wherein the predetermined position is a position corresponding to a predetermined object distance.

19. The apparatus as claimed in claim 16, wherein the driving means includes a motor for driving the focusing lens, and the extension amount detecting means comprises a monitor for monitoring the amount of revolution of the motor; a pulse generator for generating pulses, the number of which corresponds to the amount of revolution of the motor; an up-down counter for counting the number of pulses applied from the pulse generator, wherein the up-down counter up-counts or down-counts the pulses according to the driving direction of the focusing lens, said battery supplying the power at least to the lens driving means and the extension amount detecting means.

20. A lens controlling apparatus in a photo-taking device which comprises:
   a photo-taking lens including a focusing lens;
   a focus detecting means;
   means for driving the focusing lens;
   first means for controlling the driving means to drive the focusing lens towards an in-focus position on the basis of a result of focus detection carried out by the focus detecting means;
   a switch selectively switchable between a first position for enabling a lens driving operation of the first controlling means and a second position for inhibiting the operation of the first controlling means;
   second means for controlling the driving means to drive the focusing lens toward a predetermined position in response to the switching of the switch from the second position to the first position;
   means for determining whether or not the focusing lens is located at the predetermined position;
   third means for controlling the driving means to stop the movement of the focusing lens caused by the second controlling means when a condition in which the focusing lens is driven to the predetermined position is determined by the determining means;
   means for detecting an extension amount of the focusing lens from the predetermined position; and
   means for resetting the extension amount when the third controlling means operates.

21. The apparatus as claimed in claim 20, wherein the predetermined position is the most retracted position.

22. The apparatus as claimed in claim 20, wherein the predetermined position is a position corresponding to a predetermined object distance.

23. The apparatus as claimed in claim 20, wherein the driving means includes a motor for driving the focusing lens, and the extension amount detecting means comprises a monitor for monitoring the amount of revolution of the motor; a pulse generator for generating pulses, the number of which corresponds to the amount of revolution of the motor; an up-down counter for counting the number of pulses applied from the pulse generator, wherein the up-down counter up-counts or down-counts the pulses according to the driving direction of the focusing lens.

* * * * *